United States Patent
Coursol

(10) Patent No.: US 9,147,004 B2
(45) Date of Patent: Sep. 29, 2015

(54) WEBSITE BUILDER SYSTEMS AND METHODS WITH DEVICE DETECTION TO ADAPT RENDERING BEHAVIOR BASED ON DEVICE TYPE

(75) Inventor: Sebastien Coursol, Methuen, MA (US)

(73) Assignee: Cimpress Schweiz GmbH, Winterthur (CH)

( * ) Notice: Subject to any disclaimer, the term of this patent is extended or adjusted under 35 U.S.C. 154(b) by 412 days.

(21) Appl. No.: 13/606,329

(22) Filed: Sep. 7, 2012

(65) Prior Publication Data

US 2014/0075283 A1 Mar. 13, 2014

(51) Int. Cl.
*G06F 17/22* (2006.01)
*G06F 17/30* (2006.01)

(52) U.S. Cl.
CPC .................................. *G06F 17/3089* (2013.01)

(58) Field of Classification Search
CPC .................................................. G06F 17/2247
USPC .......................................................... 715/234
See application file for complete search history.

(56) References Cited

U.S. PATENT DOCUMENTS

| | | | | |
|---|---|---|---|---|
| 6,343,302 B1* | 1/2002 | Graham | ........................ | 715/205 |
| 6,601,057 B1 | 7/2003 | Underwood et al. | | |
| 7,698,631 B1* | 4/2010 | Toebes | .......................... | 715/234 |
| 8,261,231 B1 | 9/2012 | Hirsch et al. | | |
| 2002/0073125 A1* | 6/2002 | Bier | .............................. | 707/530 |
| 2003/0023632 A1* | 1/2003 | Ries et al. | ..................... | 707/513 |
| 2003/0130984 A1* | 7/2003 | Quinlan et al. | .................... | 707/1 |
| 2004/0148576 A1* | 7/2004 | Matveyenko et al. | ........ | 715/530 |
| 2006/0123337 A1* | 6/2006 | Koinuma | ...................... | 715/530 |
| 2006/0248442 A1* | 11/2006 | Rosenstein et al. | ........ | 715/501.1 |
| 2007/0055755 A1* | 3/2007 | Sasnett et al. | ................. | 709/223 |
| 2009/0031225 A1* | 1/2009 | Toebes et al. | ................. | 715/760 |
| 2009/0043798 A1* | 2/2009 | Tan et al. | ...................... | 707/102 |
| 2009/0119302 A1* | 5/2009 | Palmer et al. | ................... | 707/10 |
| 2009/0249193 A1* | 10/2009 | Hanechak | ..................... | 715/235 |
| 2009/0259949 A1* | 10/2009 | Verlaan et al. | ................ | 715/760 |
| 2011/0167336 A1 | 7/2011 | Aitken et al. | | |
| 2012/0216108 A1* | 8/2012 | Yambal et al. | ................ | 715/234 |

OTHER PUBLICATIONS

Mazer, Murray S., and Charles L. Brooks. "Writing the web while disconnected." Personal Communications, IEEE 5, No. 5 (1998): 35-41.*
"Notification of Transmittal of the International Search Report and the Written Opinion of the International Searching Authority, or the Declaration," issued on Mar. 20, 2014 by the European Patent Office for International Application No. PCT/US2013/051186.

* cited by examiner

*Primary Examiner* — Frank D Mills
(74) *Attorney, Agent, or Firm* — Jessica Costa

(57) ABSTRACT

Mobile website building tools which may be used to build a mobile-ready website from a mobile device includes a design studio application downloaded for executing on the mobile device. The design studio application detects a device type and enables dynamic preview rendering if the device type is a traditional computing device, and for device types that are mobile devices, batches user modifications to a website under construction until a preview or save request is made by the user.

14 Claims, 49 Drawing Sheets

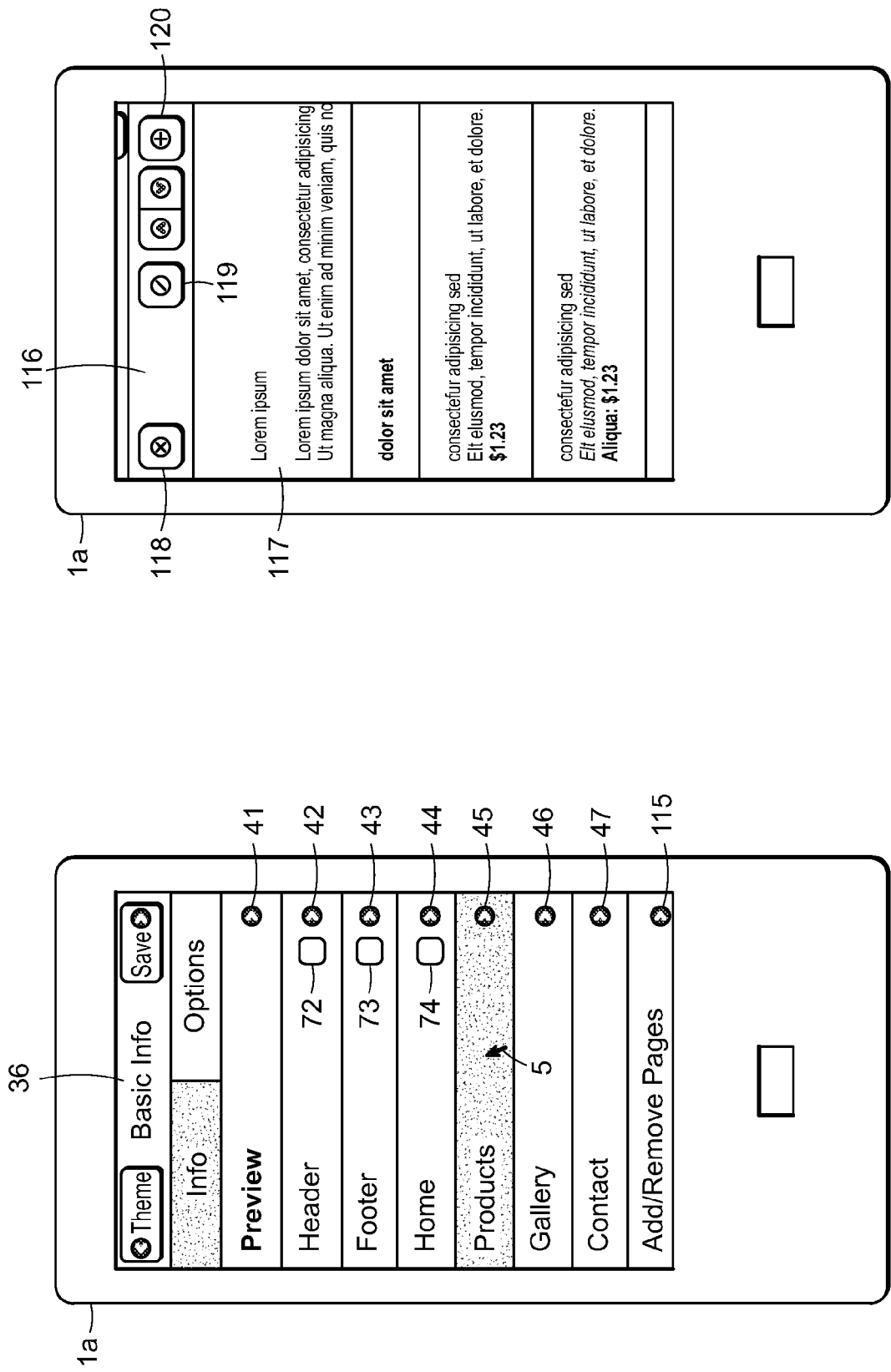

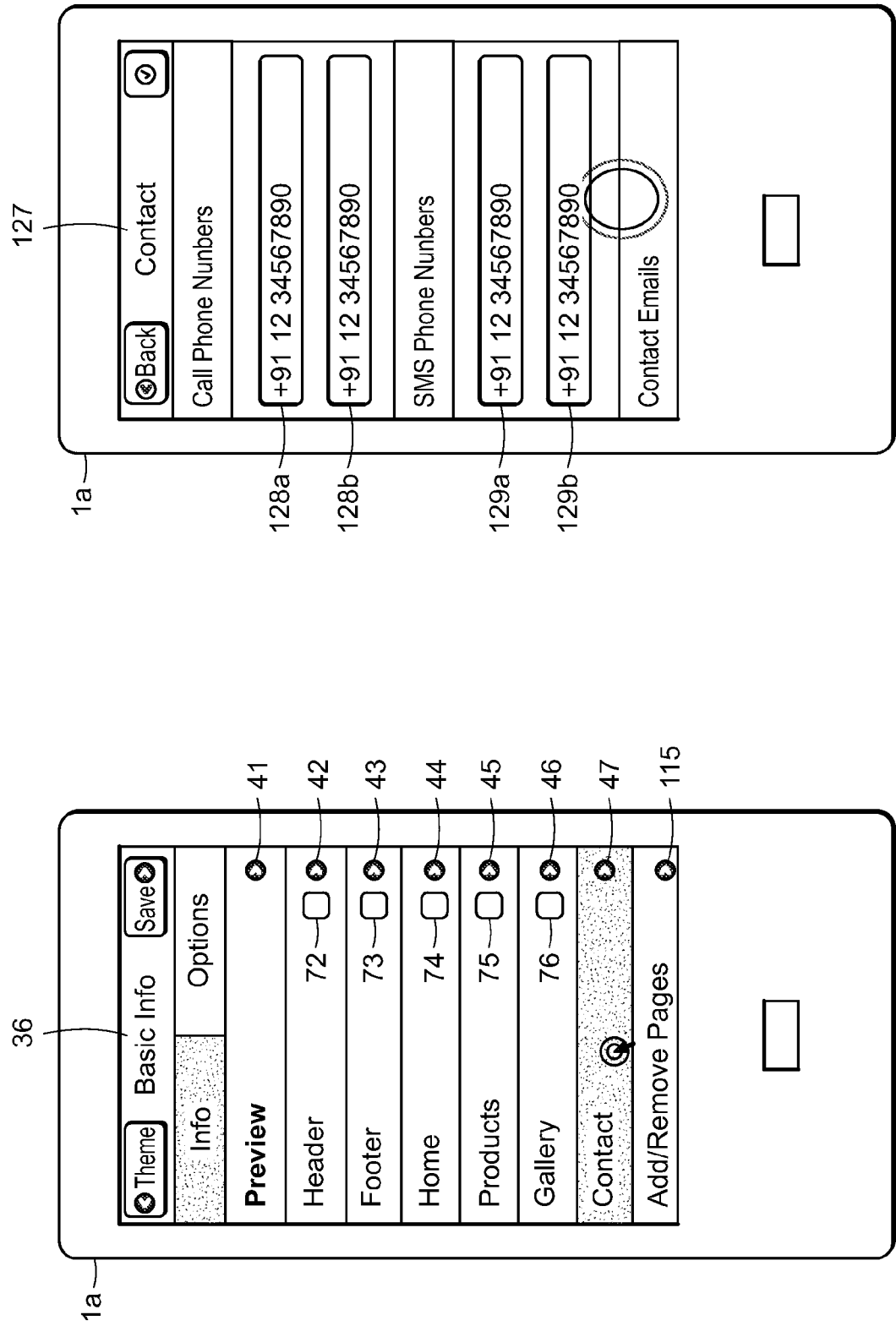

WEBSITE BUILDER SYSTEMS AND METHODS WITH DEVICE DETECTION TO ADAPT RENDERING BEHAVIOR BASED ON DEVICE TYPE

BACKGROUND OF THE INVENTION

The present invention relates generally to building websites, and more particularly to systems, processes, and applications for creation of websites from both traditional computing devices and mobile devices.

The Internet has for a couple of decades been used to relay information, advertise, and engage in e-commerce. More recently, businesses are increasingly turning to social media networks to publish their messages, advertise, and attract and retain customers. With the increase in web site building and publication tools, many users who might not otherwise have the time or skill to create their own websites or the money to hire an outside consultant are now publishing to the World Wide Web. For example, such tools often provide web page templates that allow a user to enter personalized content and select web page layout, styles, fonts, colors, etc., and then immediately publish the completed pages to the Internet.

More recently, the addition of data connectivity capability to cellular phones, resulting in what is known as the "smartphone", has transformed not only the phone industry but also the rate of communication between such users and their accompanying expectations of such devices. Smartphone users now connect directly to the Internet and demand the same capabilities they would have had were they browsing the Internet using a traditional computer.

Furthermore, with the rising popularity of social media networks such as Facebook, LinkedIn, and Twitter, the methods and channels for advertising and connecting to customers have become prolific.

At the present number of websites accessible over the Internet (estimates as of early 2010 are in the hundreds of millions of websites), and as the number of web sites and web pages increases, the importance to a business of having an Internet presence, including a website, a mobile-ready website, and pages on all the big social media networks, cannot be underestimated.

In order to assist a user to quickly establish an "online" presence, several websites offer, often in conjunction with a domain name registration service, website building tools that provide a user interface for guiding the user through a series of questions and tools to select and configure the layout, content, and order of web pages on the user's website. Such website building tools, for example as provided by Vistaprint.com and by Webs.com, provide a number of tools, accessible via an intuitive user interface, that allow a user to select a theme, a layout, images, text, and a font and color scheme. Such tools may also include graphical controls that upon activation by the user, allow the user to add functionality to the web page. For example, such graphical controls often enable such functionality as adding a map to the web page, adding a form, etc.

Many Internet users access the Internet using their phone or mobile device more frequently than using a traditional device such as a desktop or laptop computer. Some users even access the Internet exclusively using a mobile device. However, the traditional website building applications have not kept pace with this trend. Traditional website building applications are designed for creating web pages optimized for display on the larger screen of the desktop and/or laptop displays. The content of traditional web pages often dictates frequent interaction with the server hosting the website building application and/or hosted website. Often, such website building applications allow the user to create highly customized stylized web pages with images and other content which pass from the server to the requesting device as large data files (500 KB up to several Mbytes). For example, a single image to be rendered on a web page may involve the transfer of one or more Megabytes of data. While such images and fine detail make for a more aesthetic and sophisticated looking website, such content is not ideal for display on mobile devices which have smaller displays and slower data transfer rates. Additionally, website building applications typically utilize the full traditional display screen for displaying the web page under construction and panels of editing controls and widgets that can be dragged and dropped onto the web page. Traditional website building applications are therefore impractical, and depending on the device sometimes impossible, for use on a mobile device. A user operating a mobile device but desiring to create a website must typically wait until they have access to a desktop/laptop device with a traditional screen and high-bandwidth connection to the Internet to select and provision a website.

Finally, to complicate matters, the number of different types of mobile devices with differing operating systems, hardware configuration and capability, and communicating over different types of communication channels with different levels of transmission bandwidth (which on mobile devices is typically much lower than the bandwidth of "wired" lines), adds to the challenges faced by online website management service providers in providing a simple, fast, and intuitive online website creation and editing application.

Accordingly, what is needed is a simple, fast, and intuitive online website creation and editing application and service for allowing Internet users to create and publish a website from any and all of a traditional computing device, mobile device, or tablet device. A website should preferably be created, customized by the user, and published within a short period of time (e.g., 10-15 minutes). A user should further be able to perform all of the creation, customization, editing, and publishing on a mobile device, and the resulting website should look good across all different types of mobile devices.

SUMMARY OF THE INVENTION

Presented herein are techniques and tools for the assisted creation of a website optimized for mobile devices from a mobile device. Embodiments of the invention include a website building tool for building a website, which includes an application executing on a mobile device and communicating with a server and operating to present a graphical user interface on a display screen of the mobile device. The application is configured to present a user-configurable website template to a user of the mobile device and one or more controls responsive to user input for editing elements of the website template to create a user-customized website. The application queues and stores user edits to the website template in a local store on the mobile device and sends the queued user edits to the server for display rendering only upon receipt of a user input requesting preview or saving of the user edits.

Additional embodiments include at least a system including a server responsive to a request from a client device to serve a web page from which a website building tool may be launched and which downloads a design studio application to the client device for executing on the client device. The server is responsive to a selection indication received at the client device indicating a selection of a corresponding template by downloading a preview version of a user website based on the selected template to the client device. The design studio application is configured to determine a device type of the client device, and to enable dynamic preview rendering of the user website in response to user modifications to the user website if the device type is determined to be a conventional computing device, and if the device type is determined to be a mobile device to cache the user modifications at the client device and to request preview rendering of the user website only upon request by the user.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1B:
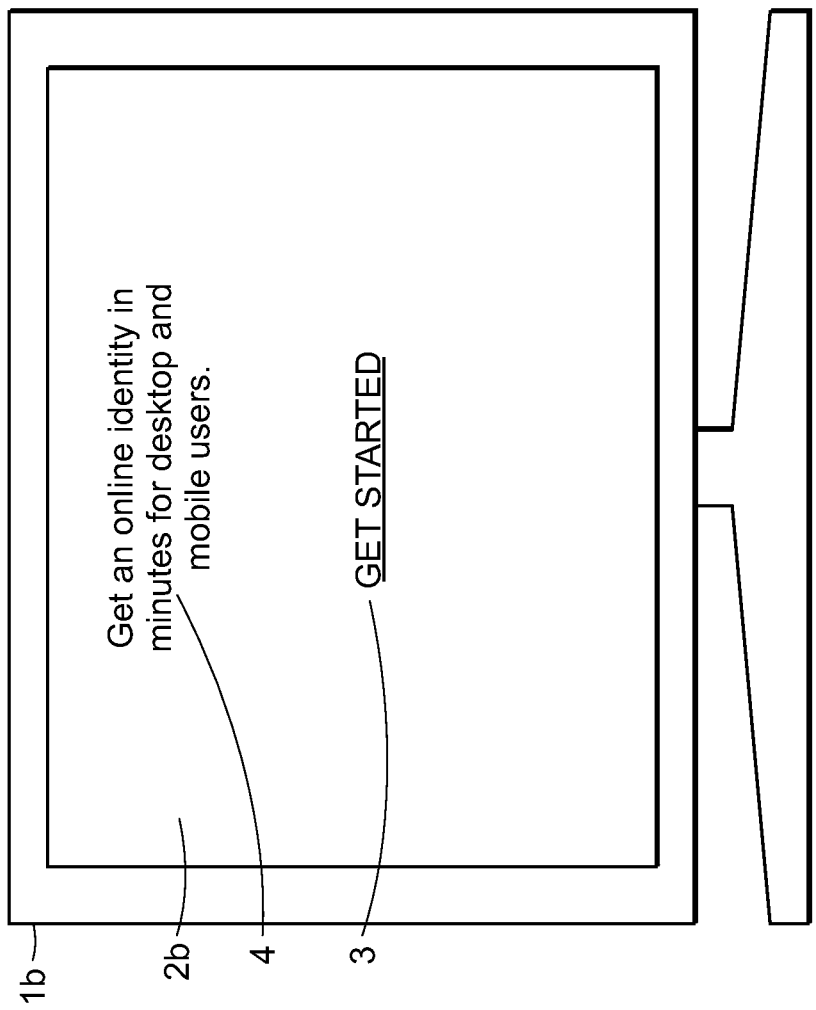
FIGS. 1-87 are schematic diagrams of a client device, illustrating a number of graphical user interface screenshots that may be displayed to a user in an exemplary website creation flow.

Although the present invention is described below by way of various embodiments that include specific structures and methods, embodiments that include alternative structures and methods may be employed without departing from the principles of the invention described herein.

In general, embodiments described below feature a network-based design application which allows a user to edit and configure features of a mobile-ready website and that executes on both a traditional computing device such as a desktop or laptop and on a mobile device such as a smartphone or tablet/pad device. The application is downloaded to the device by a server. The application detects the device type, and based on the device type, enables functionality. In an embodiment, the application allows dynamic display rendering as user-made selections and edits are made to a user website when the detected device type is a traditional device type. For mobile device types, the application instead locally stores user-made selections and updates to a user website and transmits the updates to the server as a batch only when a save or preview is requested by the user. In this way, rendering happens more quickly when the device on which the user is creating or editing the user website has, in general, more transmission bandwidth, whereas when the application detects that the website is being created and/or edited from a mobile device, the user updates to the user website are batched to reduce the amount of data passing to and from the server and thereby reducing perceived delay in rendering updates on the screen of the mobile device.

An introduction to Internet-related technology is helpful in understanding the present invention. The Internet is a vast and expanding network of computers and other devices linked together by various telecommunications media, enabling the various components to exchange and share data. Web pages and websites (collections of related web pages organized under a particular domain), accessible through Internet, provide information about numerous businesses, products and services, as well as education, research, and entertainment.

A resource that is attached to the Internet is often referred to as a "host." Examples of such resources include conventional computer systems that are made up of one or more processors, associated memory and other storage devices and peripherals, such as modems, networks interfaces and the like that allow for connection to the Internet or other networks. In most cases, the hosting resource may be embodied as hardware and/or software components of a server or other computer system that includes an interface module, which allows for some dialog with users and that may process information input by the user. Generally, such a server will be accessed through the Internet's graphical user interface, the World Wide Web, (e.g., via Web browsers) in the conventional fashion.

In order to facilitate communications between hosts, each host has a numerical Internet Protocol (IP) address. The IP address of a hypothetical host computer might be 69.17.223.11. Each host also has a unique "fully qualified domain name." In the case of the hypothetical host 69.17.223.11, the "fully qualified domain name" might be "computer.domain.com", the three elements of which are the hostname ("computer"), a domain name ("domain") and a top-level domain ("com"). A given host looks up the IP address of other hosts on the Internet through a system known as domain name service.

A page of a website is addressable by way of a Uniform Resource Locator, or "URL". A URL specifies three elements: (1) a transfer protocol; (2) a web server name or domain name; and (3) a path. The first element of the URL is a transfer protocol, most commonly "http" standing for hypertext transfer protocol, but others include "mailto" for electronic mail, "ftp" for file transfer protocol, and "nntp" for network news transfer protocol. The domain name indicates the name of the web server that stores the web page. The path indicates the location of web page on the named web server.

In order to access the Internet most users rely on computer programs known as "Web browsers." Commercially available Web browsers include such well-known programs as Microsoft Corporation's Internet Explorer®, Apple Inc.'s Safari®, Google Inc.'s Chrome®, and Mozilla Foundation's Firefox®, to name a few. If an Internet user desires to view a Web page hosted at www.domain.com, the Internet user might enter into a Web browser program the uniform resource locator (URL) "http://www.domain.com".

Once a URL is entered into the browser, the request is routed to a Domain Name System (DNS) server capable of matching the domain name specified in the URL to a corresponding IP address of a web server hosting the requested web page. Thus, the DNS server ultimately matches an alphanumeric name such as www.domain.com with its numeric IP address 69.17.223.11.

When a host receives a request from the Internet, it returns the data in the file pointed to by the request to the client making the request. Such data may make up a Web page, which may include a text message, sound, image, video, or a combination of such elements. A user can move between Web pages through the use of hyperlinks, which are links to other pages or locations on pages on the Internet.

A traditional website is a set of one or more web pages served by a web server at a particular domain name. A web page is typically a text document containing text and browser-interpretable instructions, such as the well-known HyperText Markup Language (HTML), eXtensible HyperText Markup Language (XHTML), Dynamic HTML (DHTML), Document Object Model (DOM), etc. A web browser running on a client machine requests a web page by specifying the Universal Resource Locator (URL) of the specific page, and upon receiving the requested page from the server, renders the page on the user's display screen by processing and executing the browser-interpretable instructions. Web pages may be linked to other web pages by way of hyperlinks placed within the page(s). Typically, a hyperlink specifies a URL of a web page, a position in the web page, or a resource accessible by the server serving the web page.

A typical website consists of a home page that is served when the URL specifies the domain name without specifying a particular path (e.g., www.mycompany.com). Additional pages belonging to a website may be specified by way of the path following the domain name in the URL, For example, a "Contact" web page for the www.mycompany.com website may be specified as "www.mycompany.com/Contact", where the path "/Contact" in the URL indicates the location at the web server of the "Contact" web page.

Figure 91:
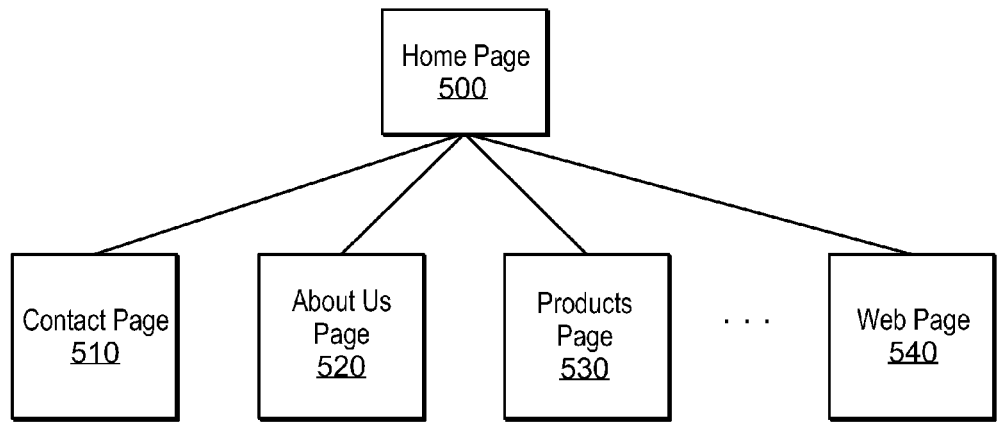
FIG. 91 is a schematic diagram of the architecture of an example website.

With reference now to FIG. 91, a website may consist of a plurality of related web page 500, 510, 520, 530, 540, each comprising a browser-renderable document (for example, an HTML document). In the example shown in FIG. 91, a website includes a Home Page 500, a Contact page 510, an About Us page 520, a Products page 530, and one or more additional web pages 540.

Figure 92:
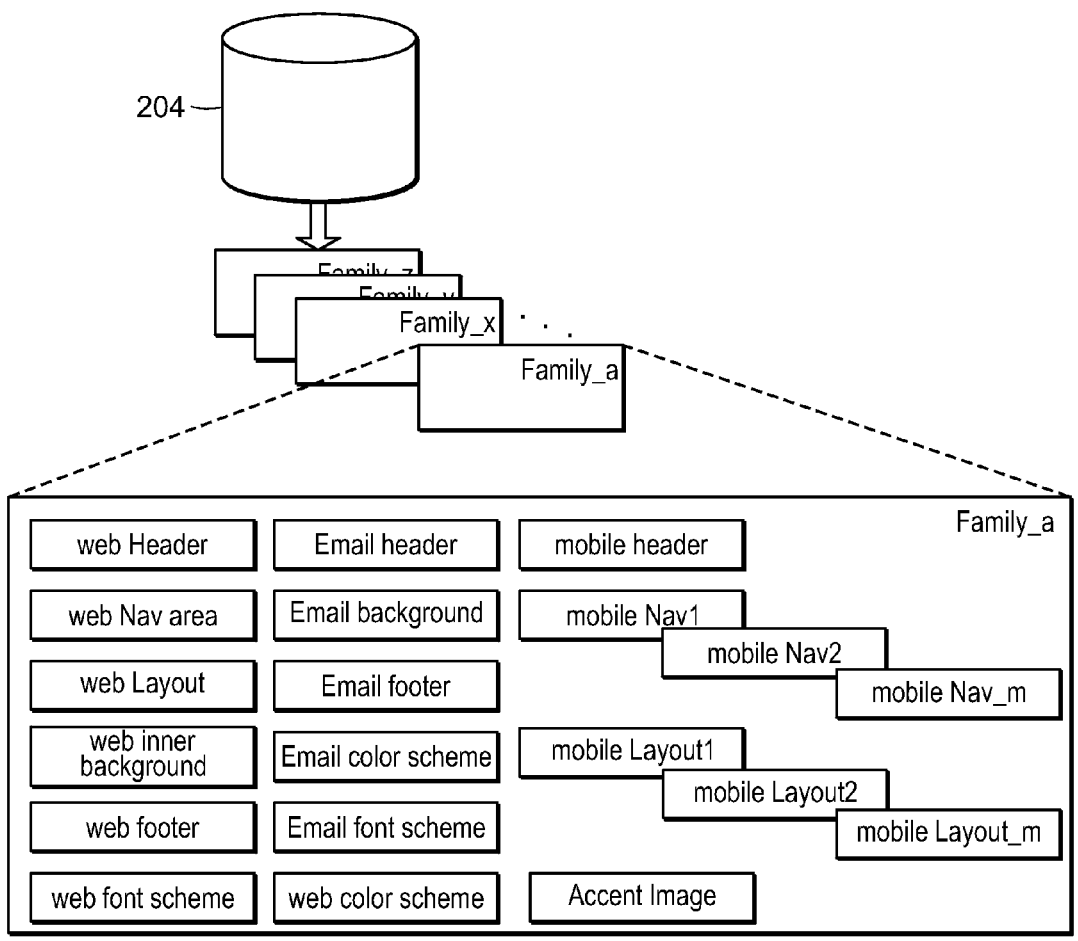
FIG. 92 is a schematic block diagram illustrating website assets database.

FIG. 92 depicts a structural diagram of a portion of a website assets database 204. The website assets database 204 contains components and descriptions such as headers, navigational components, background images, inner background images, footers, layouts, color schemes, accent images, font schemes, template descriptions, and any type of component or scheme that may be used as a component in a web page. A web page may include a plurality of different components arranged (such as layouts, headers, footers, backgrounds, text components, and images) and/or applied (such as color schemes, font schemes, backgrounds, layouts, etc.) according to a page description (typically .html).

An integral component of the present invention is a computer server. Servers are computer programs that provide some service to other programs, called clients. A client and server communicate by means of message passing often over a network, and use some protocol, a set of formal rules describing how to transmit data, to encode the client's requests and/or responses and the server's responses and/or requests. The server may run continually waiting for client's requests and/or responses to arrive or it may be invoked by some higher-level continually running server that controls a number of specific servers.

Figure 88:
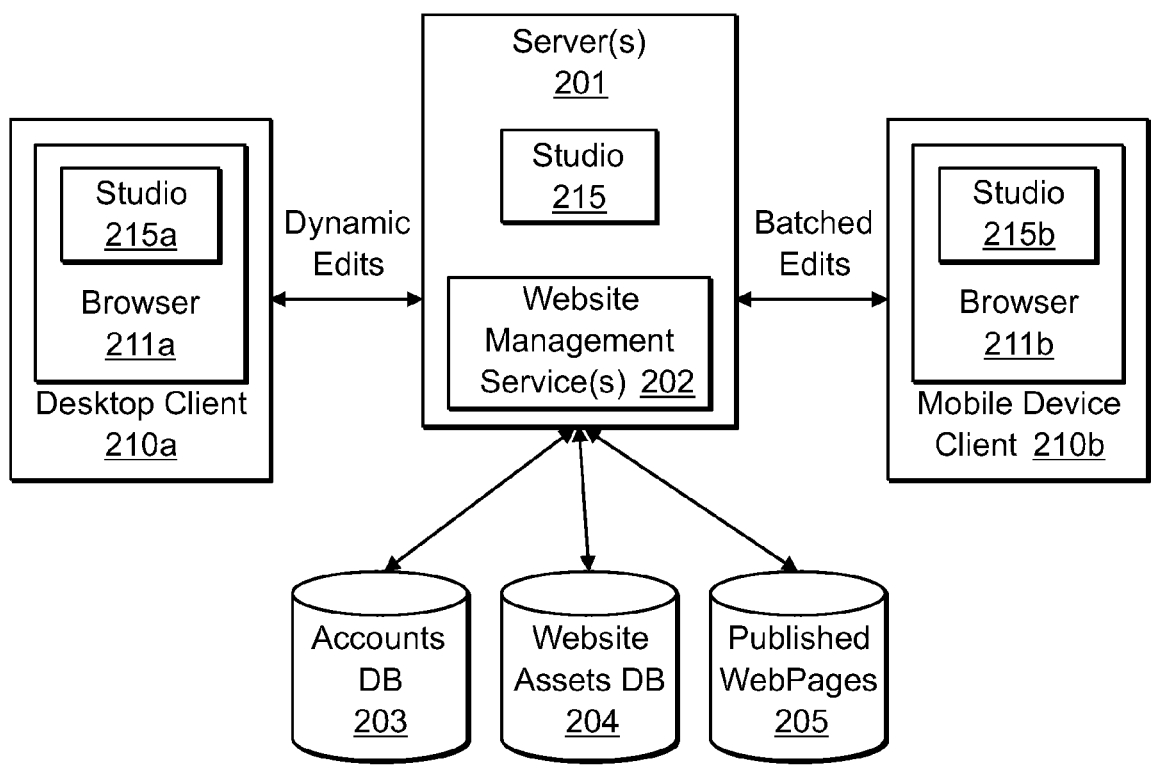
FIG. 88 is a schematic block diagram of an exemplary system in which various embodiments of the invention operate.

With these concepts in mind, an embodiment of a system architecture of the present invention is presented in FIG. 88. One or more server(s) 201 hosting one or more website management service(s) 202 are configured to allow operable communication with Internet-enabled client devices, including traditional computer devices 210a such as desktop and laptop computers as well as mobile devices 210b such as smartphones and Internet-enabled handheld devices (such as the Apple iPod Touch and other such devices). The server(s) 201 host a web-based website management service 202 which allows a user of a client device 210a, 210b to quickly create, edit, and publish a website. In an exemplary embodiment, the website created by the user is optimized for access by mobile devices. To this end, the server(s) 201 provides the website management service 202 with access to a database 204 of website assets which contain layouts, images, fonts, color schemes, etc. which are optimized for display on a mobile device. For example, the assets preferably include images of small or medium file size (e.g., less than 300 KB) and fonts that are widely available on many different types of mobile devices. In alternative embodiments, the website created by the user may be optimized for access by traditional computing devices such as desktop and laptop devices.

The website management service 202 is generally available to a client device 210a, 210b upon the device user navigating to a website hosted by the server(s) 201 and activating a control (for example, by clicking on a button or link displayed in a web page) to request the website management service 202. Upon activation, the service 202 downloads a design studio application 215a, 215b (referred to generally hereinafter as 215) to the requesting client device 210a, 210b, to execute in the browser 211a, 211b running on the client device.

The design studio application 215 detects the type of the client device. Preferably, at a minimum, the design studio application 215 determines whether the device type is a mobile device or a traditional computing device. Preferably, the design studio application 215 determines much more than merely whether the requesting device is a mobile device or a traditional device, including the device make and model, operating system, and hardware configuration. In an embodiment, the design studio application 215 reads the operating system configuration to determine the device type and operating system type and version. Other device type, system and hardware configuration may be obtainable by reading configuration information stored in one or more configuration locations in static device memory (e.g., device Read-Only Memory (ROM) or static Random Access Memory (RAM)).

As previously mentioned, the design studio application 215, including the code and framework of the application 215, is downloaded to the requesting device. In an embodiment, the design studio application 215 is one or more sets of JavaScript. The application 215 itself appears to the user as a set of web pages that naturally sequence from page to page. However, unlike a traditional navigation of a website, the design studio application 215 graphical user interface screens are not in fact web pages and are not served by the server(s) 201 when navigating from screen to screen. This significantly reduces the back and forth communication between the server(s) 201 and client device 210a, 210b during the creation and editing of a client user's website. Additionally, the design studio application 215 presents the design studio pages as a sequence of pages, thus appearing less like navigating the web and more like a wizard-type guided application running on the user's device 210a, 210b.

Of course, during the design of a user website from a client device 210a, 210b, there are points in the process when it is necessary to communicate with the server(s) 201. For example, if the user desires to see a preview of the website or web page design, or desires to save edits made to the website or web page, the client must request the server to render the design and download the rendered design to the client device 210a, 210b for display. When transmission bandwidth is high, for example, when accessing the Internet from a traditional computing device over a high-speed T1 line, DSL or cable, the frequency of client-server communication and amount of data passed there between is generally not an issue in terms of the user experiencing any noticeable delay between communications. In this situation, user edits to the website under design can be dynamically updated and previewed simultaneously in the user interface. However, when the transmission bandwidth is limited, for example when the user is creating the website from a mobile device 210b over a cell or wireless connection, frequent communication and passing of data between the client and server can result in a noticeable (e.g., undesirable) delay.

In general, the design studio application 215 detects whether the type of the client device is a traditional computing device (e.g., a desktop or laptop device) or a mobile device (e.g., smartphone, handheld, or tablet device), When the detected device type is one of a traditional computing device 210a, user selections and changes to a website which change the look or function of a web page or website are sent to the server for preview rendering dynamically (i.e., the preview is updated in realtime as the changes are made by the user). In contrast, when the detected device type is one of a mobile device 210b, the design studio application 215 maintains a cached queue of user updates which are sent to the server as a batch, and only at certain points in the website creation/editing process. In an embodiment, a batch of user updates is sent to the server(s) 201 only when a user requests a preview or to save the current changes. In this way, the website management service 202 can provide the desired type of experience depending on the type of device from which the user is accessing the service 202. On traditional computing devices communicating over high bandwidth channels, the website management service 202 can provide a full dynamically updated preview of the web page under construction simultaneously with the user's input of design selections and input. On mobile devices communicating over more limited bandwidth channels, the website management service 202 can limit the interaction with the server(s) 202 to speed up the process by providing a preview image of the web page under construction only when asked for by the user or when the user requests the user input changes to be saved. By reducing the number of back-and-forth communications between the mobile device and server(s) 202 and preferably by using website assets optimized, especially in terms of data/file size, for mobile devices, the amount of time a user must spend to create, customize and publish a website can be significantly reduced.

Figure 89:
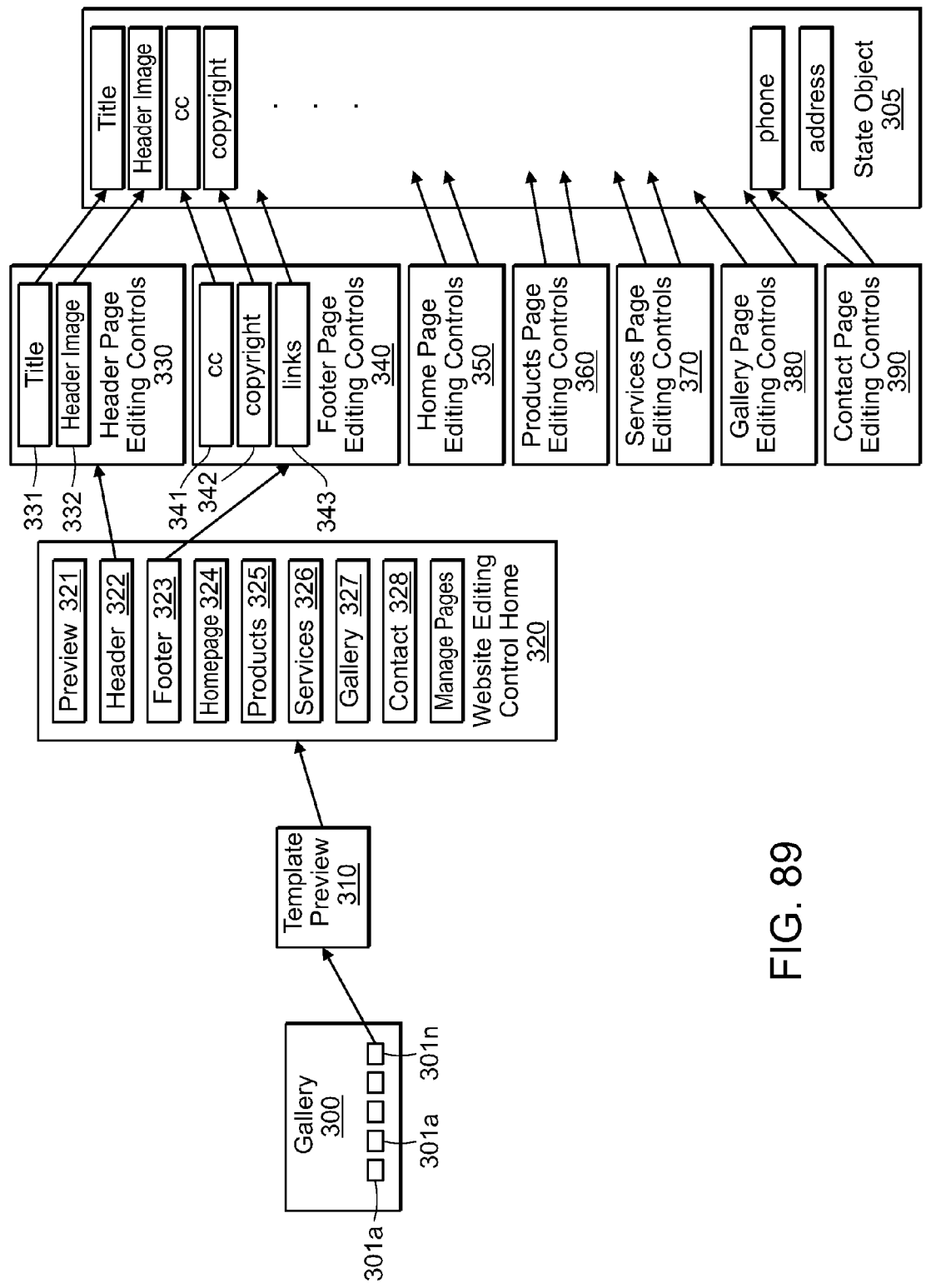
FIG. 89 is a schematic graphical user interface data representation illustrating various graphical user interface pages presented on a client device and corresponding local website state object.

In an embodiment, the design studio application 215 is one or more set(s) of JavaScript code that is downloaded by the server(s) 201 to a requesting client device 210a, 210b. In this embodiment, the design studio application 215 instantiates a JavaScript State Object (JavaState (JS) State Object) which represents and stores the state of the website under construction. Referring now to FIG. 89, when the design studio application 215 is downloaded to the client device 210a, 210b, in an embodiment the design studio application 215 presents a gallery 300 of different template designs 301a, 301b, 301n from which the user may select using a graphical user interface control on the display device of the client device 210a, 210b. Upon receipt of a user's template selection, the design studio application 215 sends the identifier of the selected template to the server(s) 201, which retrieves the template preview 310 (comprising a plurality of different website assets associated with the selected template) from the website assets database 204 and downloads the template to the client device 210a, 210b. The website template includes a default set of web pages, each with a default set of graphical and functional components, in a preferred embodiment, a functional preview 310 of the selected website template is downloaded at the time of selection to allow the user to interact with the preview to view the different pages of the selected template.

When a template is selected and downloaded to the user device 210a, 210b, a state object 305 (such as a JS State Object) is initialized to represent the website containing the default set of web pages and default set of graphical and functional components and other default selections and sample content. A user is then guided through the website customization and editing process by the design studio application 215 through a sequenced series of screens 320, 330, 340, 350, 360, 370, 380, 390. As the user makes selections and edits content and website configuration, corresponding fields or attributes of the JS State Object 305 representing various aspects and components of the user's website are correspondingly updated.

The design studio application 215 includes a preview control which allows the user to request a preview of the website under construction. The design studio application 215 also includes a save control which allows a user to request a save of the website under construction. In an embodiment, the website under construction may be stored in a user account storage area, for example in an account database 203. Websites stored in the user account storage area are not published, and are therefore not accessible to the general public. The design studio application 215a, 215b also includes a publication control which transfers a copy of a saved website or web page to a Published Web Page storage area 205. Each of the Account Database 203, Website Assets Database 204 and Published Web Page storage areas 205 are non-transitory computer readable storage devices.

When a user is operating a traditional computing device 210a, whenever the user modifies or edits a component of the website under construction, the design studio application 215 sends the modification to the website management service 202 at the server 201, where the web page under construction is re-rendered by the server 201 and sent back to the client device 210a for display in a preview area. In contrast, when a user is operating a mobile device 210b, whenever the user modifies or edits a component of the website under construction, the design studio application 215 updates the JS State Object 305 representing the website but does not automatically communicate with the website management service 202 at the server(s) 201. Instead, user modifications are merely stored in the JS State Object. When the user requests a preview or a save operation, the design studio application 215 sends the JS State Object 305 (full Object or partial with only those portions which have changed states) to the website management service 202 at the server(s) 201 for rendering (on a preview request) or saving (on a save request). In an embodiment, the design studio application 215a, 215b sends a state synchronization request (for example, a JavaScript SyncState call), which synchronizes the JS State Object on the device with a corresponding state object maintained by the website management service 202 on the server(s) 201. In this way, all user updates made up until the point in time when the user request a Preview are encapsulated in the JS State Object 305 on the device 210b and can by updated at the server simultaneously by one server request and with minimal data transfer.

It will be appreciated by those skilled in the art that the user interface of the design studio application 215 adapts the amount and type of its server interactions based on the type of device on which it is running. This device-type adaptability significantly improves the experience provided by the user of any given device by adapting the functionality of the website building application to the capabilities of the device on which it is running.

Referencing FIG. 89 again, in an embodiment the design studio application 215 includes a website editing control home page 320 which includes controls 321-328 for activating editing of various components of the website, including a website header, a website footer, a website home page, and one or more additional website pages such as an About page, a Products page, a Services page, a Gallery page, a Contact page, etc. Each control 321-328, when activated by the user, provides a corresponding functionality (such as displaying a Preview or a corresponding edit control page for a particular page in the website under construction. For example, the preview control 321 results in the display on the client device of a preview page 310, which is an operational version of the current state of the user's website under construction, based on the current state of the JS State Object 305. The header control 322 results in the display of a header editing control page 330, which provides controls for selecting and/or editing the header title (control 331), header image (control 332), and any other header components. The footer control 323 results in the display of a footer editing control page 310, which provides controls for selecting and/or editing the footer information, such as contributor crediting ("cc") (control 341), a copyright notice (control 342), links (control 343), and any other footer components. Returning to the website editing control home page 320, activation of control 324 brings up home page editing page 350, control 325 brings up products editing control page 360, control 326 brings up services editing control page 370, control 237 brings up a gallery editing control page 380, and control 238 brings up a contact editing control page 390. Additional control associated with additional pages for configuring and editing components of additional associated pages may be provided.

Figure 90:
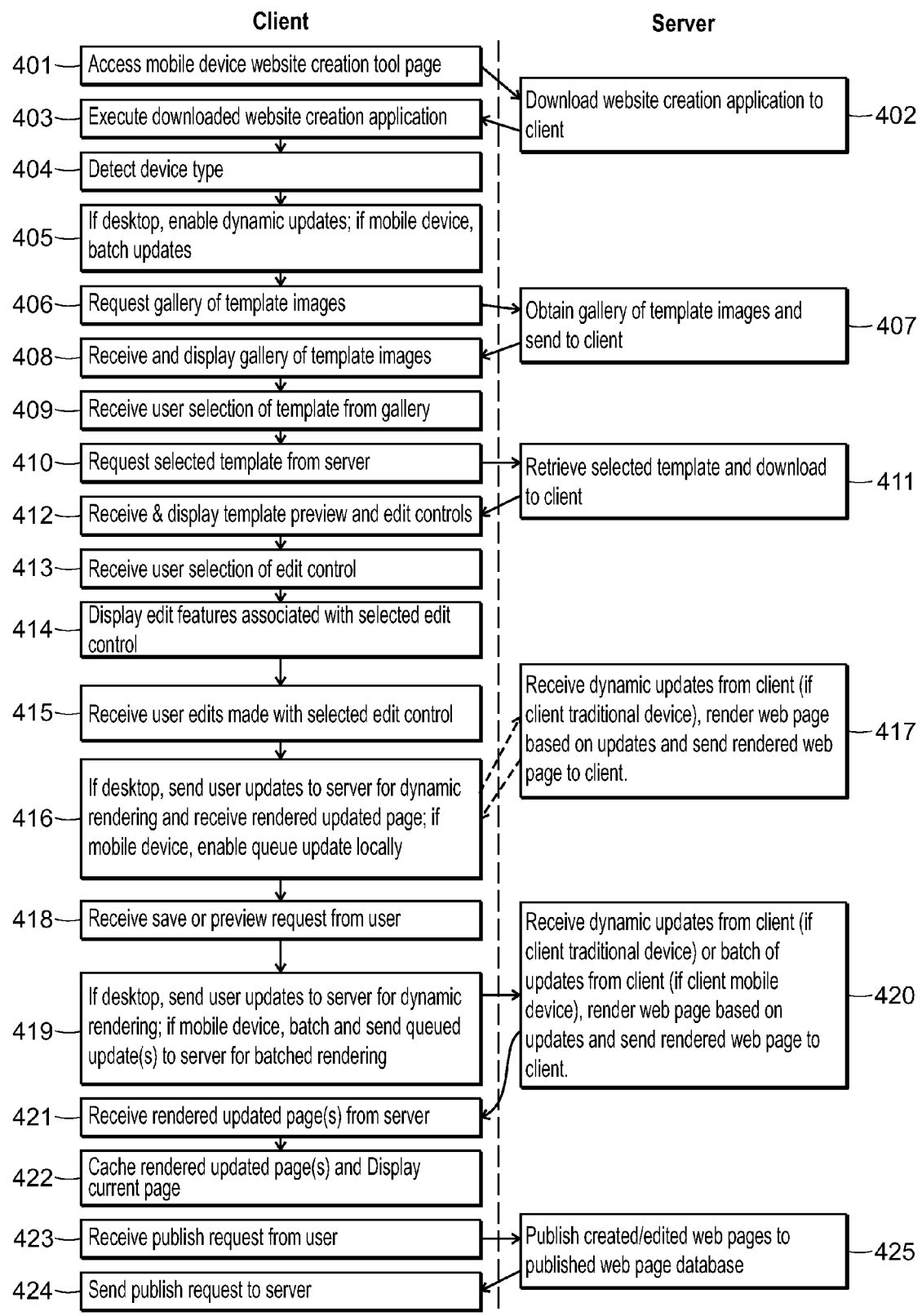
FIG. 90 is an operational diagram illustrating client-server actions and communications in accordance with an embodiment of the present invention.

FIG. 90 is an operational diagram illustrating client-server actions and communications in accordance with an embodiment of the present invention. As illustrated, a client brings up a browser to access the Internet and activates the service by clicking on or entering the URL of the service 202 (step 401). By clicking on or entering the URL of the service, the request for the page associated with the URL is sent to a server 201 which downloads a design studio application 215 into the browser 215 of a client device 210 (step 402). The design studio application 215 executes in the browser of the client device (step 403). The design studio application 215 detects the device type of the requesting device (step 404). If the device type is a traditional computing device dynamic updates are enabled, otherwise updates are cached (step 405). The design studio application 215 requests from the server(s) 201 a gallery 300 of images of templates 301a, 301b, . . . , 301n (each template image having associated therewith a selection control) (step 406). A server 201 obtains the requested gallery 300 and sends to the requesting client device 210 (step 407). The client device receives and displays the gallery 300 (step 408), receives a user selection of a particular template (by way of the user activating the selection control associated with the template image representing the desired template) (step 409) and requests the selected template from the server step 410). The server 201 retrieves the selected template and downloads it to the client device (step 411). The client device 210 receives the template from the server and displays an operational preview along with a number of editing controls (step 412).

The design studio application 215 monitors for user input. Each time a user selects an editing control (step 413), a set of edit features associated with the selected edit control are displayed (step 414). For example, if the edit control is a control associated with editing the website header, the edit control when activated results in the display of a set of additional controls for editing features such as the title, image and other features of the header. User edits made using the selected edit control are received at the client (step 415). If dynamic updates are enabled, the updates corresponding to the user edits are sent by the client to the server for dynamic rendering, otherwise the corresponding updates are stored locally for later batched updating (step 416). The server may receive dynamic updates from the client device if dynamic updates are enabled, and if so, re-renders the web page or website based on the received updates, sending the re-rendered page/website to the client device (step 417). The user may continue to configure and edit the website template at will (repeating steps 413 through 417 as appropriate).

Eventually, the user may select the preview button or a save button (step 418). If dynamic updates have been disabled (due to mobile device type), the stored queued updates are sent as a batch to the server for rendering (step 419). The server receives the preview or save request, re-renders the website or web page based on the received updates, and sends the preview to the client device (if a preview request) or saves the state of the website at the server (if a save request) (step 420). The client receives the preview (step 421), displays the current page and caches the other pages (step 422).

The user may request publication of the website. When the design studio application 215 receives user input indicating desire to publish the website as is, (step 423), the request is sent to the server (step 424), and the server 201 publishes the current state of the website to a published web page database (step 425).

Figure 1A:
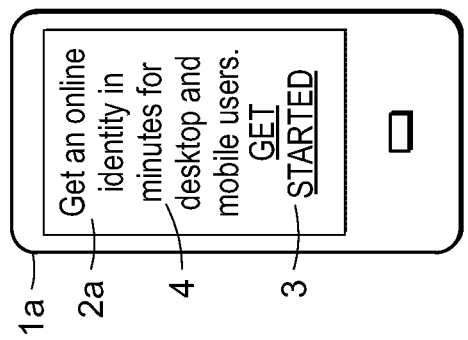
Figure 87:
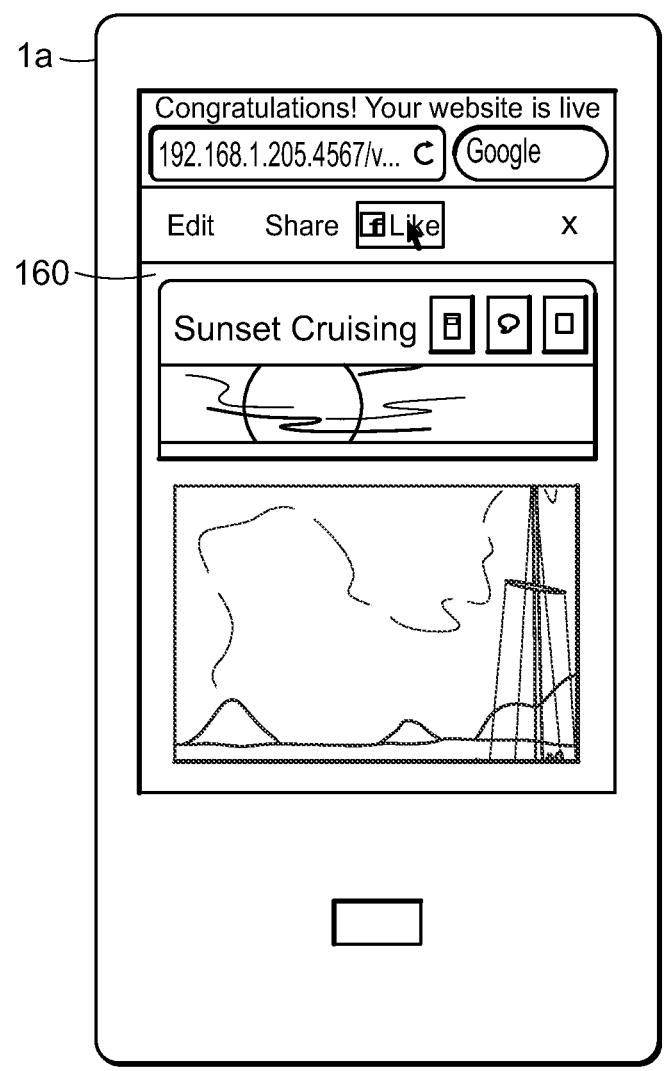

FIGS. 1-87 show a number of exemplary example display screen outputs that may be presented to a user of a mobile device or traditional computing device. FIG. 1 includes FIGS. 1A and 1B which each show an example introductory page 2a, 2b that is hosted by a server and that may be displayed to the user upon navigation to the introductory page using a browser executing in either a mobile device 1a or on a traditional computing device 1b such as a laptop or desktop computer. As indicated, the introductory screen 2a, 2b includes welcome or explanatory text 4, and a control 3, such as a button or link, to launch the creation/editing of a website. Notably, the creation and/or editing of a website can be performed from either a traditional computing device 1b, or from a mobile device 1a. To create a new website, a user may click on the control 3 which triggers the download of the design studio application 215 to the requesting device 210a, 210b.

The design studio application 215 detects the device type and presents a graphical user interface suitable to the device type. The graphical user interface presented preferably utilizes the full available screen real estate based on the device type. If the detected device type is a traditional device such as a laptop or desktop, the display screen aspect ratio is typically (but not limited to) 5:4 (width to height), 4:3, 5:3, 32:15, 128:75, with varying resolutions such as (but not limited to) 1280×1024 pixels, 640×–480 pixels, 800×480 pixels, 800× 600 pixels, 1024×480 pixels, 1024×600 pixels, 1024×768 pixels, Etc. If the detected device type is a mobile device such as a smartphone, the screen aspect ratio is typically (but not limited to) 2:3, 3:4, or 4:5 with the resolution typically (but not limited to) 320×480 pixels, 240×320 pixels, or 480×800 pixels.

Figure 2:
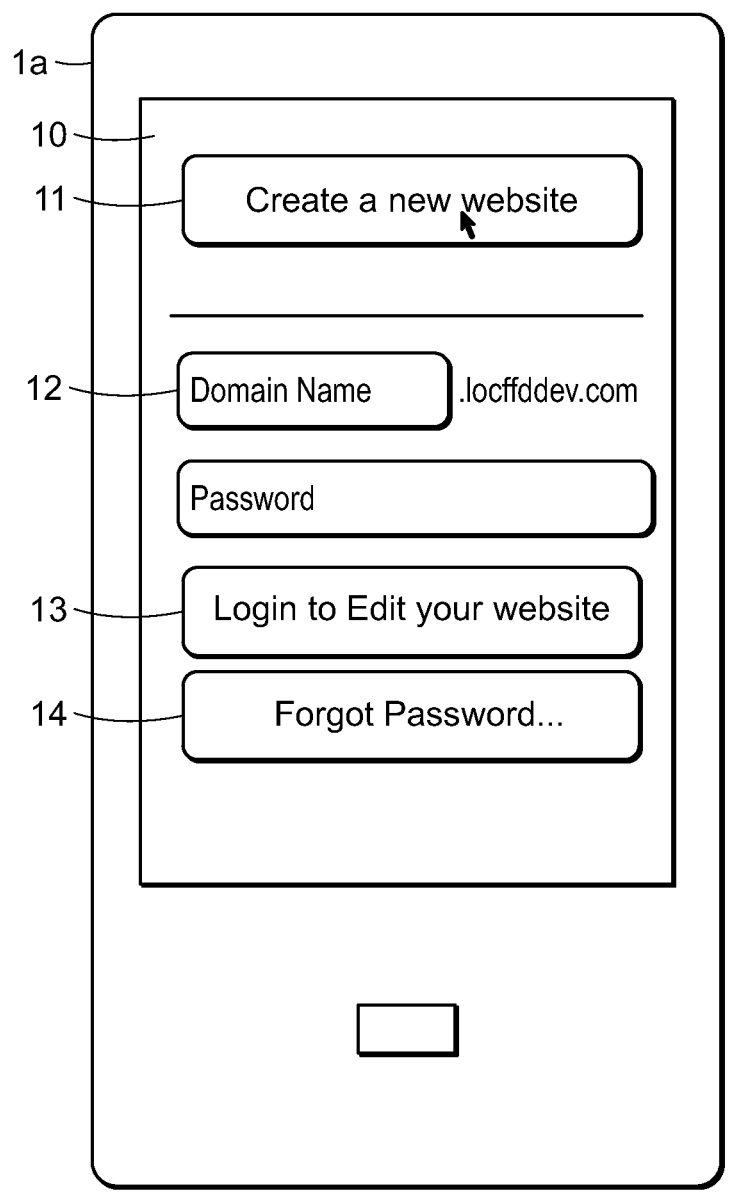

FIGS. 2-87 show representative gui screenshots when a user creates a software from a mobile device 1a. It is to be understood that the graphical user interface will generally occupy most if not all of the available screen space specific to the particular device, and that since a traditional device type includes a screen size the is typically wider than it is tall, the preview may be concurrently displayed with the editing controls in the graphical user interface. Conversely, since the screen size of a mobile device is typically taller than it is wide, the edit controls are displayed as different screens of the application separate and apart from the operational preview (which is displayed alone on a different graphical user interface screen of the application). The remainder of the description of the graphical user interface of the application 215 will be described in the context that the detected device type was a mobile device 210*b*.

As seen in FIG. 2, the design studio application 215 downloaded to the device 210*b* displays a graphical user interface 10 comprising a plurality of controls 11, 12, 13, 14. Control 11 is configured to launch a website design studio application for selecting and editing a website template. Control 12 includes a textbox for receiving user text input corresponding to a website domain name to which the website will be, or is, associated. Control 13 is a control for logging in to the website management service 202 for editing an existing website. Control 14 allows a user to recover a password for logging in to edit the website.

Figure 4:
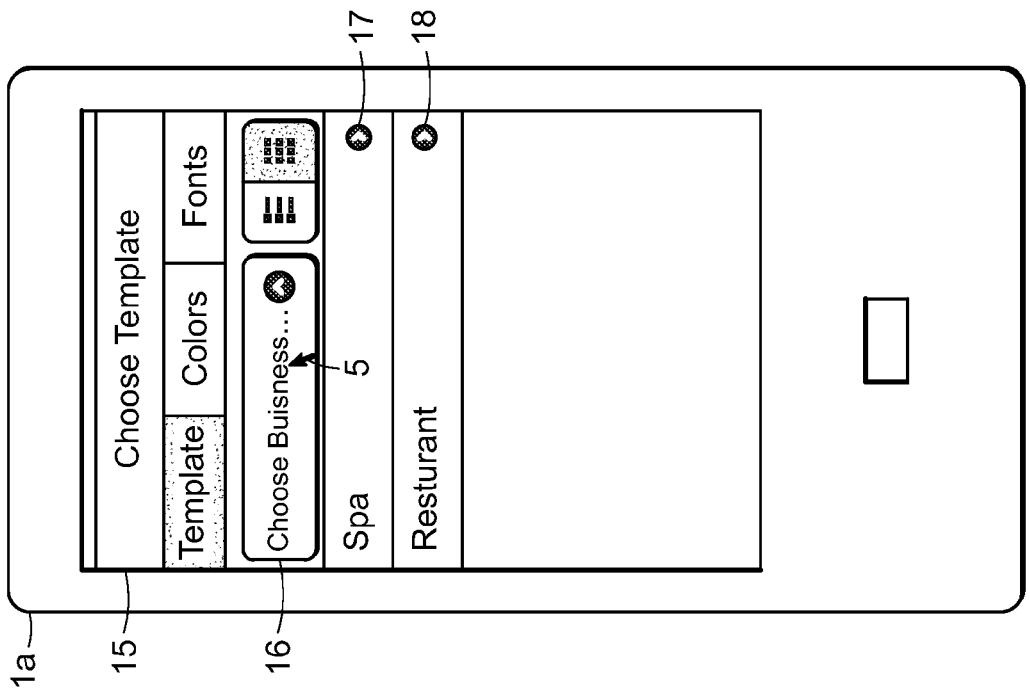
Figure 3:
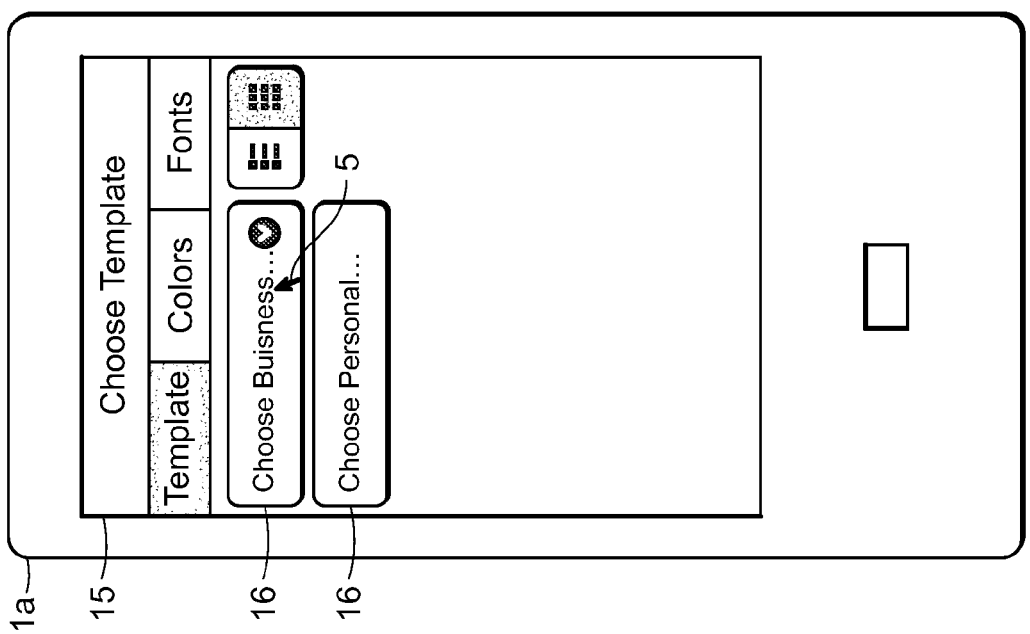
Figure 5:
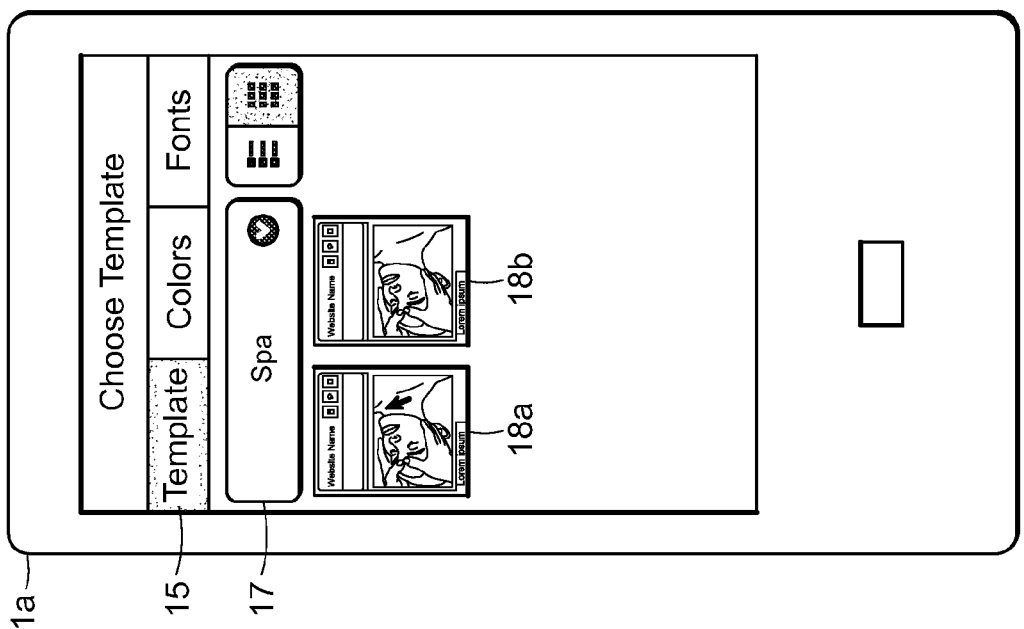

When the user clicks on the website creation control 11, the design studio application 215 displays a graphical user interface screen 15, shown in FIG. 3, including a control 16 allowing a user to select a template category. For example, the template categories may be based on a business type, and when activated by the user clicking on the control 16, the design studio application 215 may display further selection controls 17, 18 associated with different categories of business type, as illustrated in FIG. 4. The user may select a category control, for example control 17, to display a gallery of template design choices 18*a*, 18*b*, as illustrated in FIG. 5. Upon user selection of a particular template design, for example, template design 18*b*, the design studio application 215 requests the selected template from the website management service 202 on the server 201, which returns an operational preview 22 of the selected template. The preview 22 is preferably an operational version of the website design of the selected template, containing a plurality of web pages and associated web page assets including sample text, and one or more images, a color scheme, a font scheme, page layouts associated with the selected template. The preview 22 comprises a browser-renderable page which includes operational links to other browser-renderable pages of the previewed website template. The preview page 22 is rendered within a graphical user interface preview page 20 which includes the previewed web page 22 along with a control 21 for moving to the website editing control home page, and a control 19 to close the preview 22 to return to the graphical user interface screen that was previously being viewed.

Figure 6:
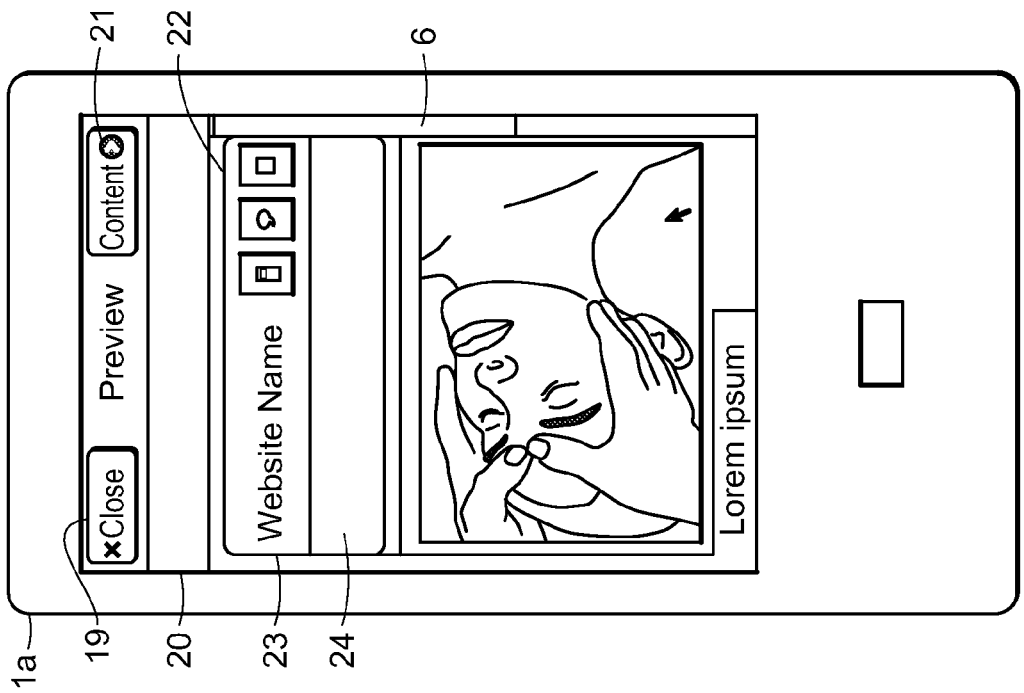
Figure 8:
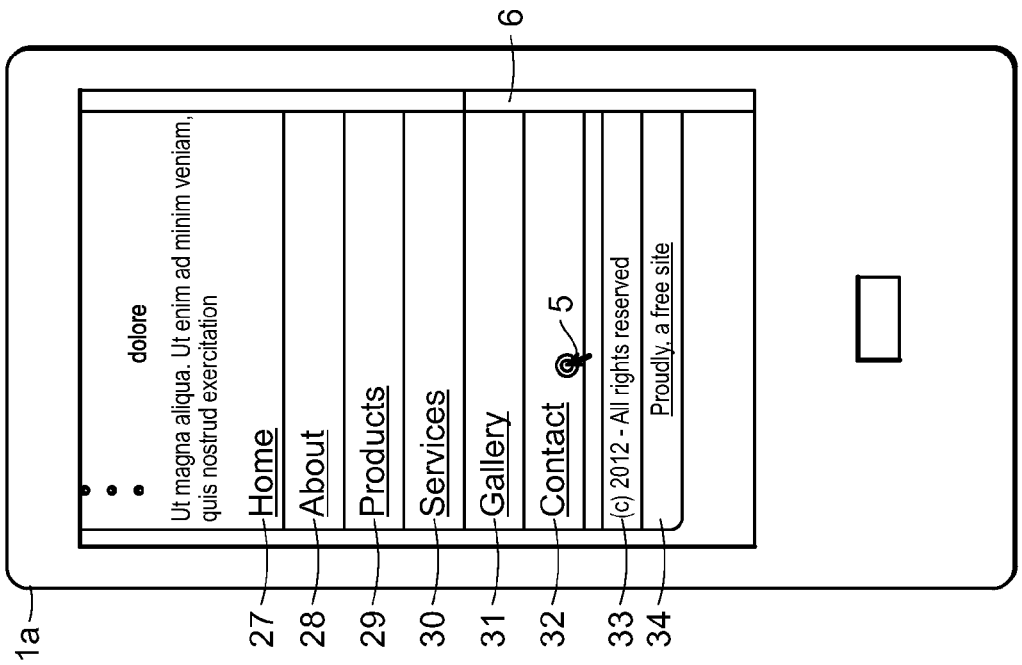
Figure 7:
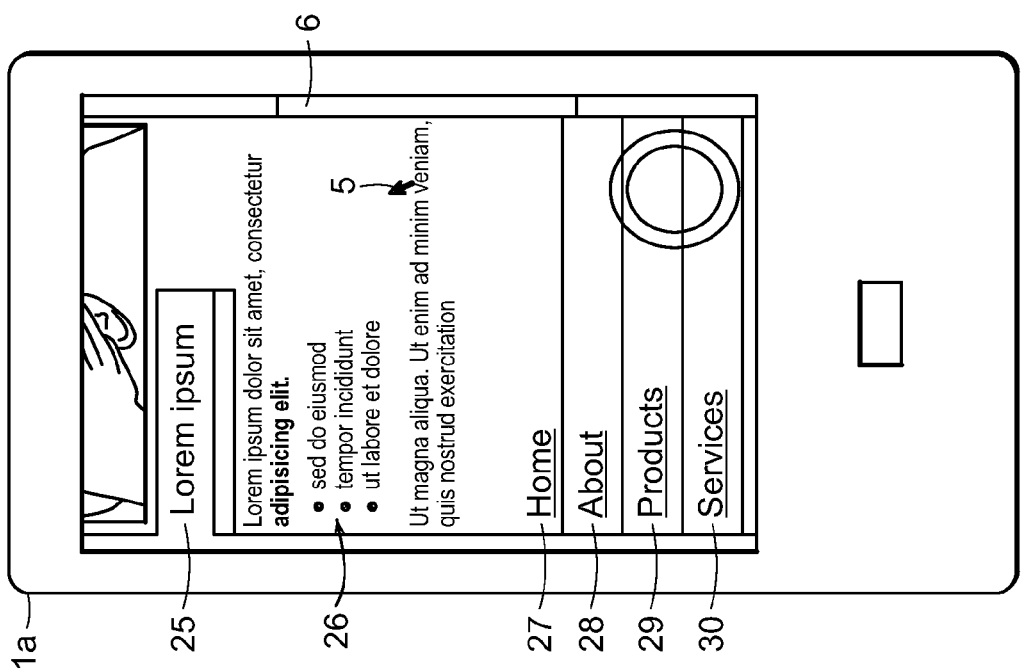

As illustrated in FIGS. 6 through 8, which show the preview 22 of the home page when the display shows the top of the page 22 (FIG. 6), the middle of the page (FIG. 7), and the bottom of the page (FIG. 8), viewed by the user by scrolling the page using a scroll control 6 on the graphical user interface. As shown, the preview 22 itself includes a header area having a website title 23 and a header image 24. The preview 22 further includes home page content 25 and 26, best viewed in FIG. 7, and links 27 through 32 to other preview pages of the preview website. The preview 22 also includes a footer area, best seen in FIG. 8, including one or more of a copyright notice 33, a message 34, etc.

Figure 9:
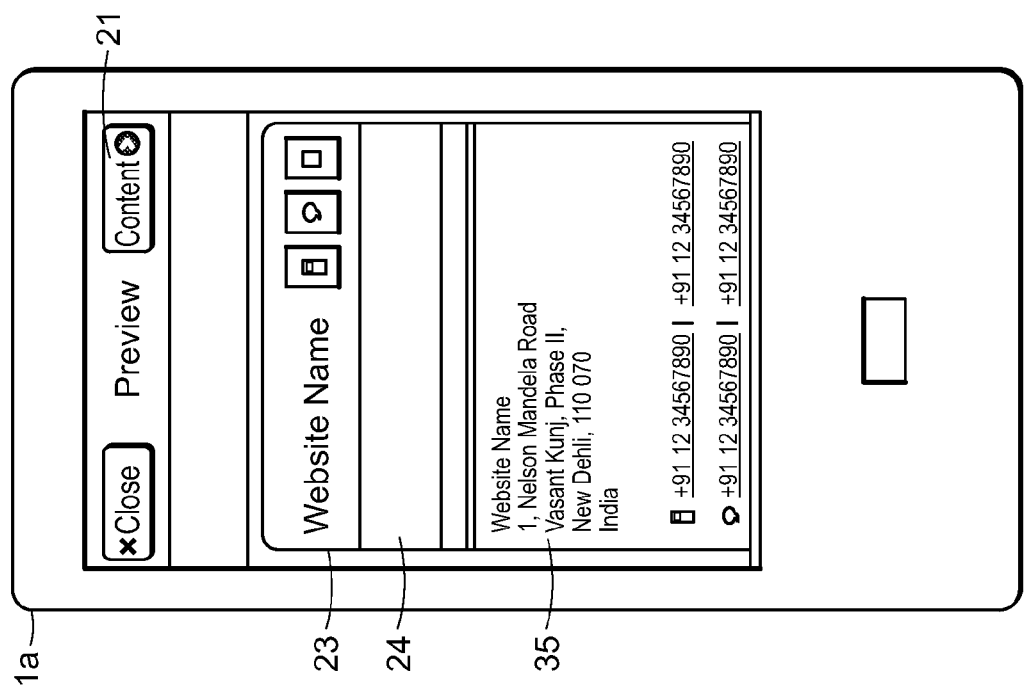

The preview 22 is operational. Thus, if the user clicks on one of the page links 27 through 32, the preview page associated with the selected link is then displayed in the preview area 20 of the graphical user interface. Thus, for example, if the user clicks on the Contact link 32, shown in FIG. 8, the preview Contact page is loaded into the preview area 20 of the graphical user interface, as illustrated in FIG. 9.

Figure 10:
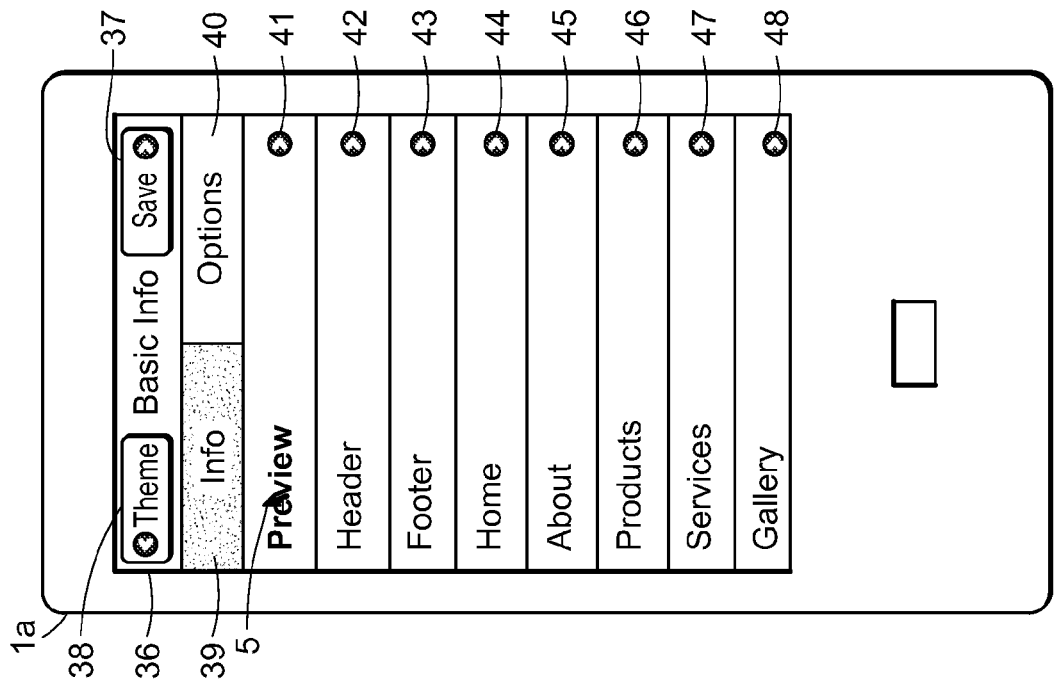

When the user desires to edit one or more components of the website, the user clicks on the edit content control 21, causing the design studio application 215 to display the website editing control home page 36 on the display of the device, as shown in FIG. 10. As illustrated, the website editing control home page 36 includes an information tab 39 which includes a plurality of controls 41-49 (FIGS. 10 and 11) to respectively bring up the editing controls for different sections or pages of the website. An options tab 40 (FIG. 10) is included, discussed hereinafter. The website editing control page 36 also includes a control 38 (FIG. 10) for going back to the page(s) for changing the theme (comprising the template, colors, and font scheme). Additionally, the website editing control page 36 includes a control 37 (FIG. 10) for saving the present state of the website.

Figure 12:
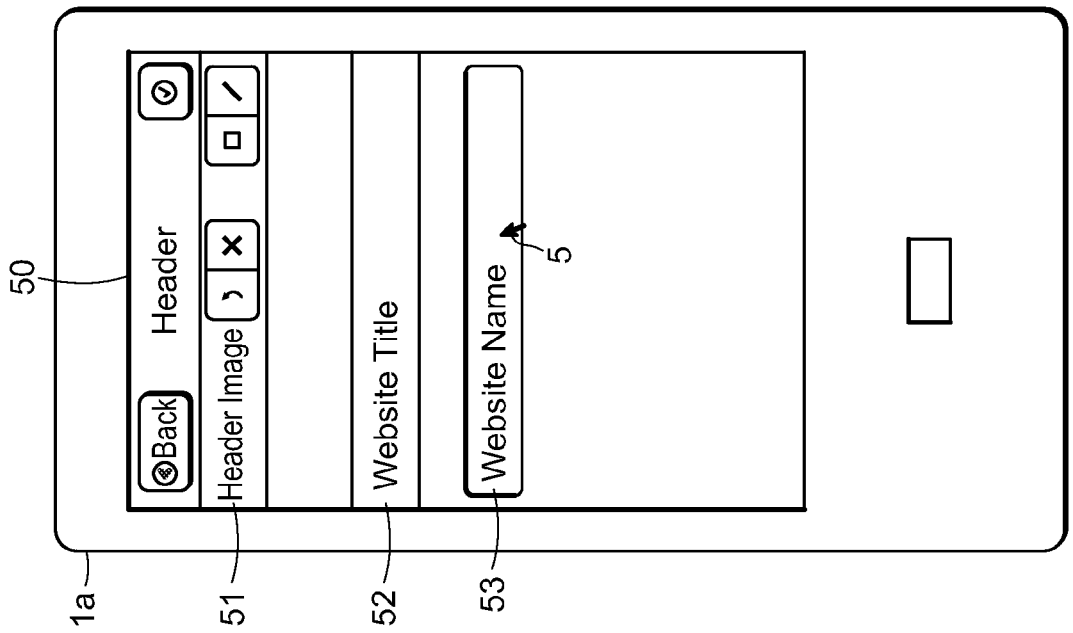
Figure 11:
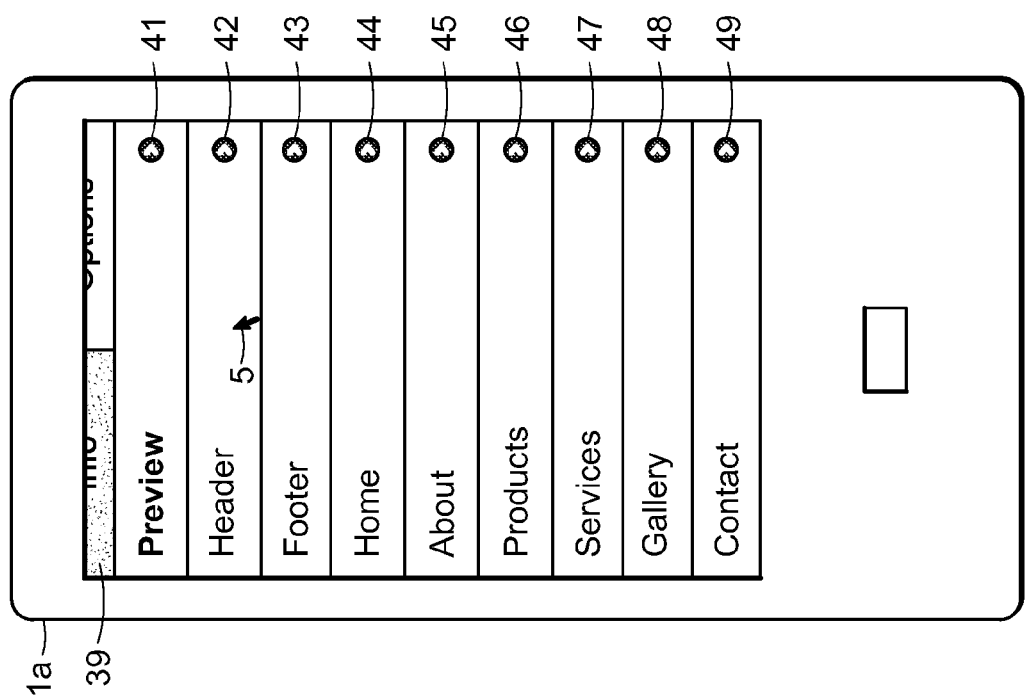
Figure 14:
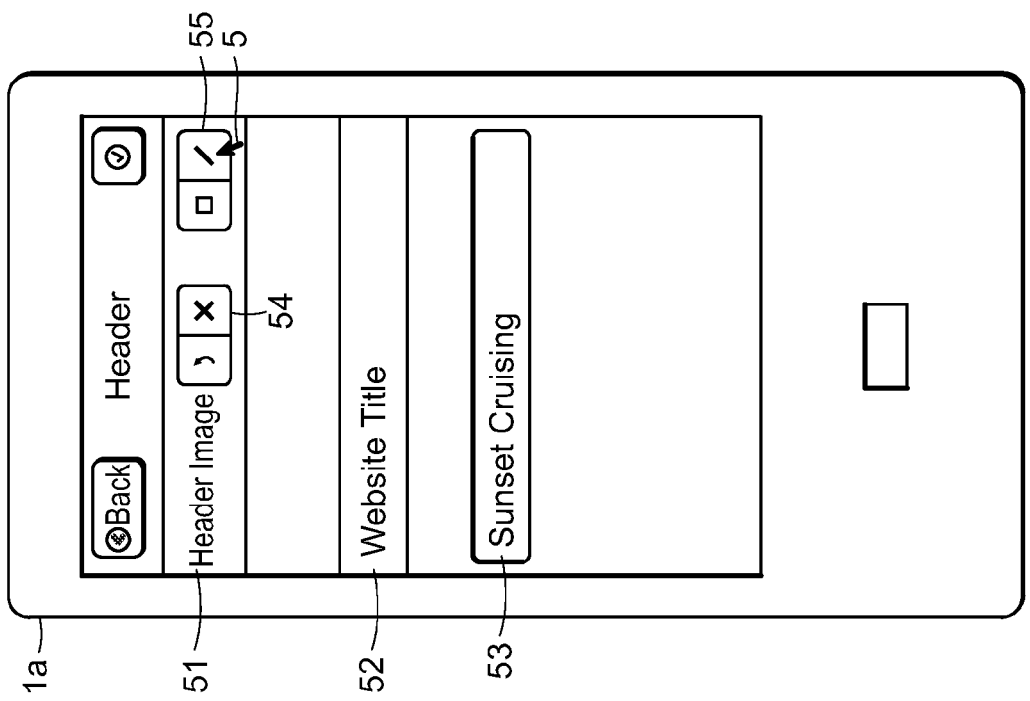
Figure 13:
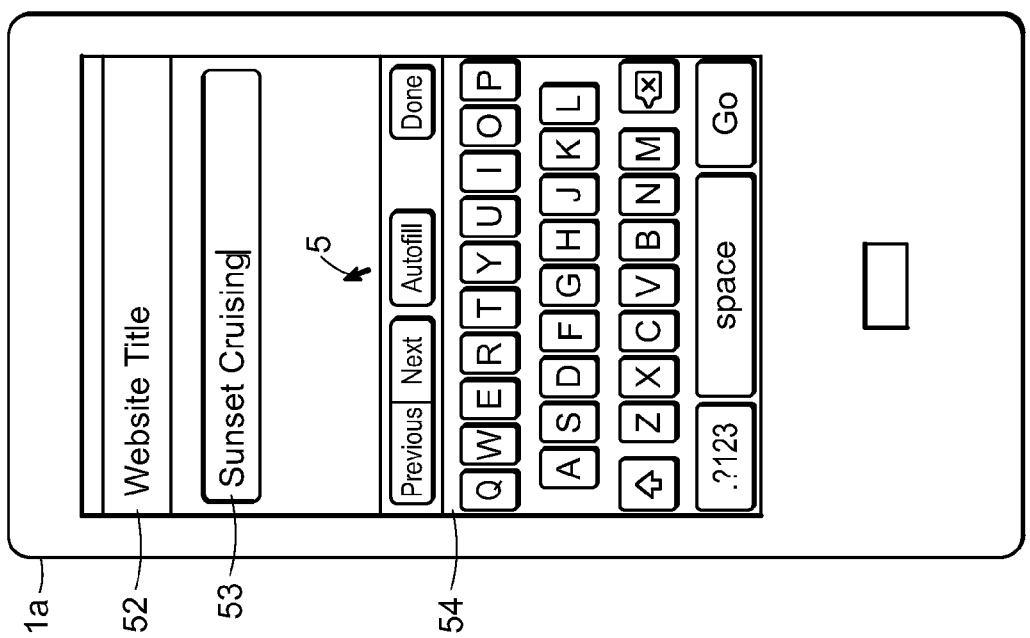

FIG. 11 shows the cursor 5 clicking on the header control 42, which results in the display of the header edit control page 50, shown in FIG. 12, which includes a header image editing control 51, a website title editing control 52, and a website naming control 53. When the user clicks on the website title editing control 52, a title text box 53 is displayed, as shown in FIG. 13, along with a text entry mechanism 54, such as a touch keyboard, allowing the user to enter the text which shall serve as the website title or Header text (FIG. 14). In general, the Header appears at the top of every web page in the website, although this is not necessarily required if the template is designed otherwise.

Returning to the header edit control page 50, when the user clicks on the edit image control 55 in FIG. 14, one or more display screens may be displayed or sequenced through to allow a user to search, select, and/or upload an image to be used as the header image. Depending on the functionality of the particular device 210, the user may or may not be allowed to upload an image. Image upload capability may depend on the capability and configuration of the particular device. Generally, traditional computing devices can upload images, whereas image uploading by a mobile device may depend on the type of transmission channel or protocol.

Figure 16:
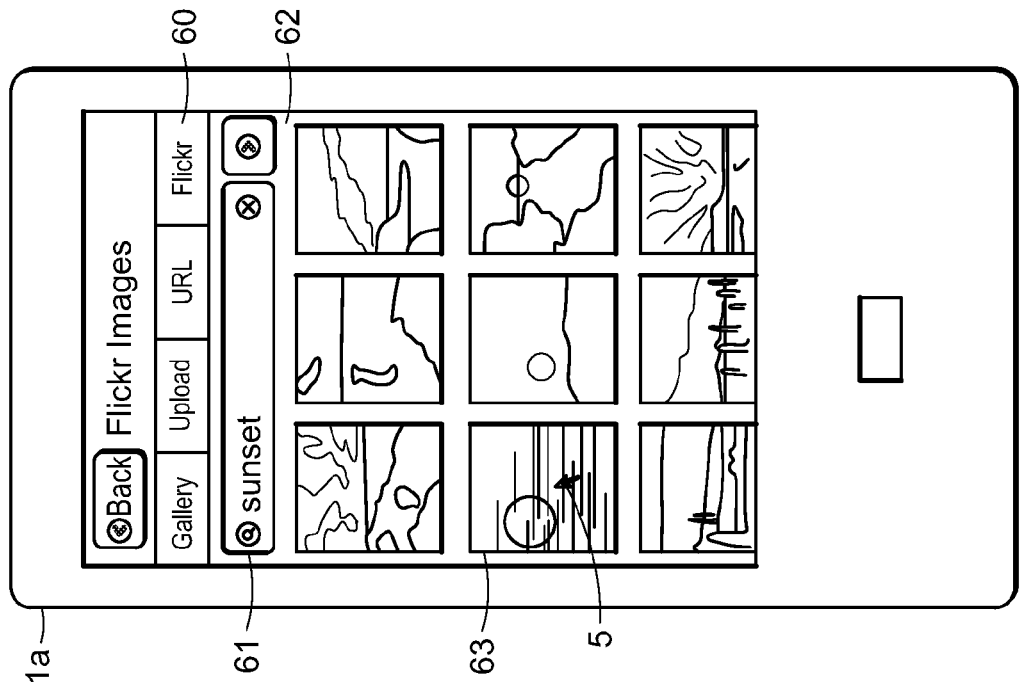
Figure 15:
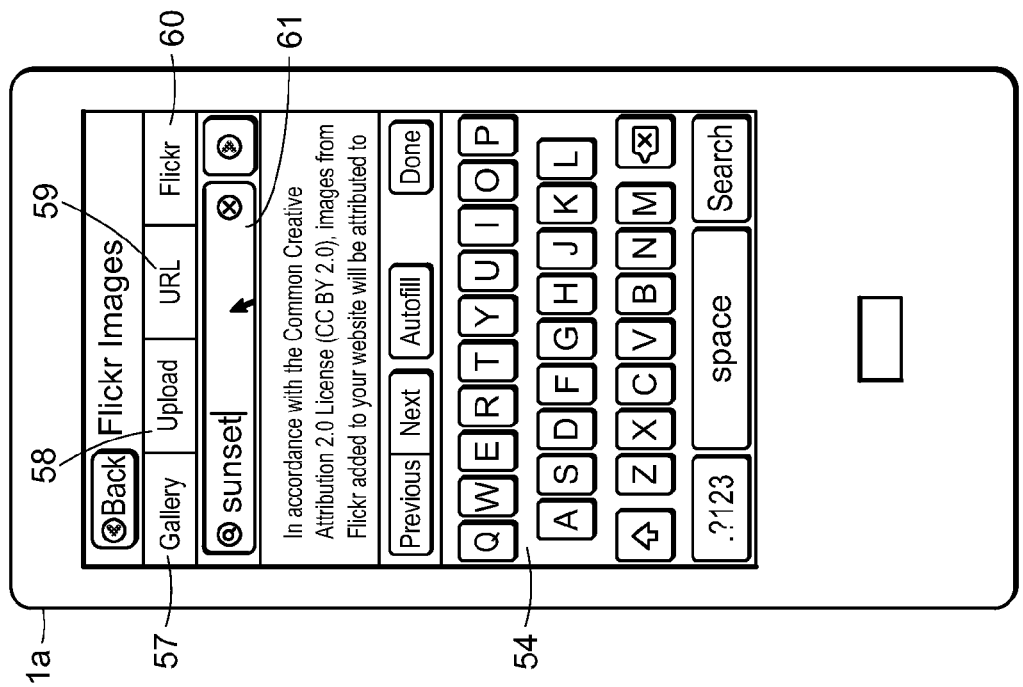
Figure 18:
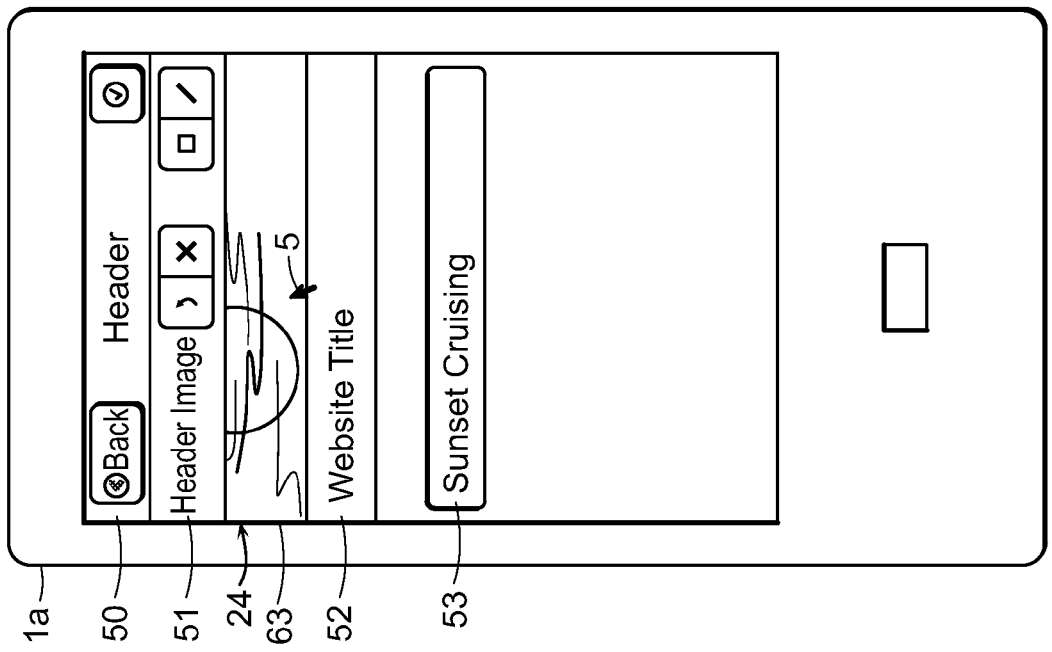
Figure 17:
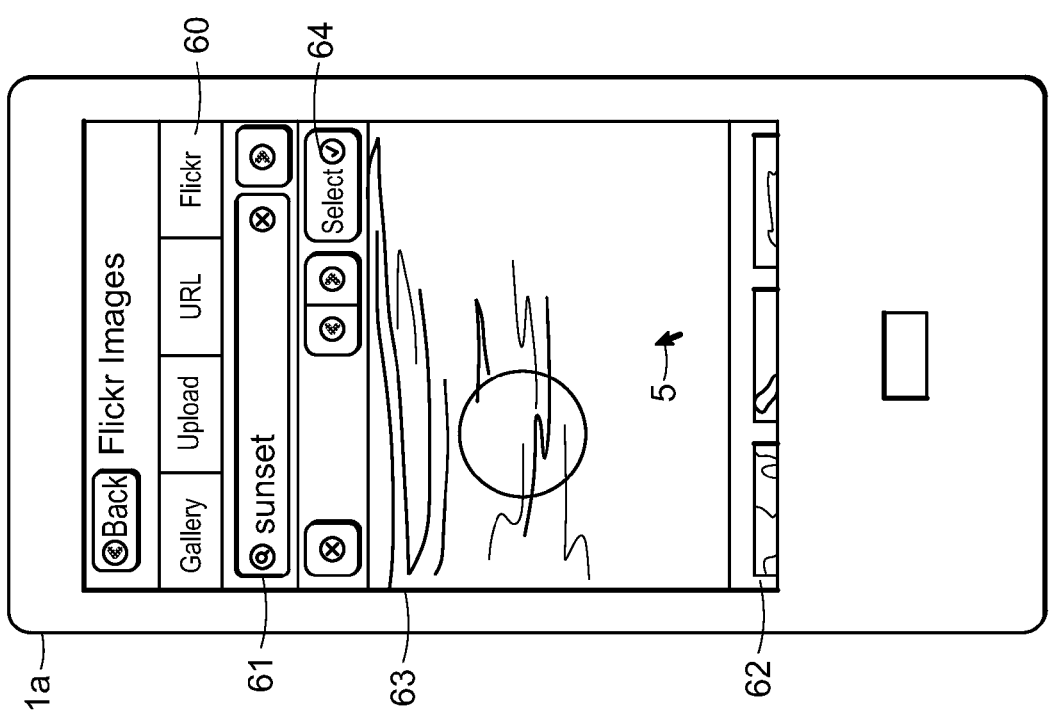
Figure 20:
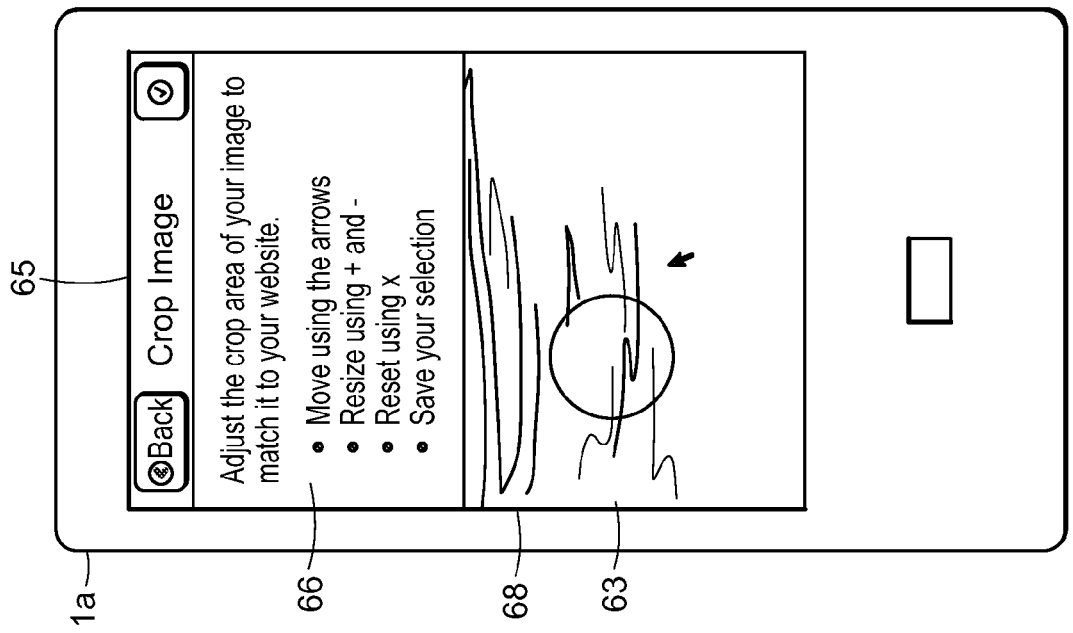
Figure 19:
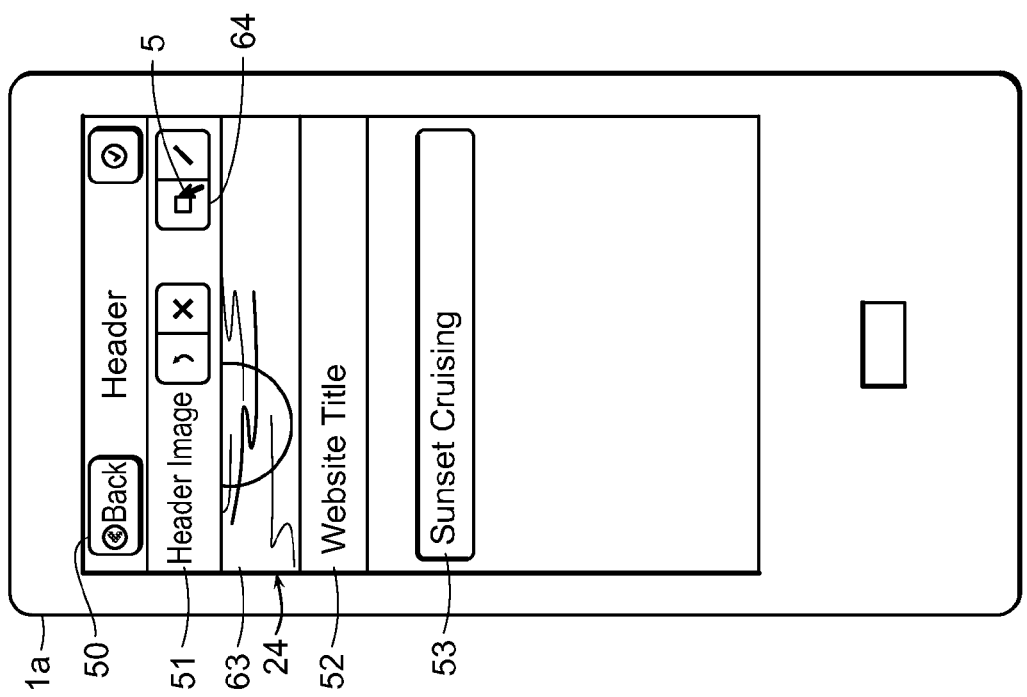
Figure 22:
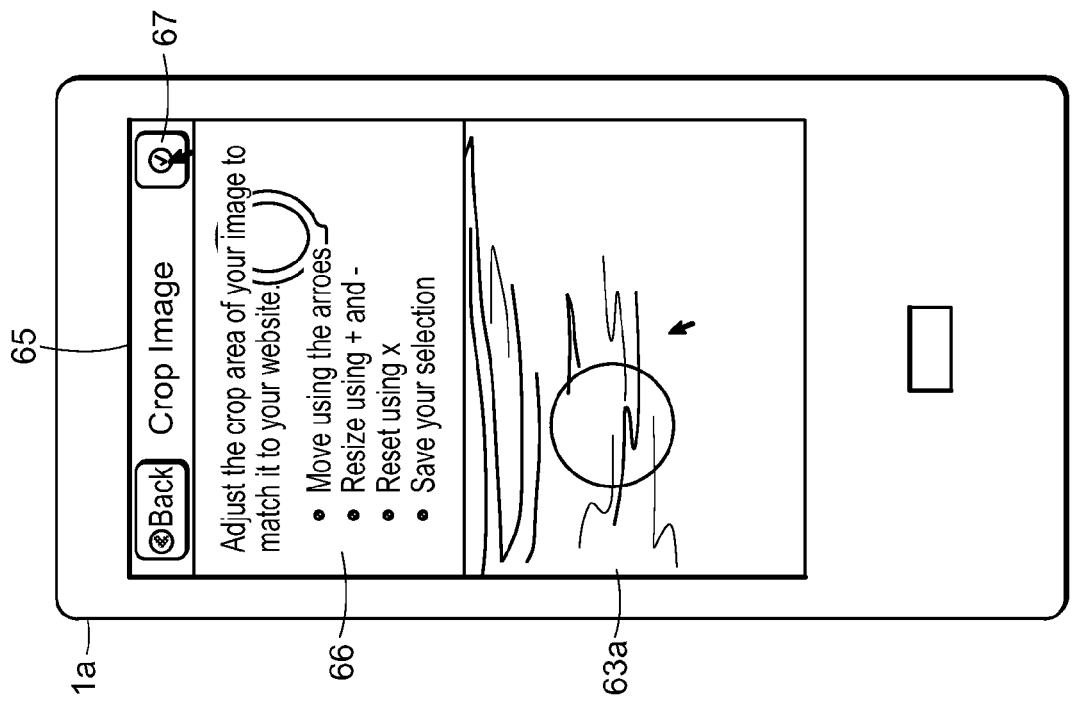
Figure 21:
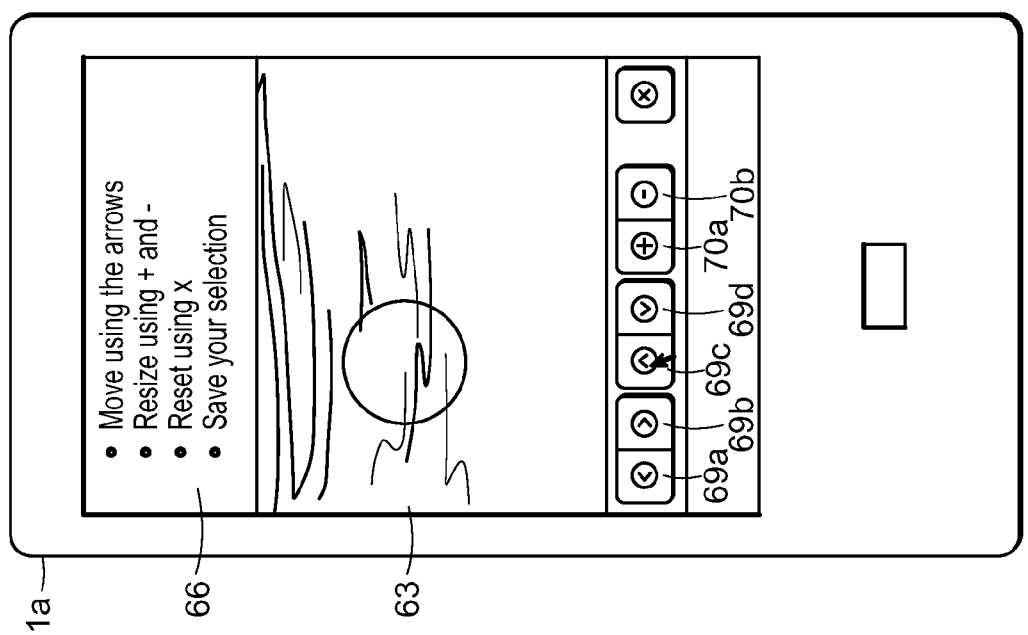
Figure 24:
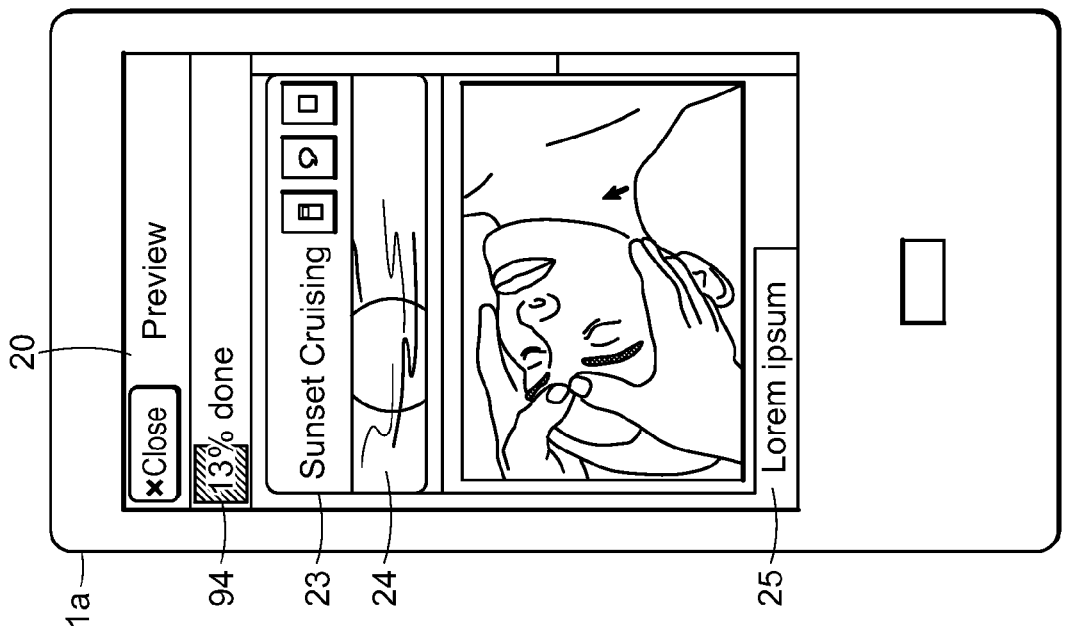
Figure 23:
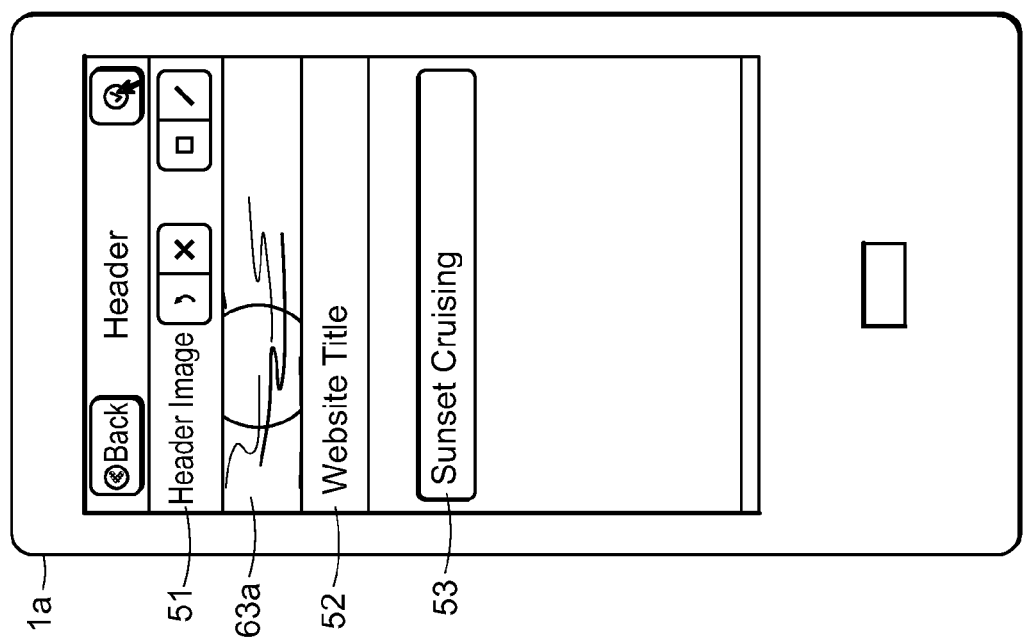

FIG. 15 shows the user searching for images associated with the word "sunset" in a $3^{rd}$ party image gallery service such as Flickr. Images may be obtained from a Gallery maintained by the website management service 202 (gallery tab 57), or may be uploaded (if uploading is enabled) (upload tab 58), or found by typing a Universal Resource Locator (URL) (URL tab 59), or by accessing a $3^{rd}$ party service, for example Flickr tab 60. The search control includes a text box 61 for receiving user inserted text, inserted by ways of the text entry control 54. As illustrated in FIG. 16, upon entry of a keyword (in this example, the word "sunset") as entered into the search text box 61, a gallery 62 of images tagged to the keyword is displayed. The user can select a particular image 63 by clicking on the thumbnail image in the gallery 62 with the cursor 5 to view the image in a larger format and in higher resolution than the thumbnail image, for example as shown in FIG. 17. If the user is satisfied with the selection, the user indicates this by clicking on the select button 64, which causes the design studio application 215 to automatically crop the image to the size of the header image container and load the cropped image 63 into the header image container 24, as shown in FIG. 18. If the user does not prefer the automatic cropping performed by the design studio application 215, the user can select a crop tool 64, as indicated where the cursor 5 is clicking in FIG. 19, which brings up a cropping control page 65, shown in FIGS. 20-22. The cropping control includes instructions 66 which indicate to the user how to change the current cropping of the image 63 which is presented in image area 68. For example, in the illustrative embodiment, the cropping controls include arrow buttons 69*a* through 69*d* for moving the position of the image relative to a cropping indicator. The cropping indicator has the same aspect ratio as the header image container, and any image content located within the cropping indicator will appear as the header image. FIG. 21 shows the image position controls 69*a*-69*d*, along with image zoom controls 70*a*, 70*b*. When the user is satisfied with the cropping of the image, as indicated at 63*a* in FIG. 22, the user clicks on the Done button 67. The header editing control then displays the current state of the header (see FIG. 23), including the selected header image 63*a* and selected website title 53. When done, the user can request a preview 20, shown in FIG. 24, which shows the updates applied to the header.

Figure 25:
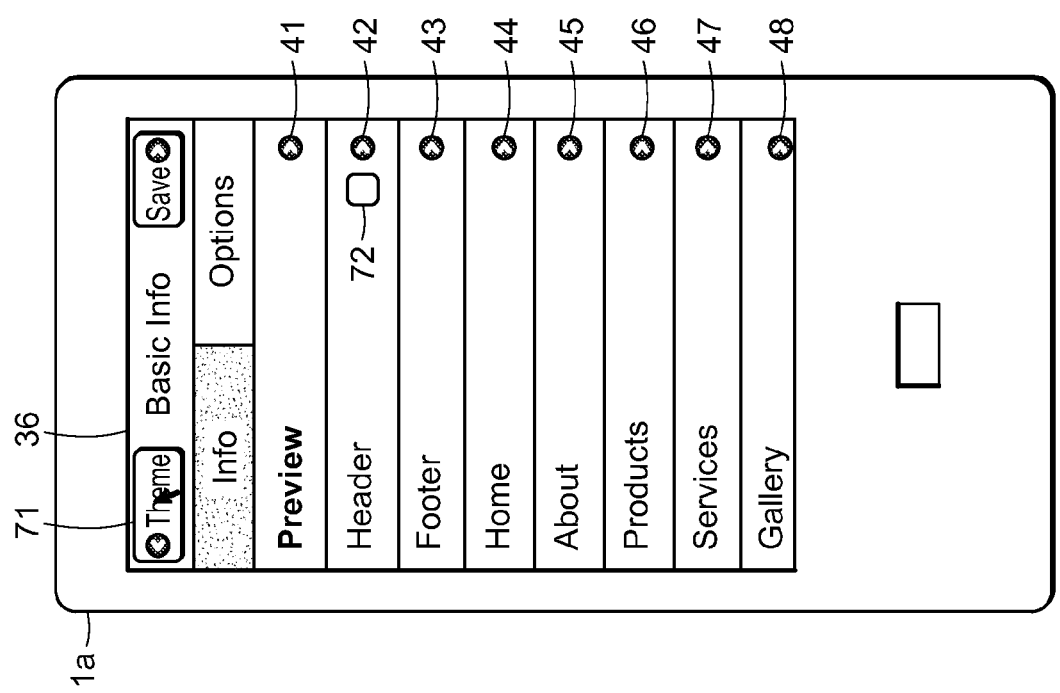

Returning to the website editing control page 36, shown in FIG. 25, the header control 42 includes a completion indicator 72 indicating that the header has been edited and is complete. The user can click on another section control 43 through 48 to continue editing additional sections, or can made changes to thematic aspects of the website by clicking on the Theme control 71.

Figure 26:
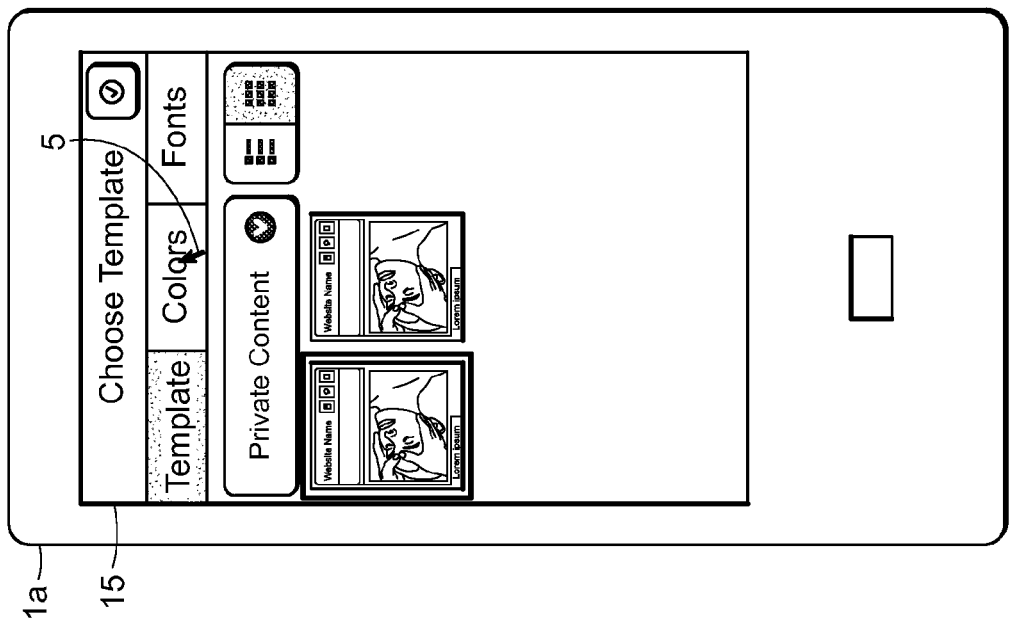
Figure 28:
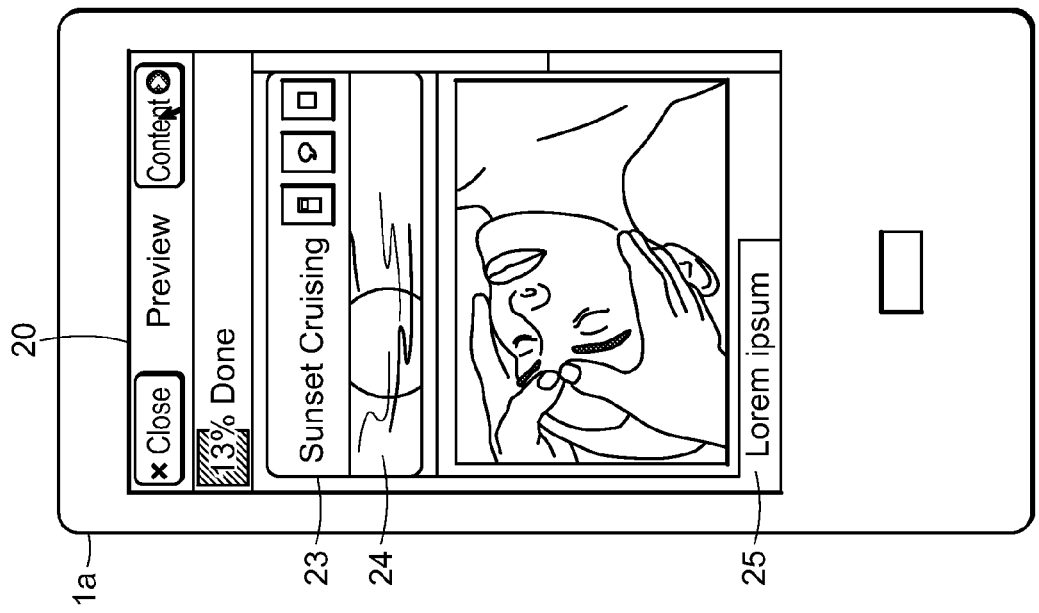
Figure 27:
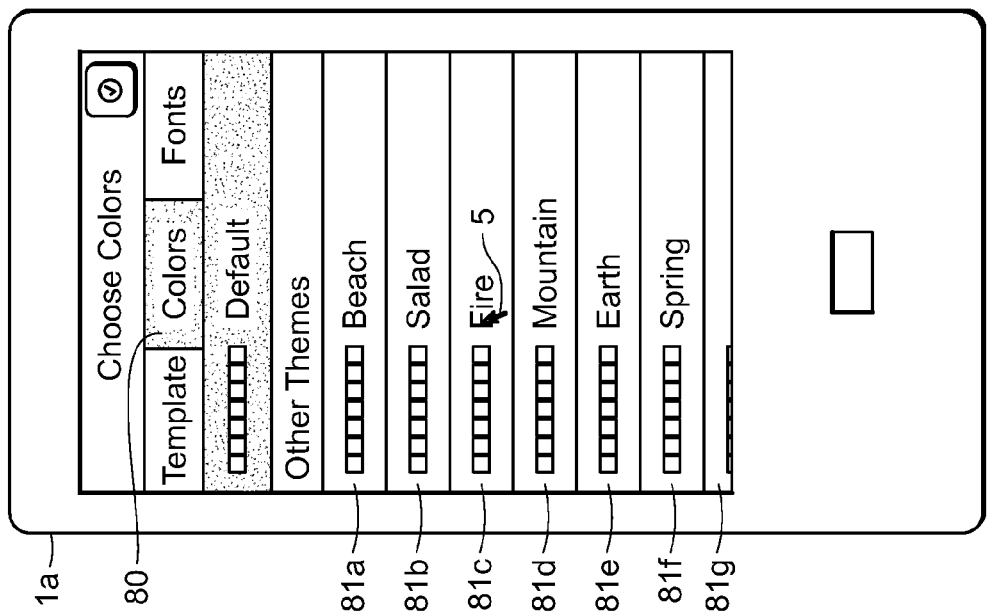

FIG. 26 shows the graphical user interface displayed to the user upon selection of the Theme control 71, and FIG. 27 shows the display upon selection by the user of the Colors tab 80. The Colors tab 80 displays a plurality of different color schemes and associated controls 81*a*-81*f*. Upon selection of a control 81*c* of a different color scheme, and then request of a preview, the preview 22 is displayed to the user, as shown in FIG. 28, which shows the website with the updated color scheme.

Figure 30:
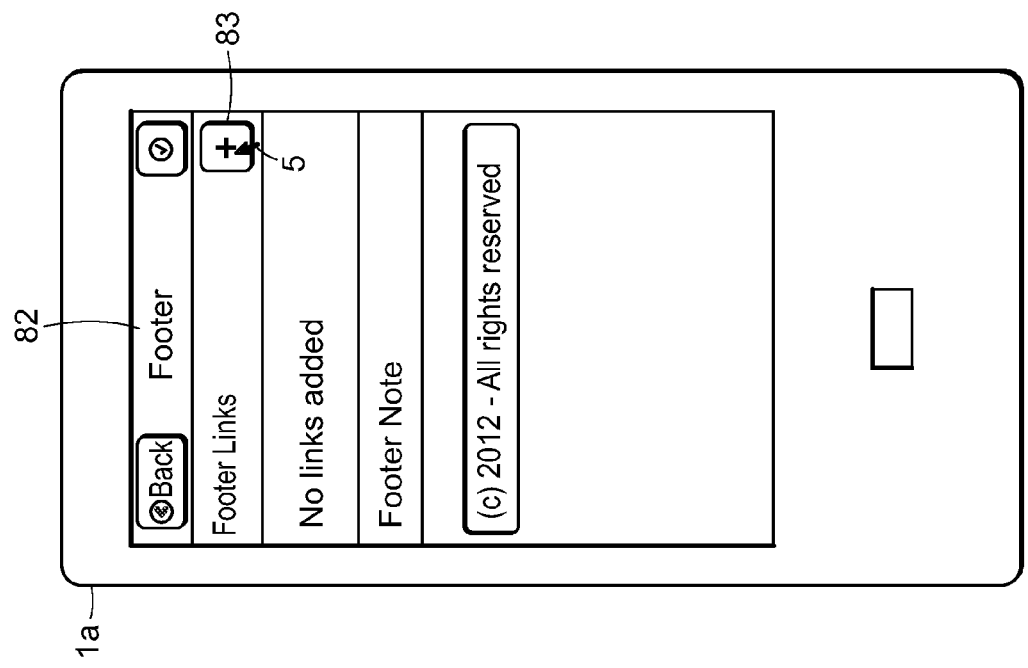
Figure 29:
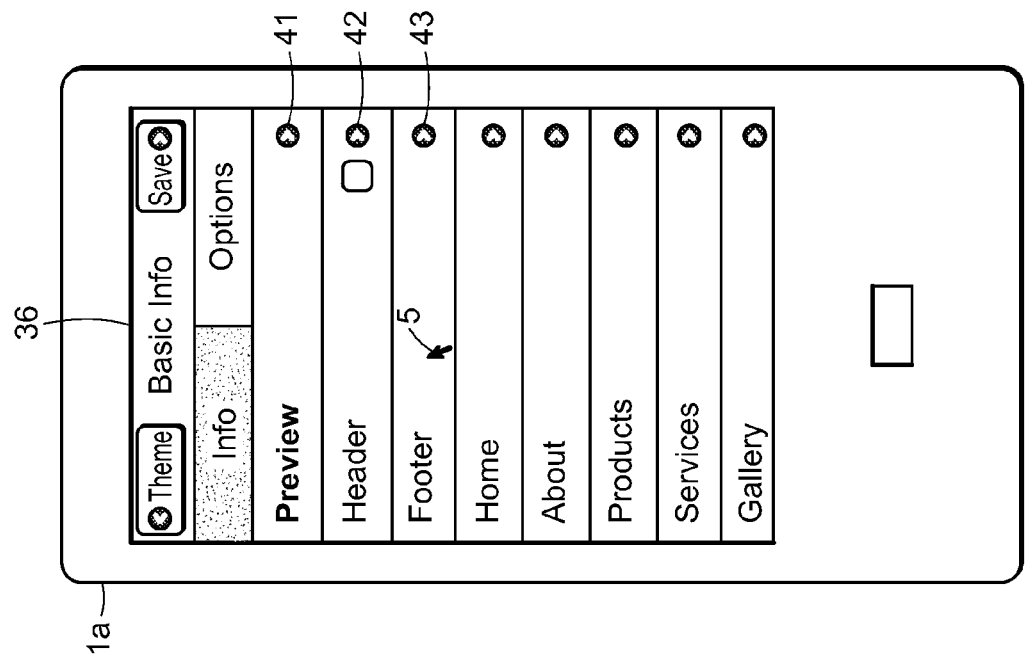
Figure 32:
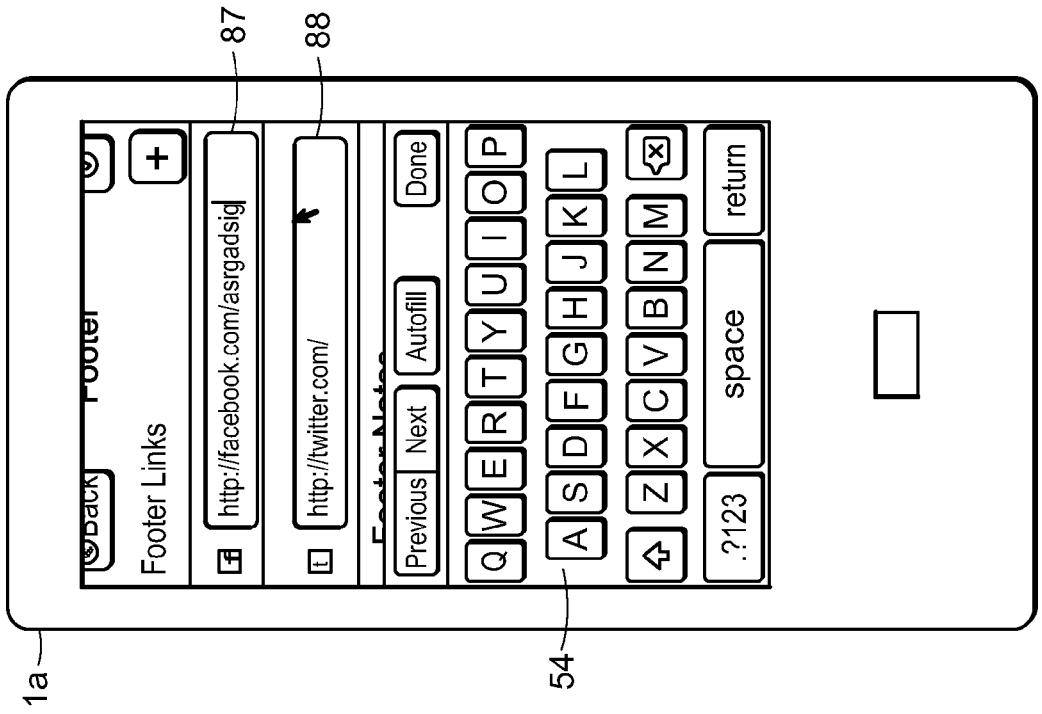
Figure 31:
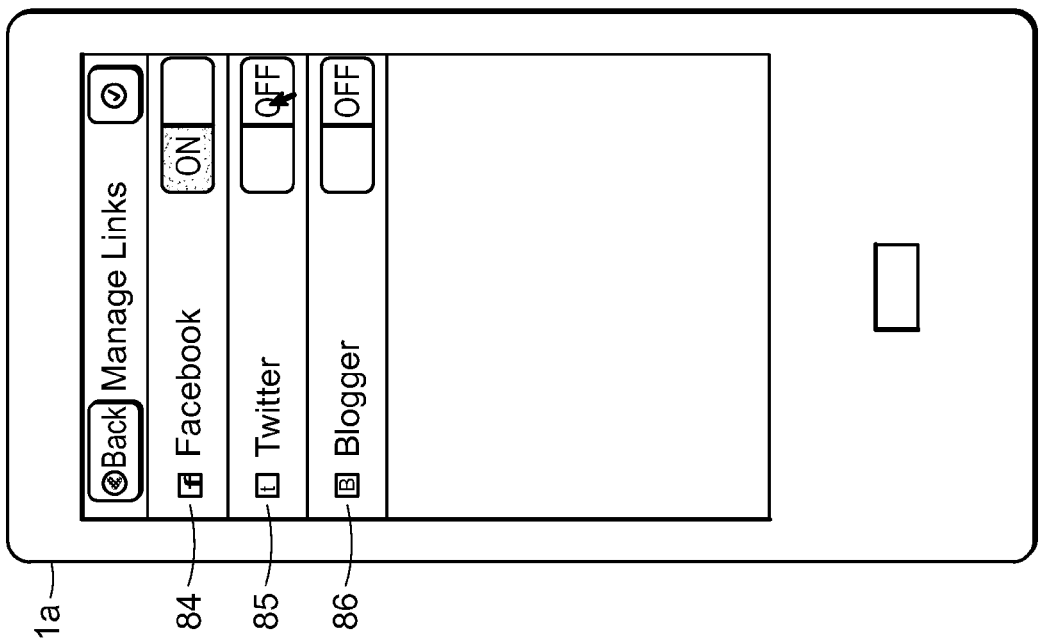
Figure 33:
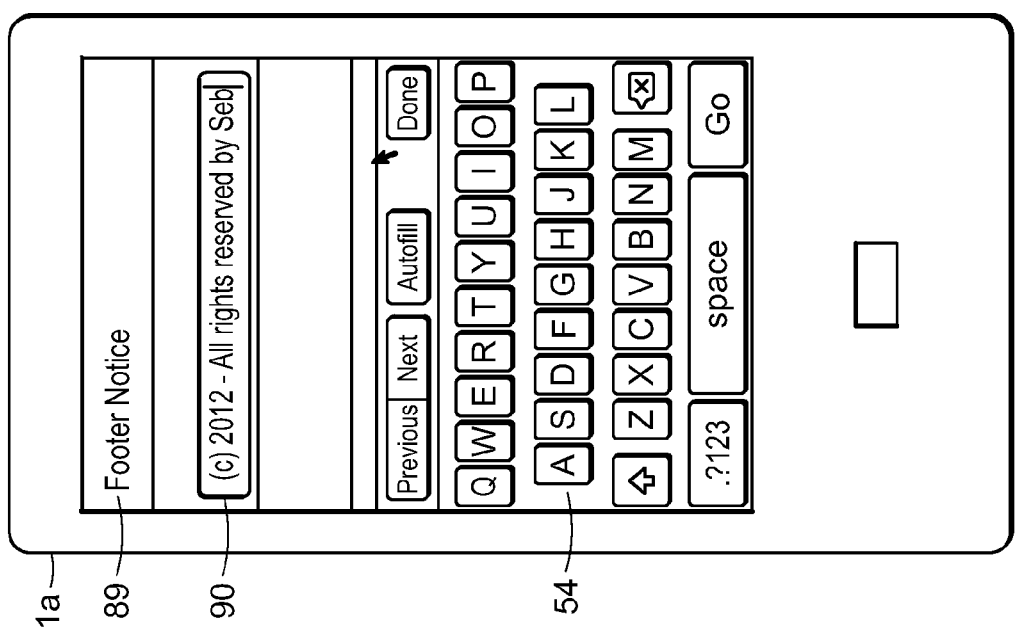

Returning to the website editing control page 36, shown in FIG. 29, the user can click on another section control, for example on the footer control 43 as indicated by the position of the cursor 5 on the control 43. The footer editing control page 82 is then presented to the user, as shown in FIG. 30. In one embodiment, the footer controls include a Links control 83, which when activated as indicated in FIG. 31, brings up controls 84-86 for fuming on or off various respective social media control links (e.g., Facebook, Twitter, Blogger). Social media account information can be entered into text box controls 87 and 88, using the text entry control 54, as shown in FIG. 32. Returning to the footer editing control page 82 in FIG. 33, the user can also activate a looter notice control 89, which may have an associated text box 90. The user may enter text in the box 90 using the text entry control 54.

Figure 34:
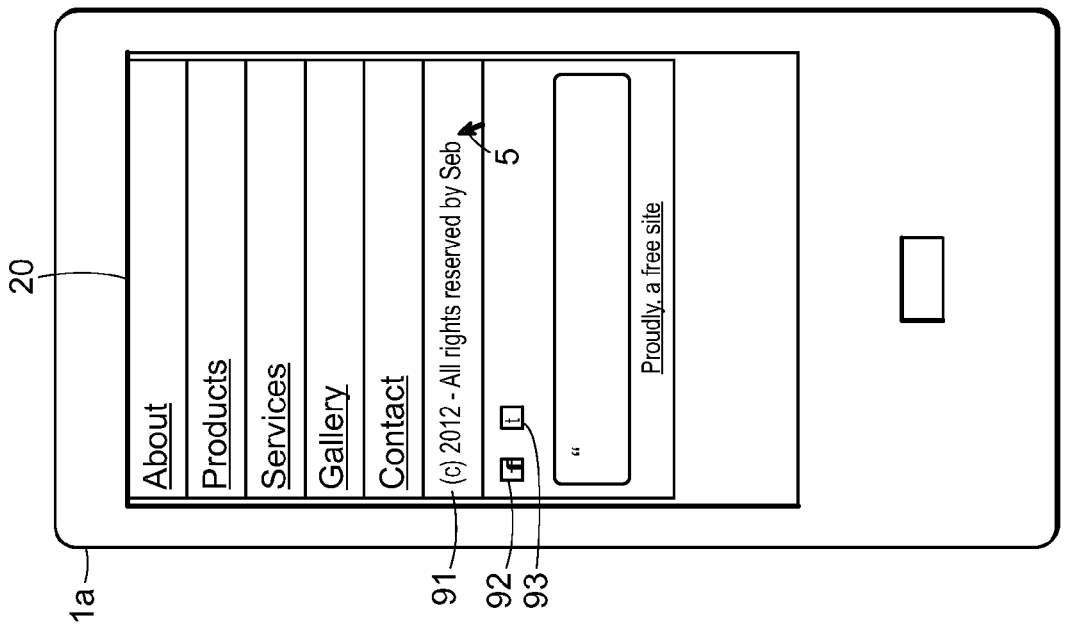
Figure 35:
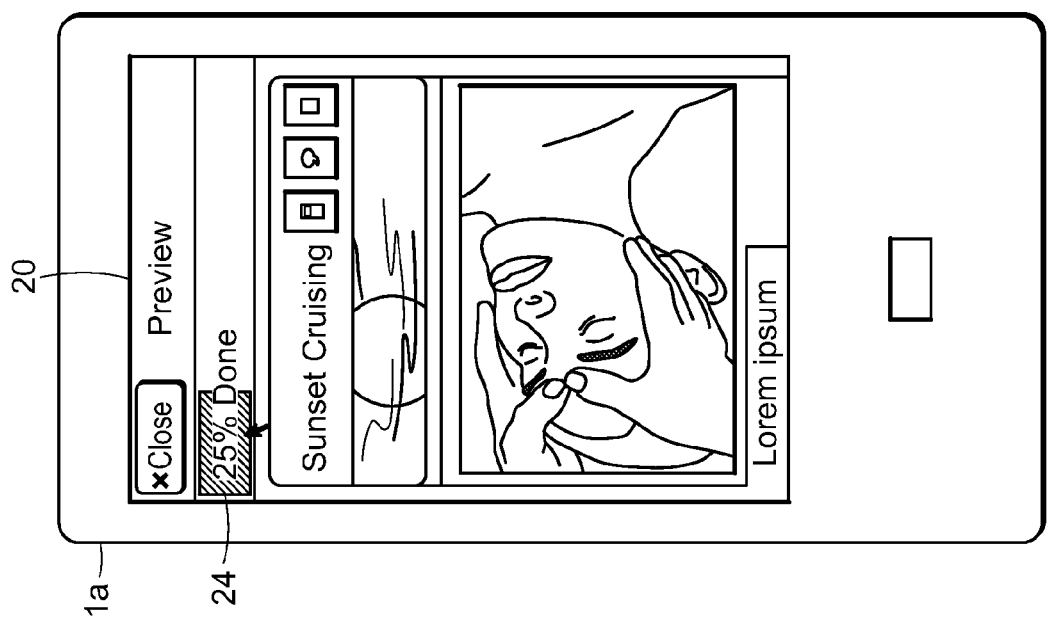

Upon completion of the footer editing, the user can again request a preview 20, shown in FIG. 34 where one can view the updated footer containing the copyright notice 91 and links 92 and 93. The preview may also include a progress indicator 94, shown in FIG. 35.

Figure 36:
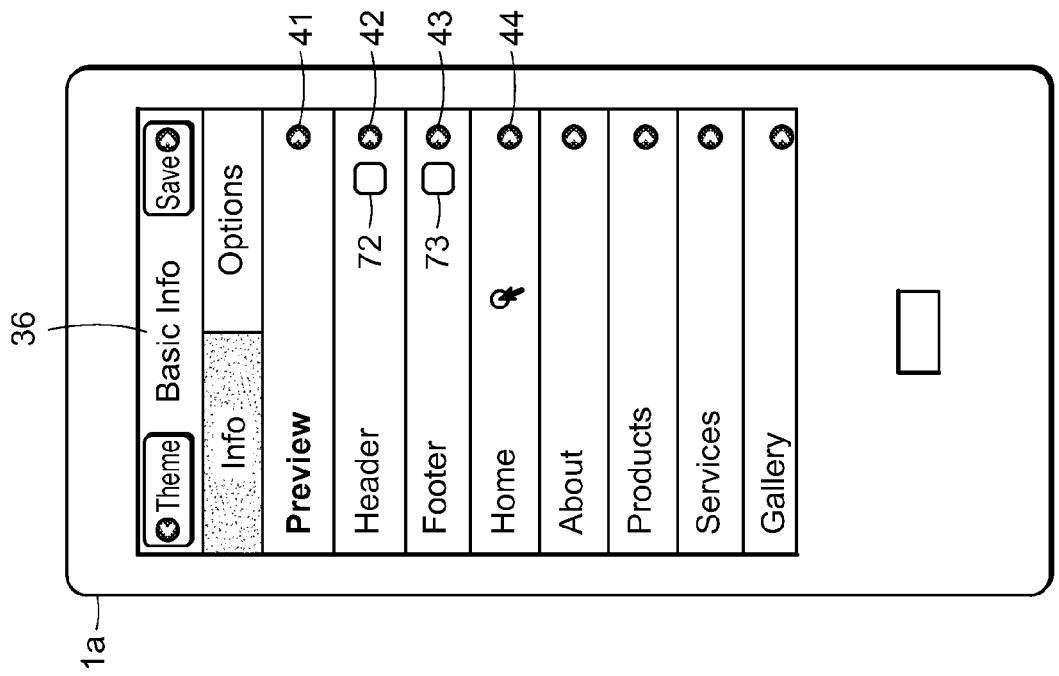
Figure 38:
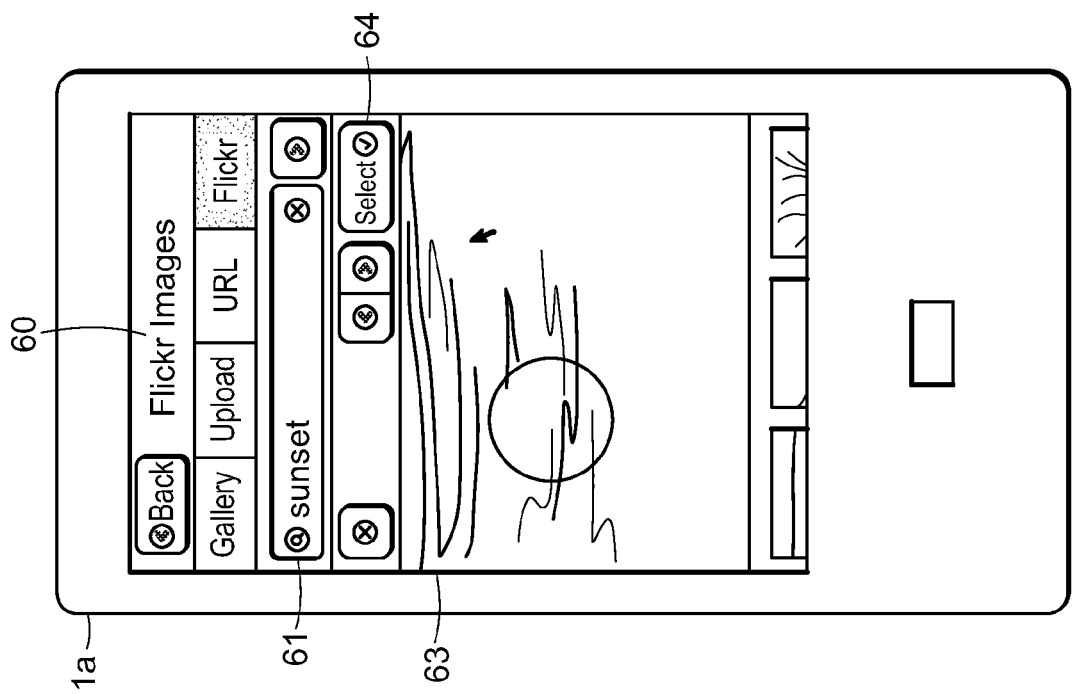
Figure 37:
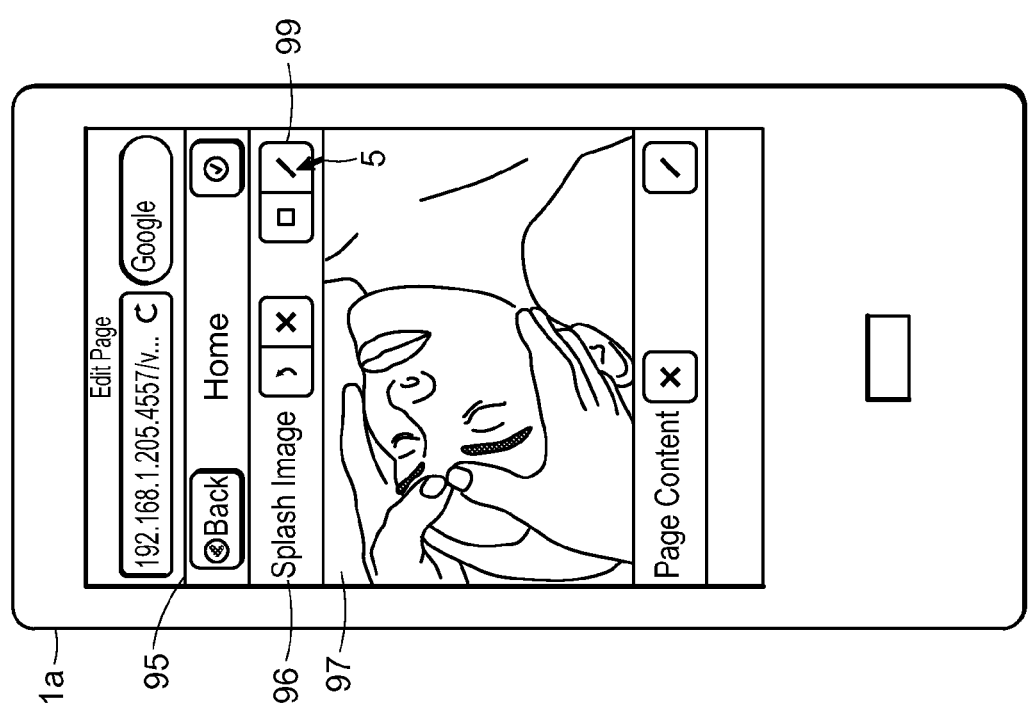
Figure 40:
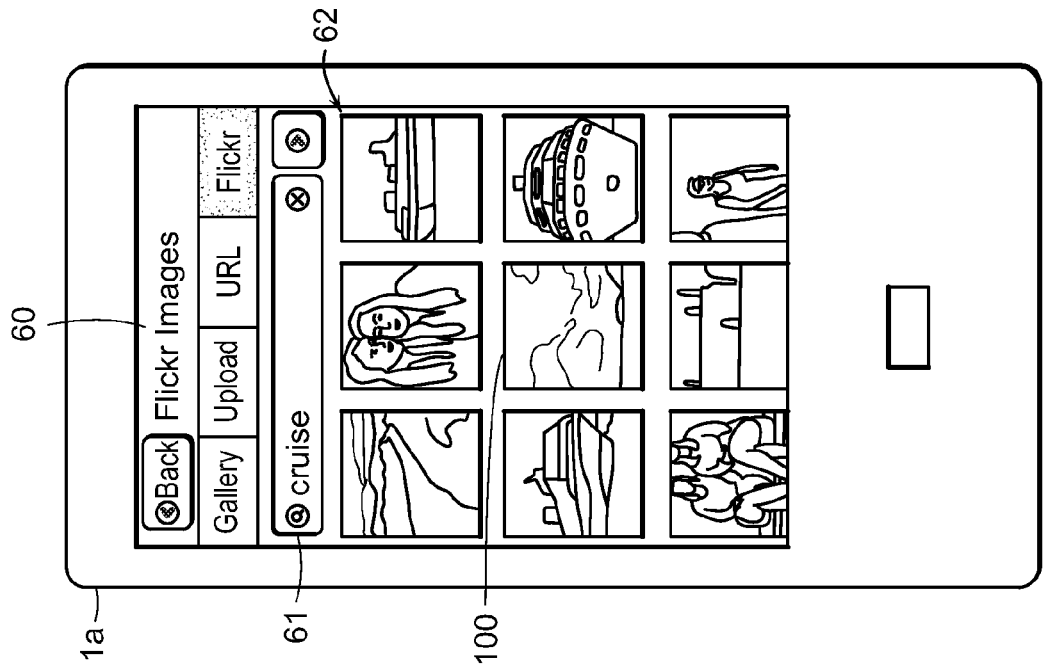
Figure 39:
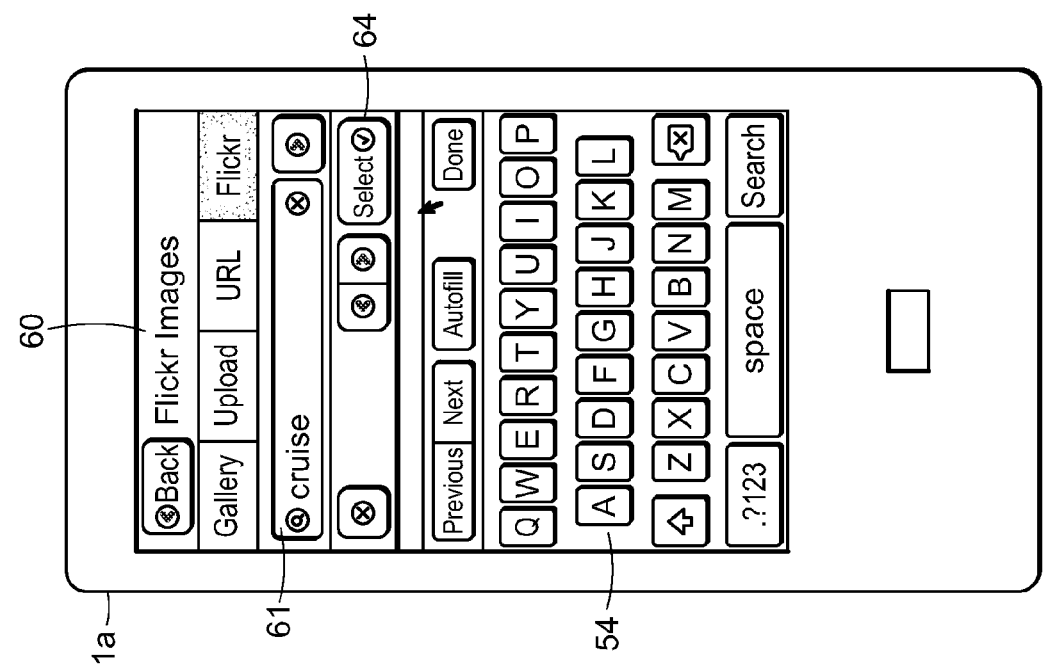
Figure 42:
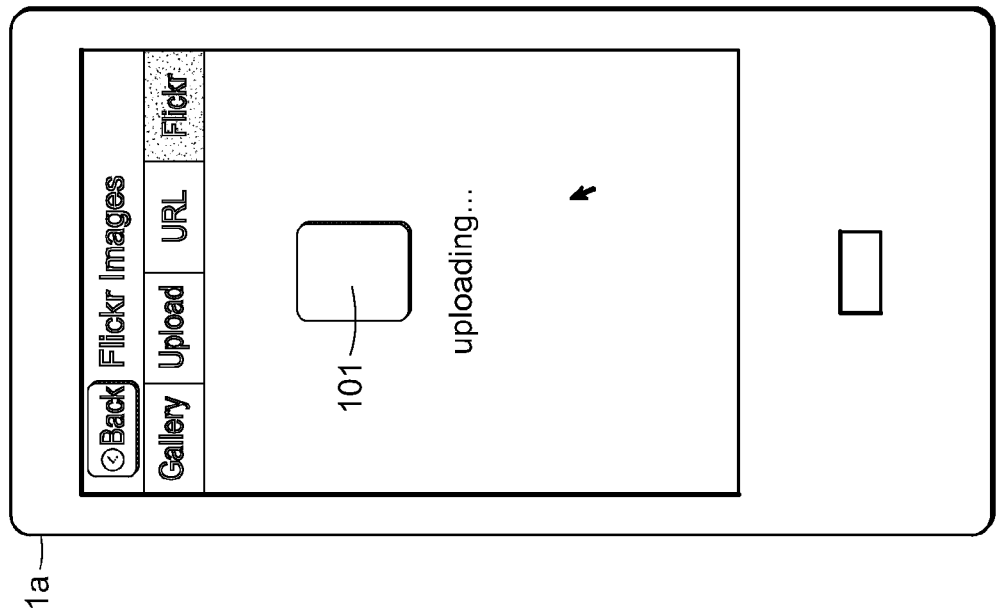
Figure 41:
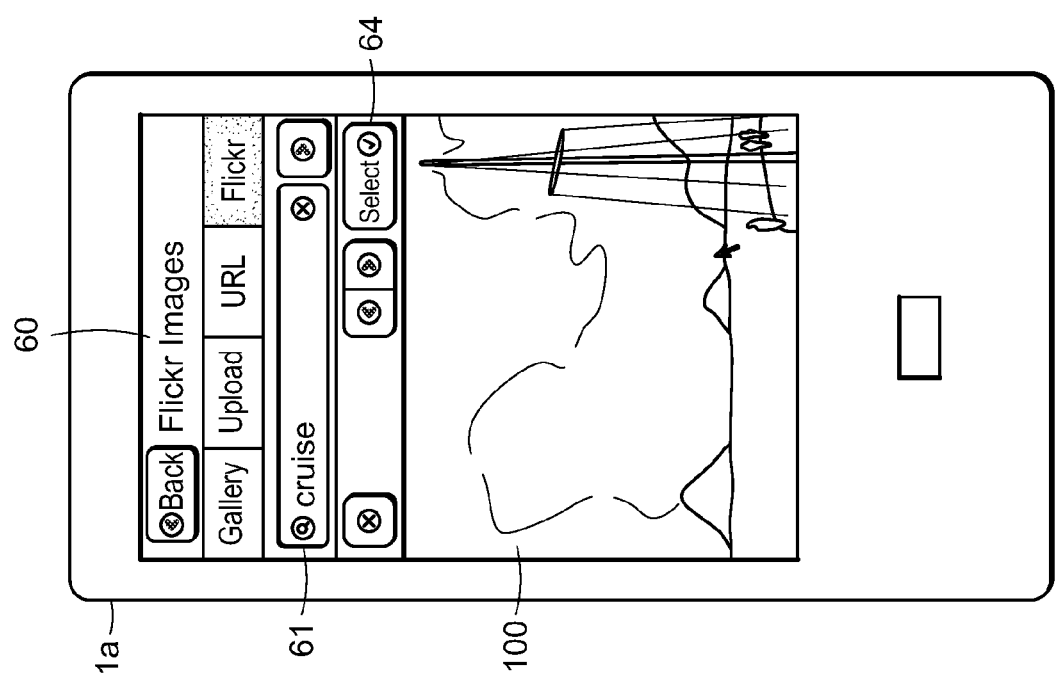
Figure 44:
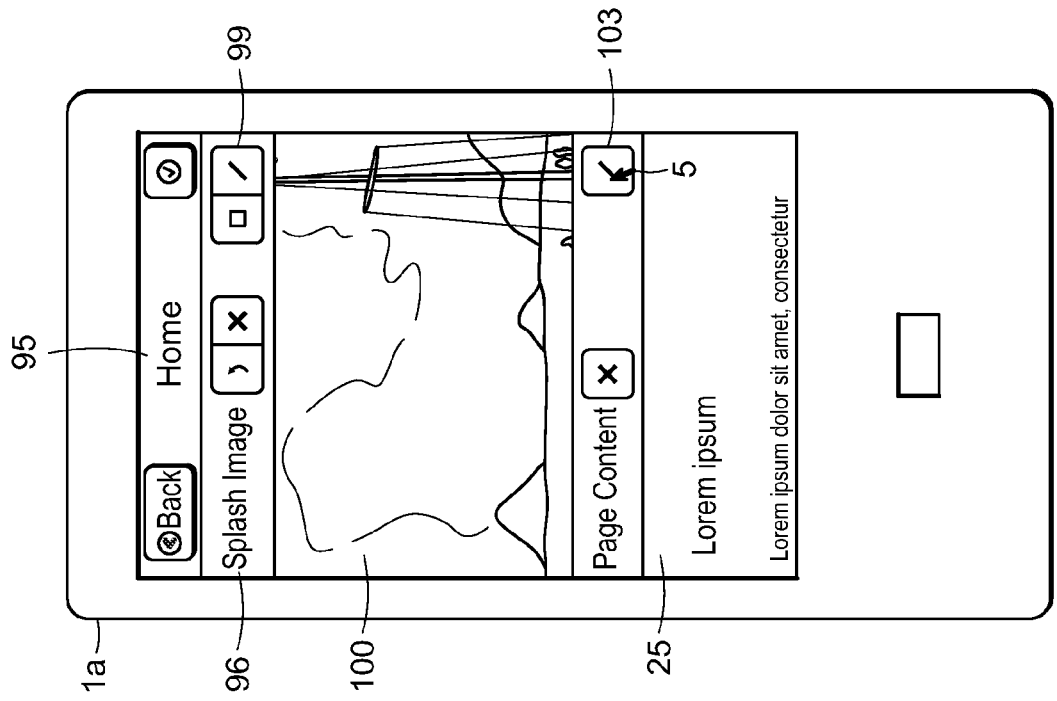
Figure 43:
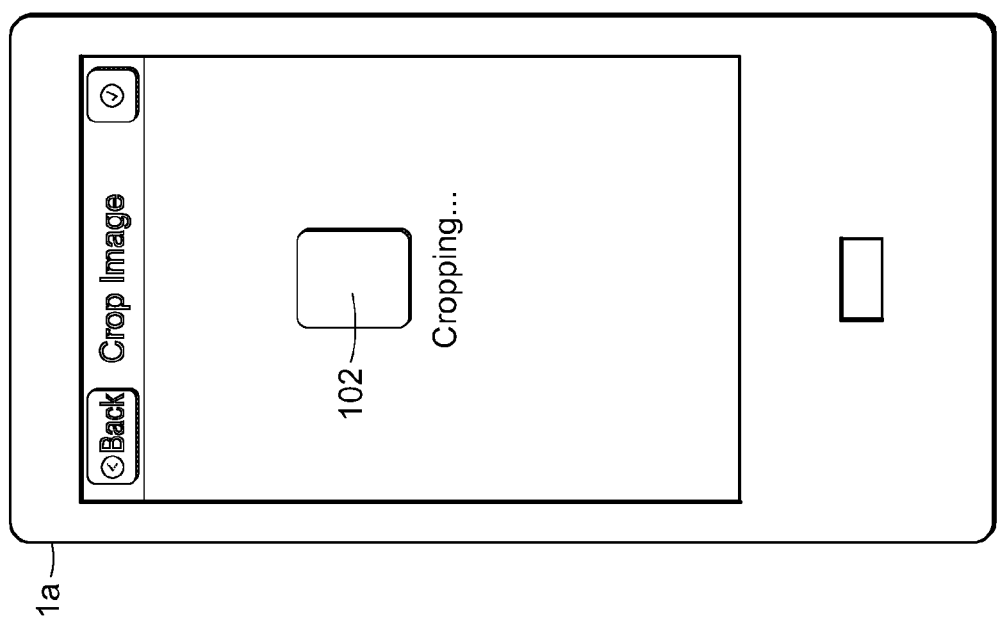

Returning to the website editing control page 36 in FIG. 36, the footer completion indicator 73 is activated, indicating that the footer is complete. The user can then select the control of another section, for example control 44 associated with the Home page, which brings up the home page editing control page 95 shown in FIG. 37. The home page control page 95 includes a splash image section 96 with an associated image 97 contained therein, a removal control 98 for removing the current image associated with the splash image section 96, and an editing control 99 for changing the image in the splash image area. Upon selection of the editing control 99, the user may be presented with the image source tabs, including the Gallery tab, the Upload tab, the URL tab and the 3$^{rd}$ party image gallery service tab (in one embodiment, a Flickr tab). In FIG. 38, the user is viewing the current image and the associated keyword and can select the current image or, as indicated in FIG. 39, place a different keyword (for example, the word "cruise" as indicated in the text box 61) in the search control 61, and activate the search to bring up a gallery of images associated with the new keyword (shown in FIG. 40). The user can then select the desired image 100, which results in display of a higher resolution image, as shown in FIG. 41. If the user is satisfied with the image, the user can click on the select button 64, and the design studio application 215 automatically crops the image (indicated by indicator 101 in FIG. 42) and uploads the image (indicated by indicator 102 in FIG. 43). The cropped image is then displayed to the user in the splash image area 96 of the home page editing control page 95, shown in FIG. 44.

Figure 46:
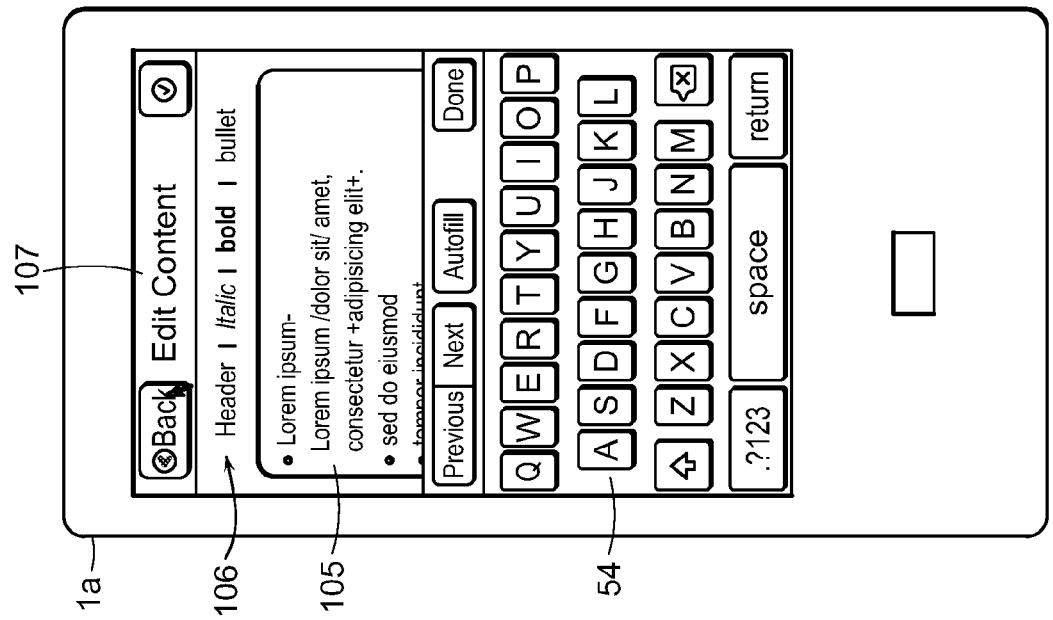
Figure 45:
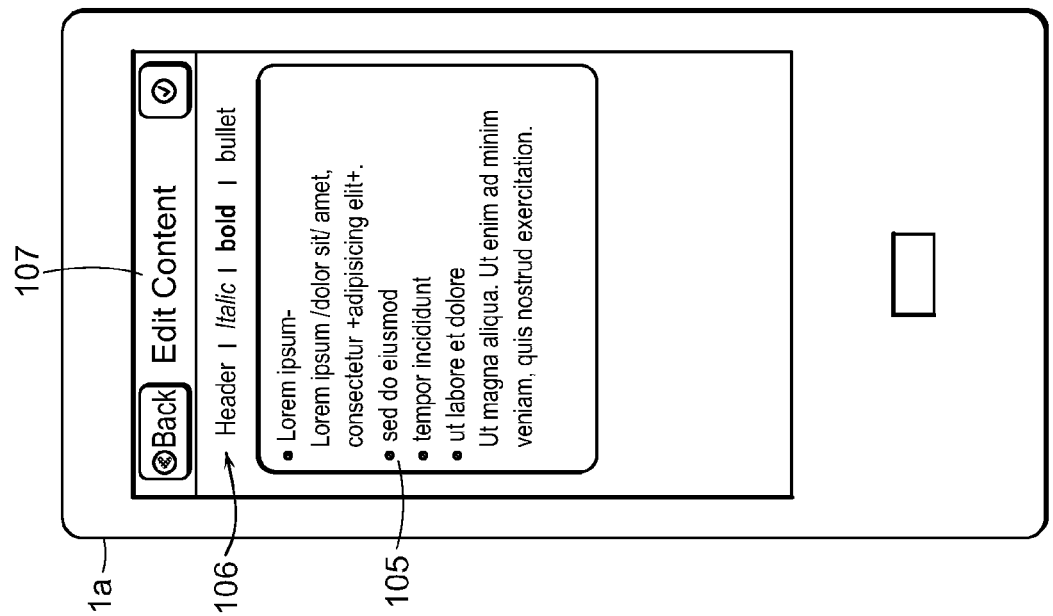
Figure 47:
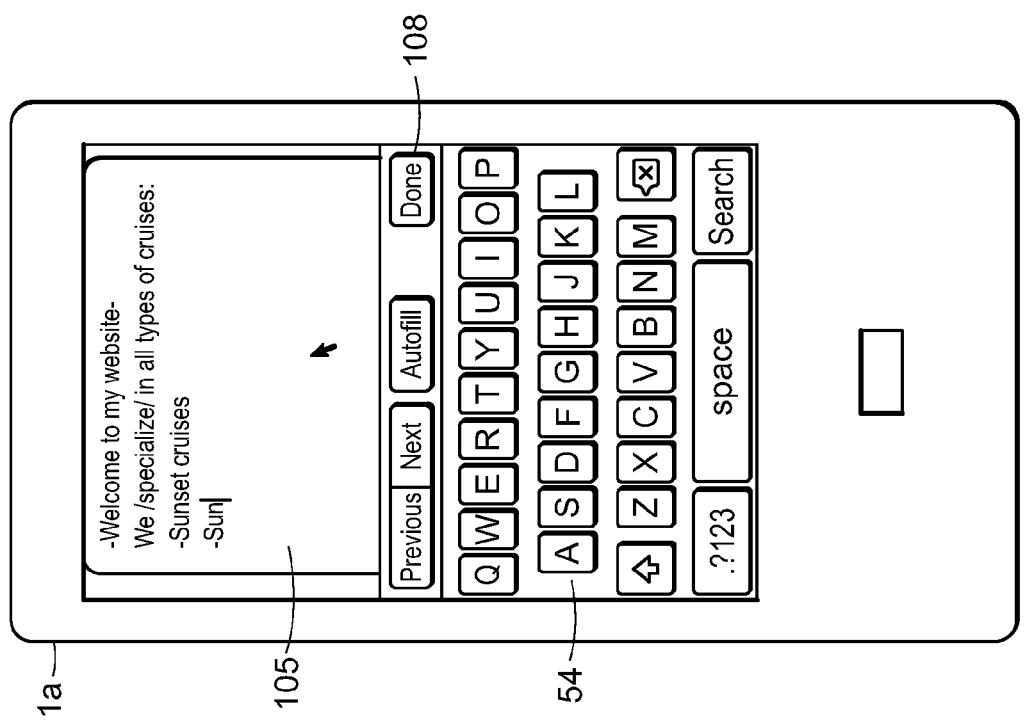

The user may also edit the home page content 25 by clearing the content using control 104 and/or clicking on the edit control 103. FIG. 45 shows the edit content control 107, which includes a markdown language to allow a user to enter text formatting using text-based tagging. For example, in the embodiment shown, header formatting is indicated by tagging the text between dashes "–", italicized text is indicated by tagging the text between slashes "/", bolded text is indicated by tagging text between plus signs "+", and bulleted list items are indicated by tagging items between asterices "*". FIG. 45 shows the syntax explanation 106, along with sample content text 105. Text in the text area 105 can be changed using the text edit control 54, as illustrated in FIGS. 46 and 47.

Figure 48:
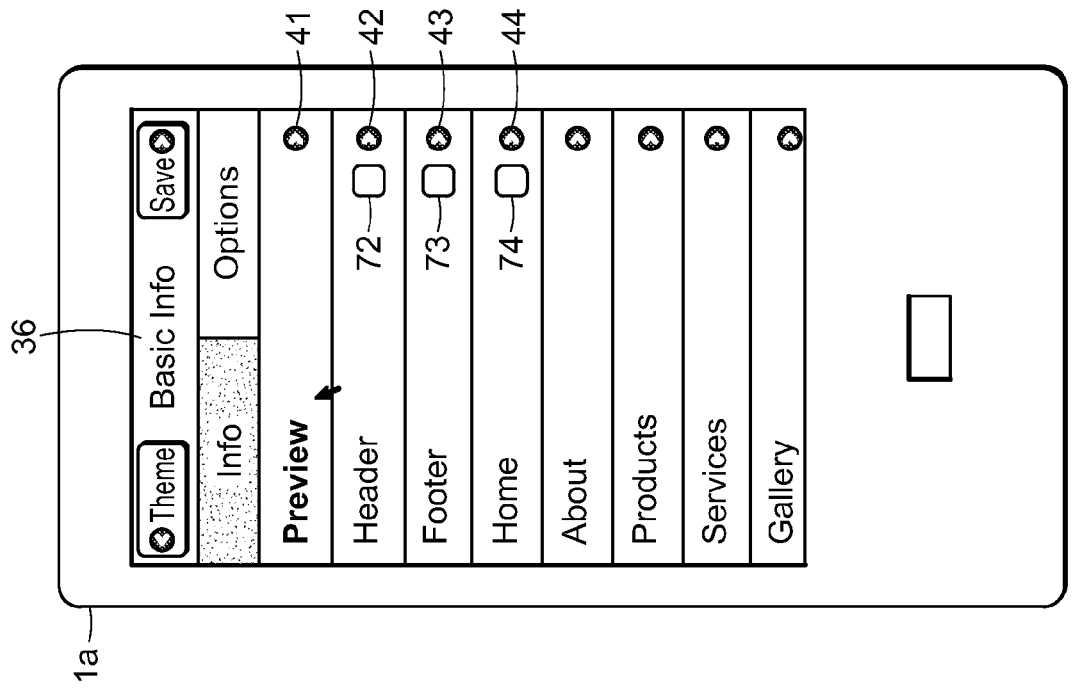
Figure 50:
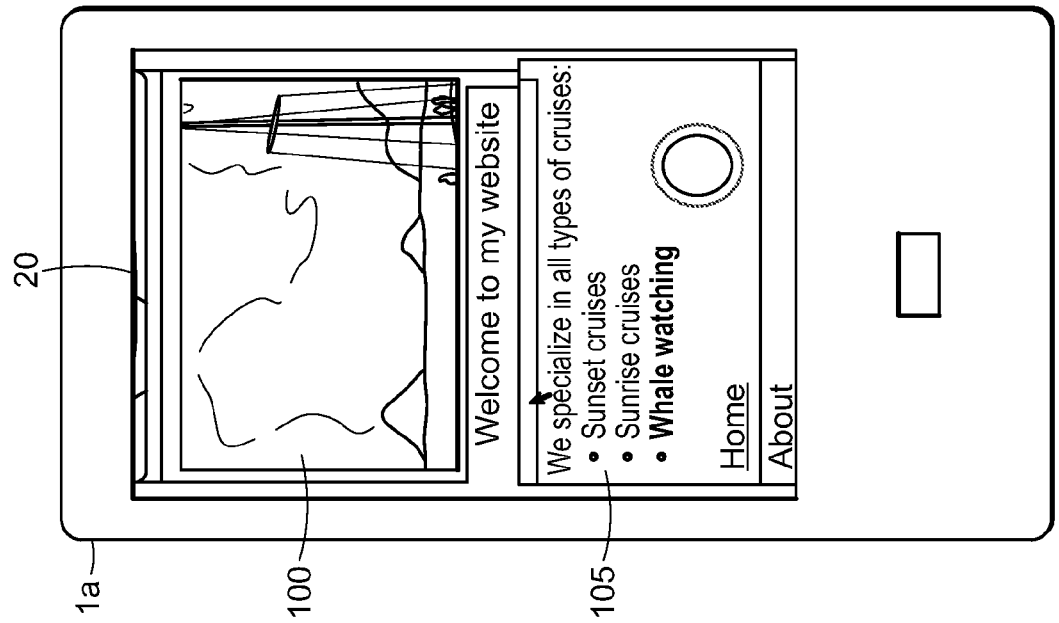
Figure 49:
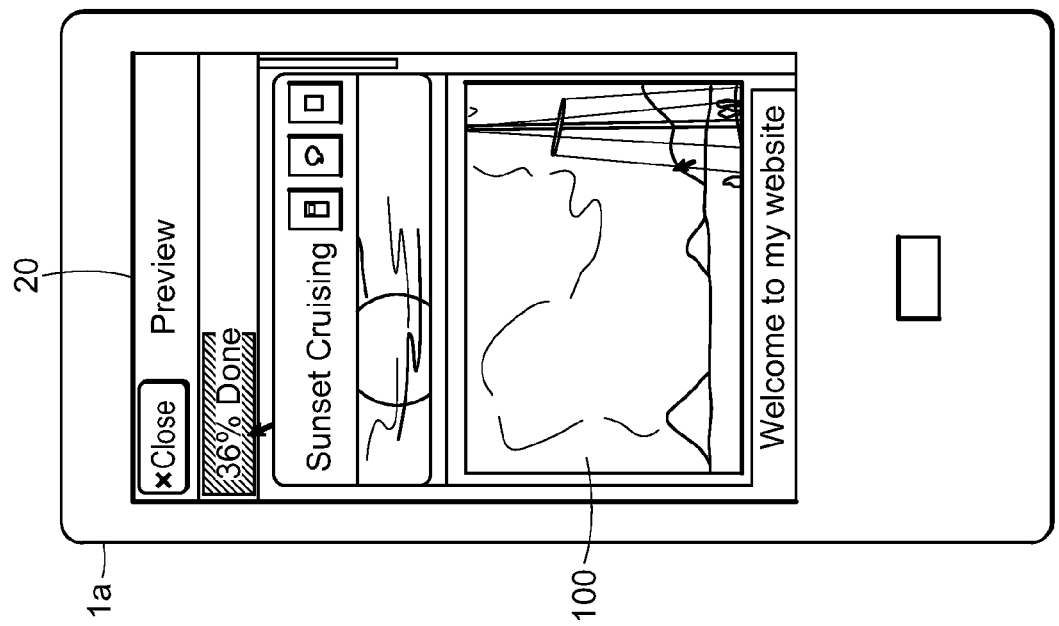
Figure 52:
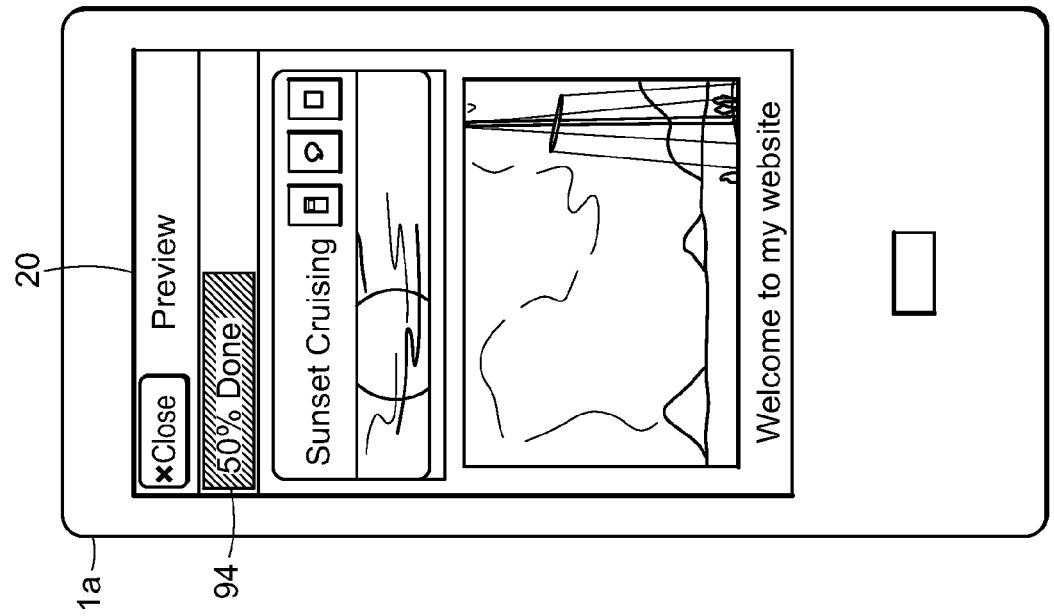

Returning to the website editing control page 36 in FIG. 48, the home page indicator 74 is enabled to indicate that the home page is complete. The completed home page can be previewed, as indicated in FIGS. 49 and 50, which show the updated splash image and home page content.

The selection and order of the web pages on the website can be managed by clicking on a page management control 115 (see FIG. 53), which displays a page management tool 109. In an embodiment shown in FIG. 51, various home pages can be turned on or off using associated controls 110-114. By turning off more pages, the progress indicator 94 is updated to reflect that the website is closer to being completed.

Figure 56:
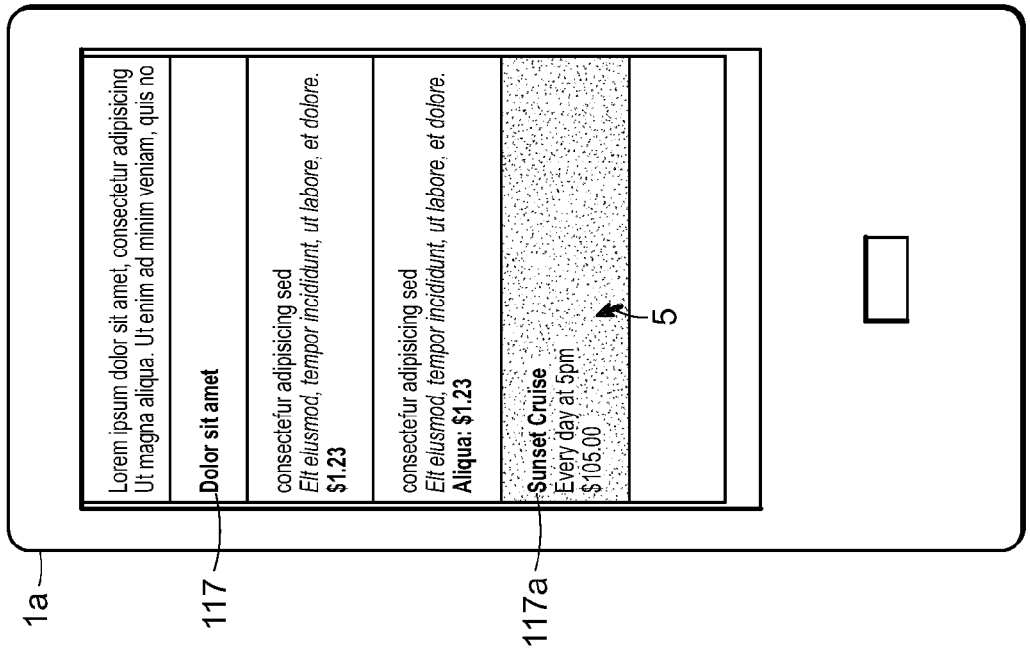
Figure 55:
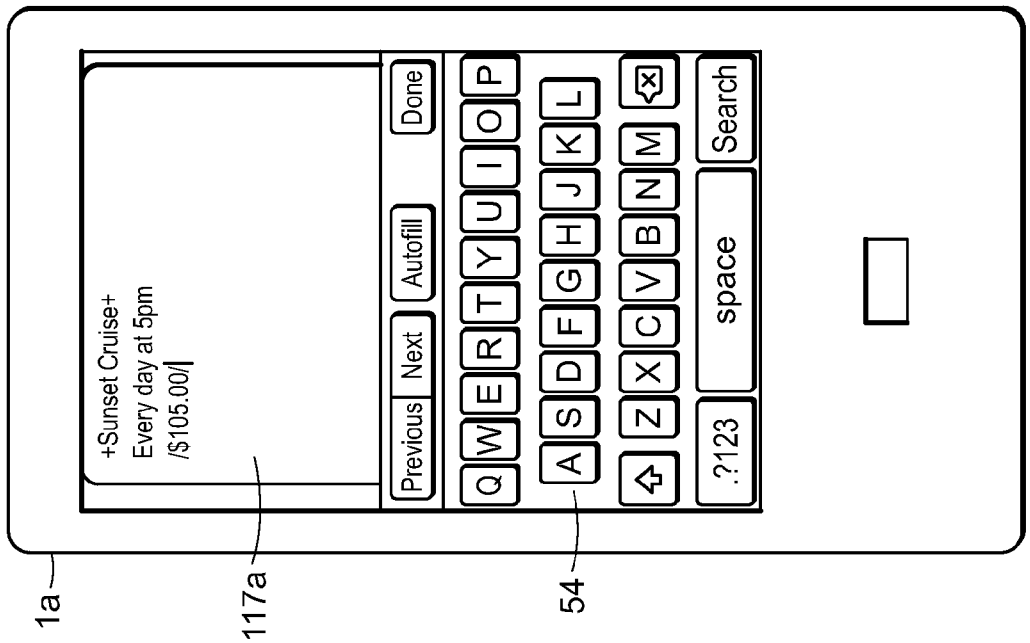
Figure 58:
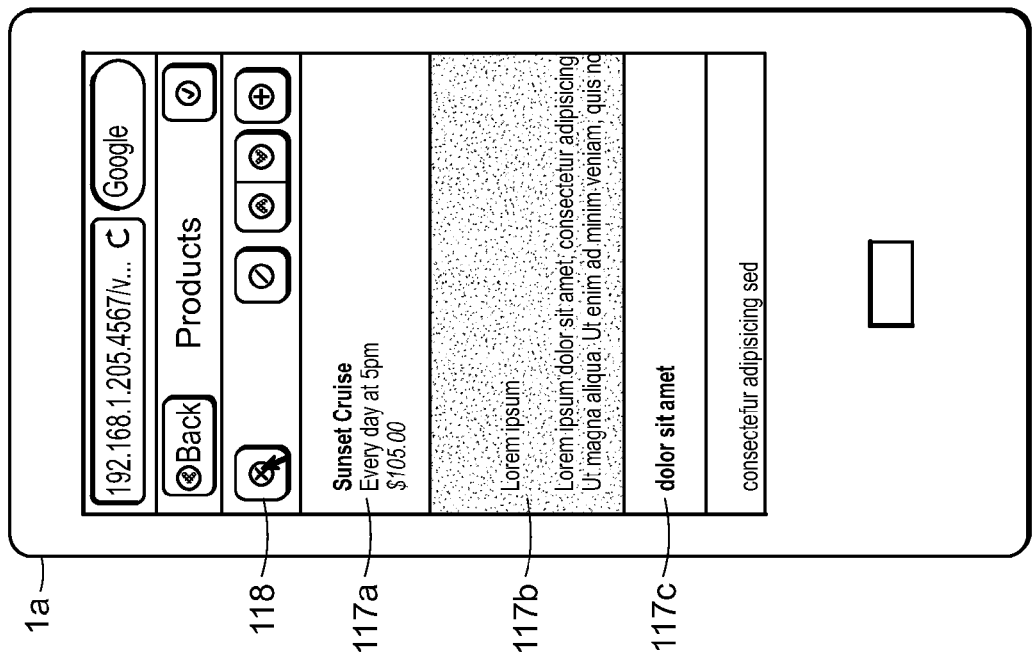
Figure 57:
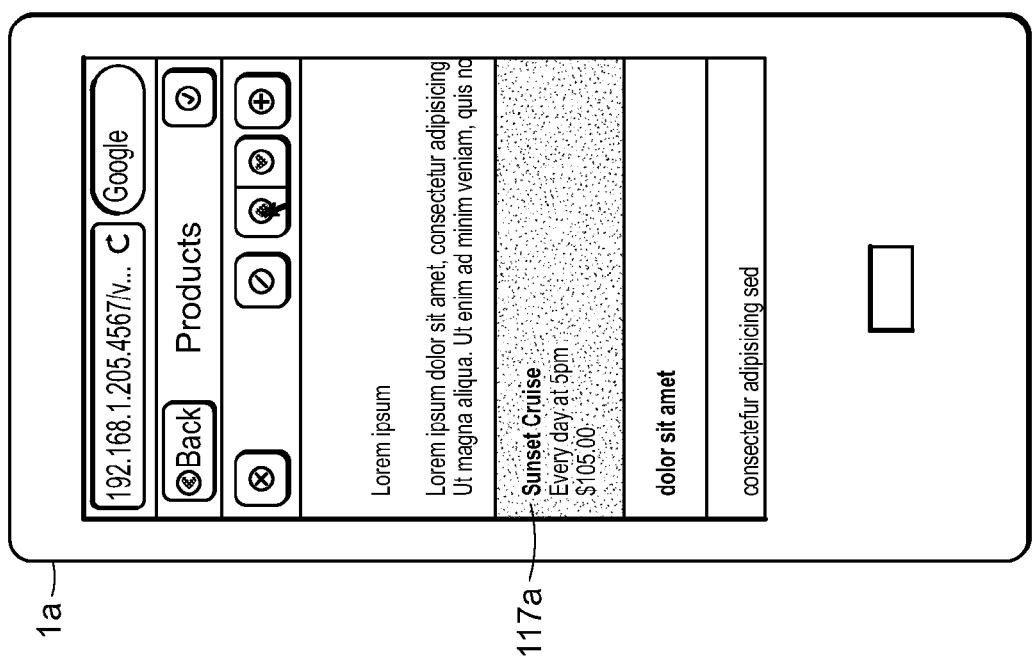
Figure 59:
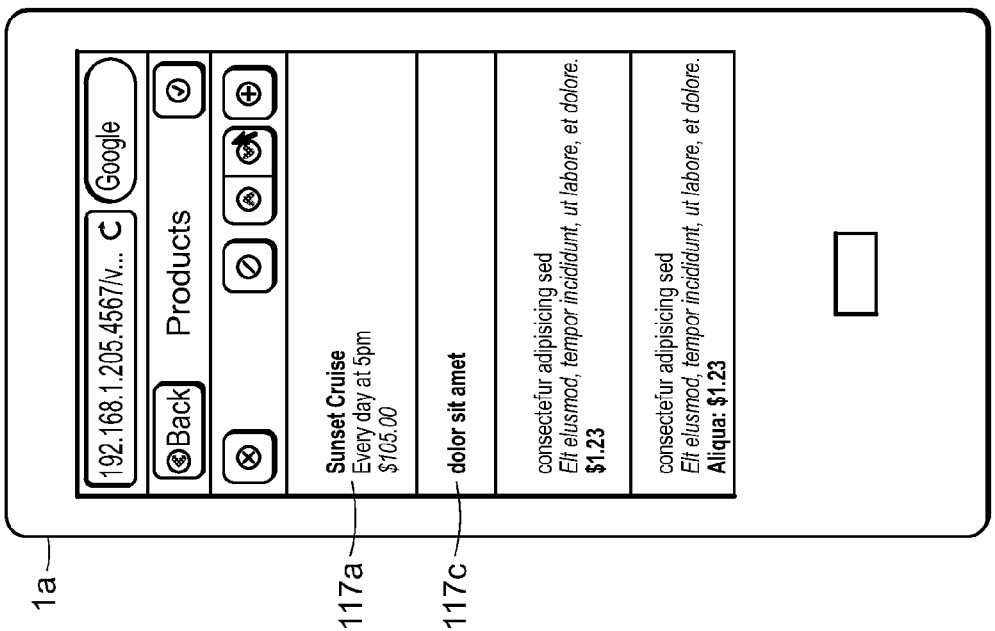
Figure 62:
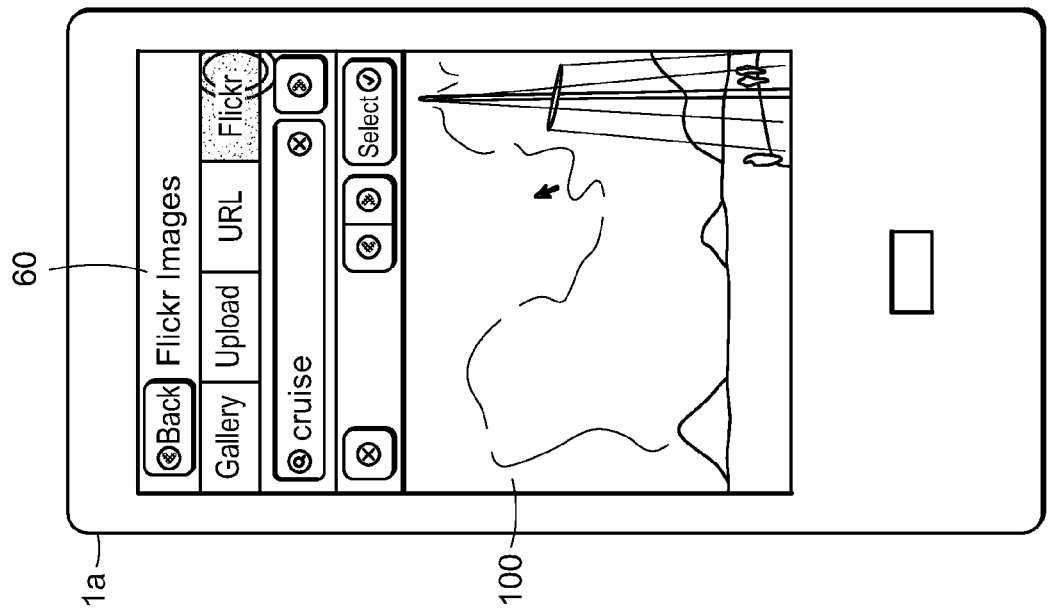

Returning to the website editing control page 36 in FIG. 53, the user can edit the products page by selecting control 45, which brings up the products editing control page 116 shown in FIG. 54. The products editing control page 116 includes a sample itemized list 117 of product items, an editing control 119, an add product control 120, and a remove item control 118. As with other sections of the design studio application 215, the editing control 119 allows text entry using the markdown language and text entry control 54. A new item entry can be added by selecting the add product control 120, and entering the product description, as illustrated in FIG. 55. The added item appears in the products editing control page as 117*a* in FIG. 56. Items in the product list can be moved up or down in the list relative to the other items in the list using controls, as illustrated in FIGS. 57 and 58. Items in the list can be removed from the list using the remove item control 118, as illustrated by the removal of item 117*b* from the list of items 117*a*-117*c* in FIGS. 58 and 59.

Figure 60:
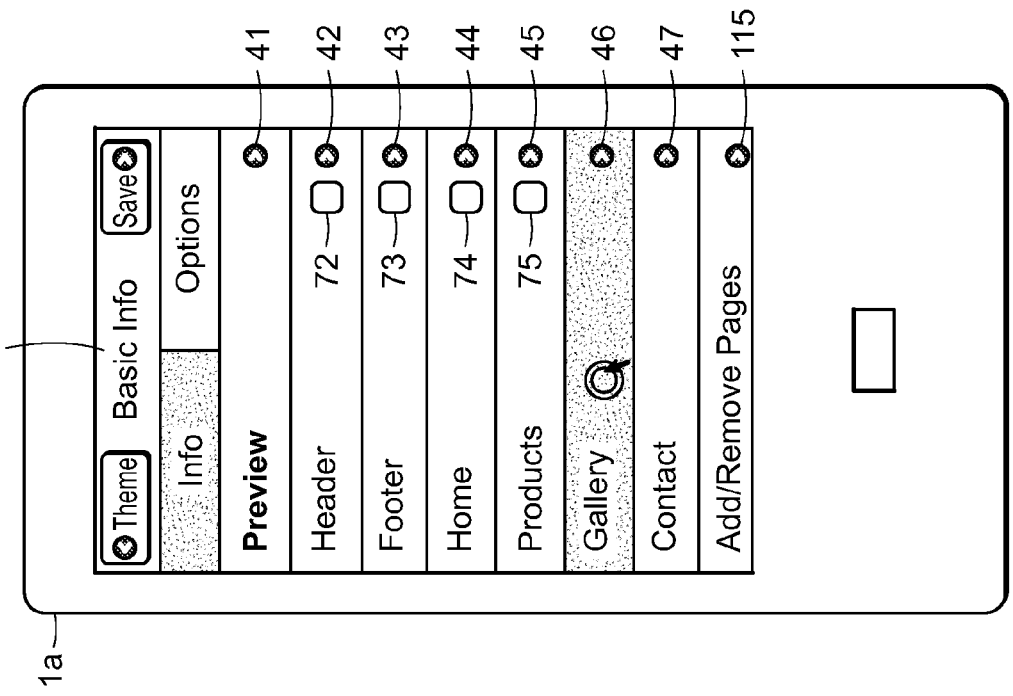
Figure 61:
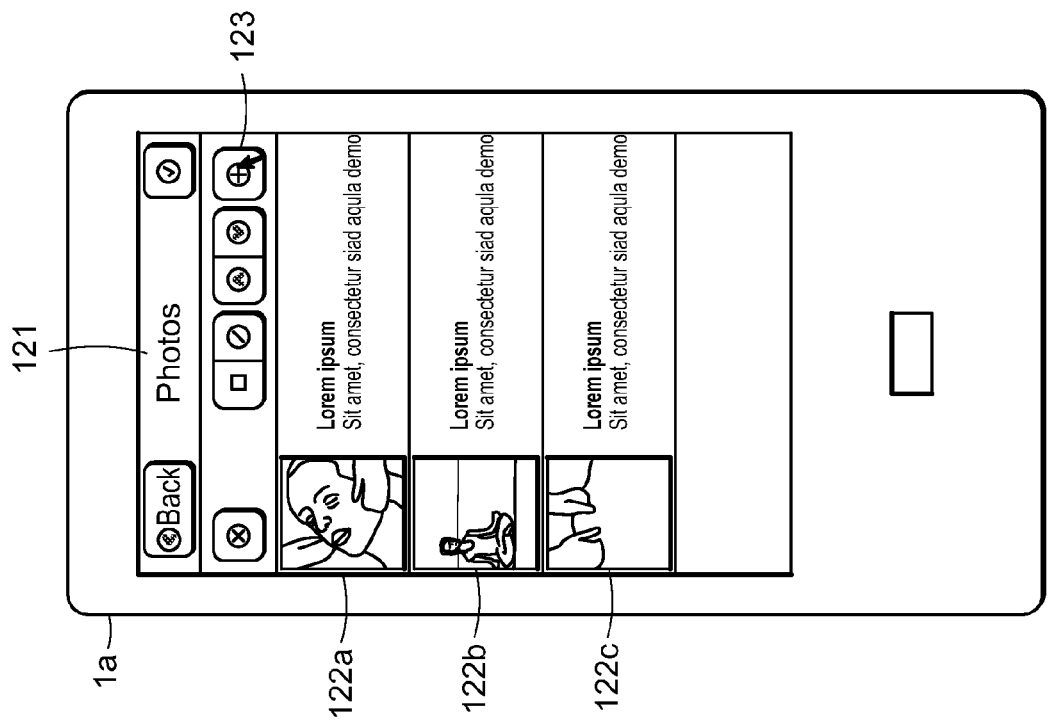
Figure 64:
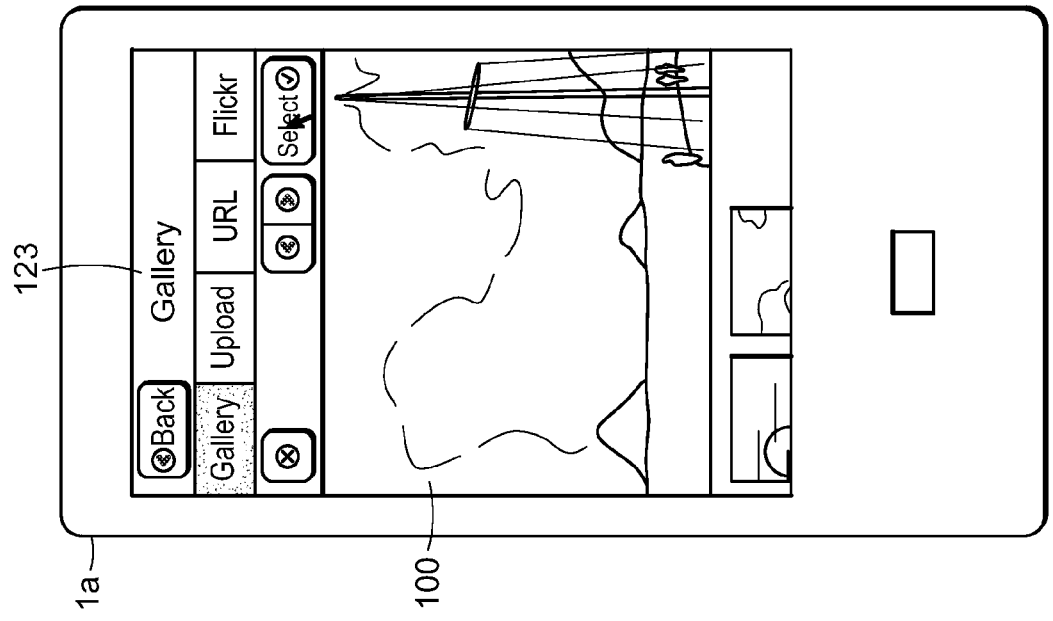
Figure 63:
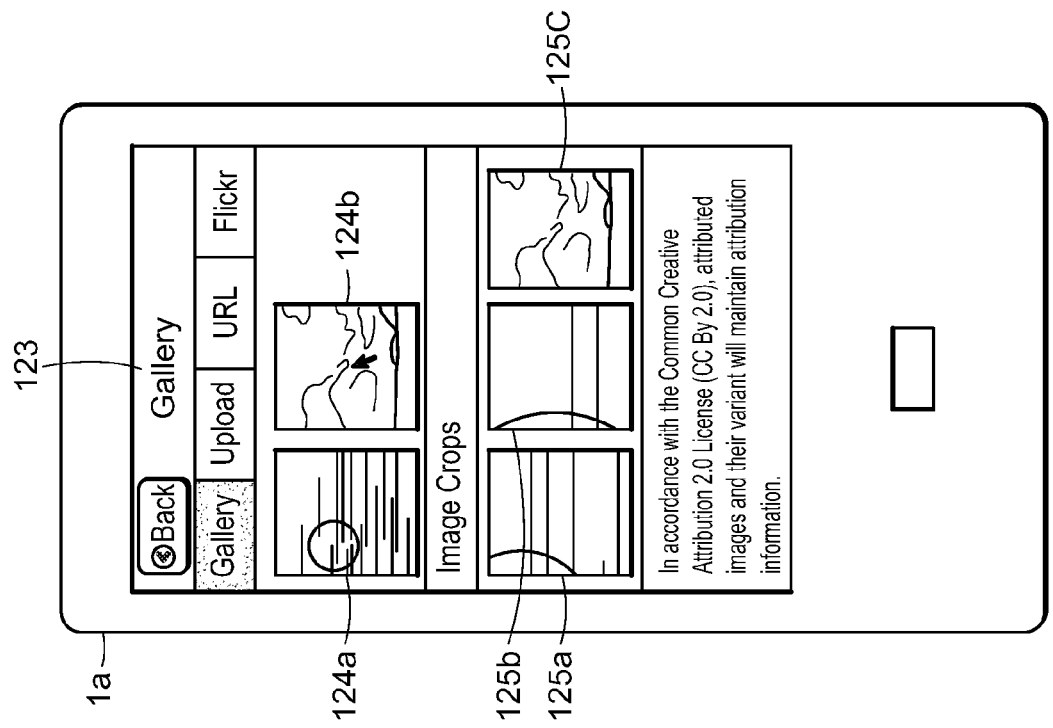
Figure 66:
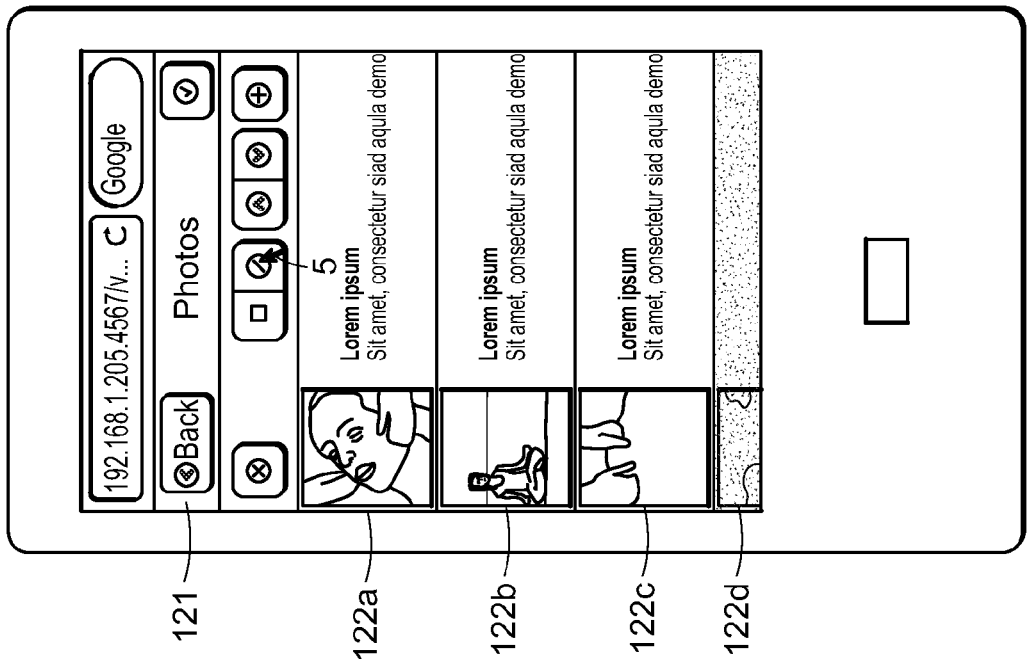
Figure 65:
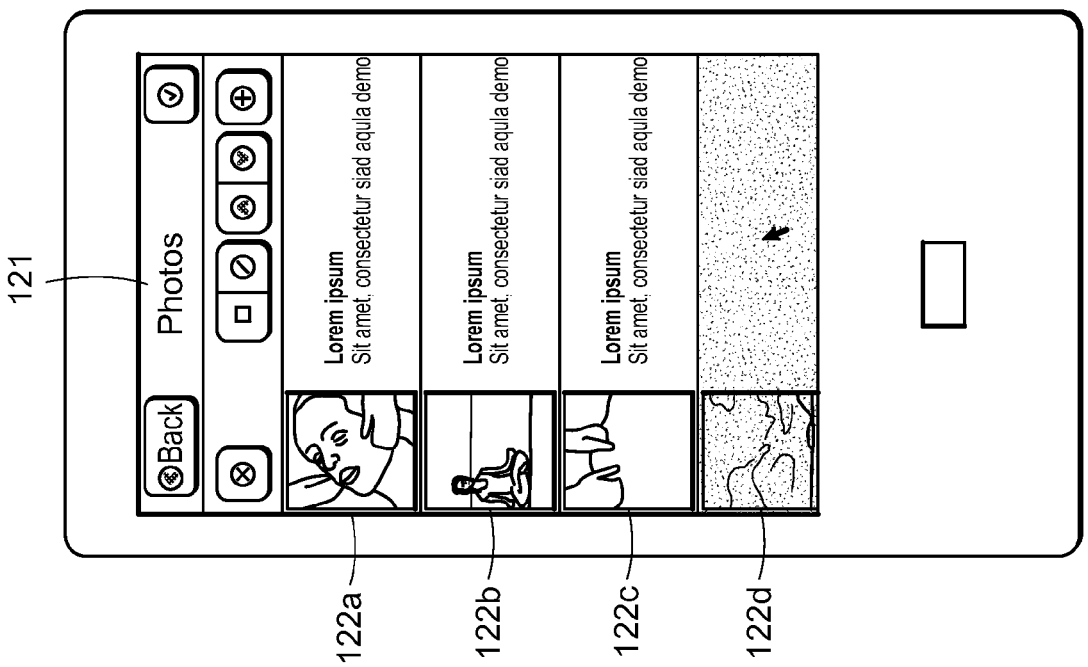
Figure 68:
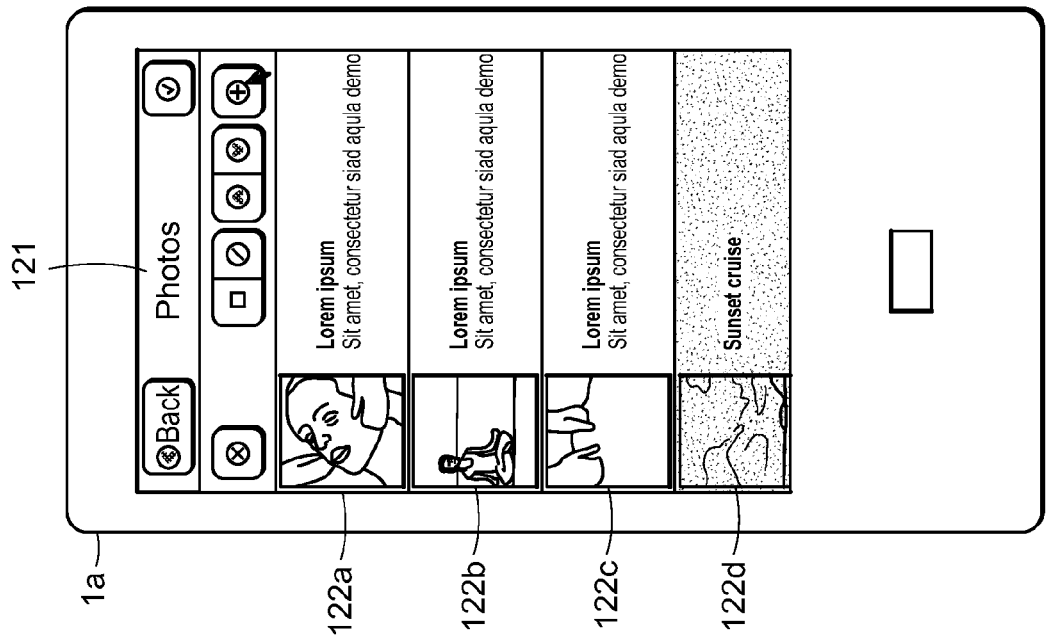
Figure 67:
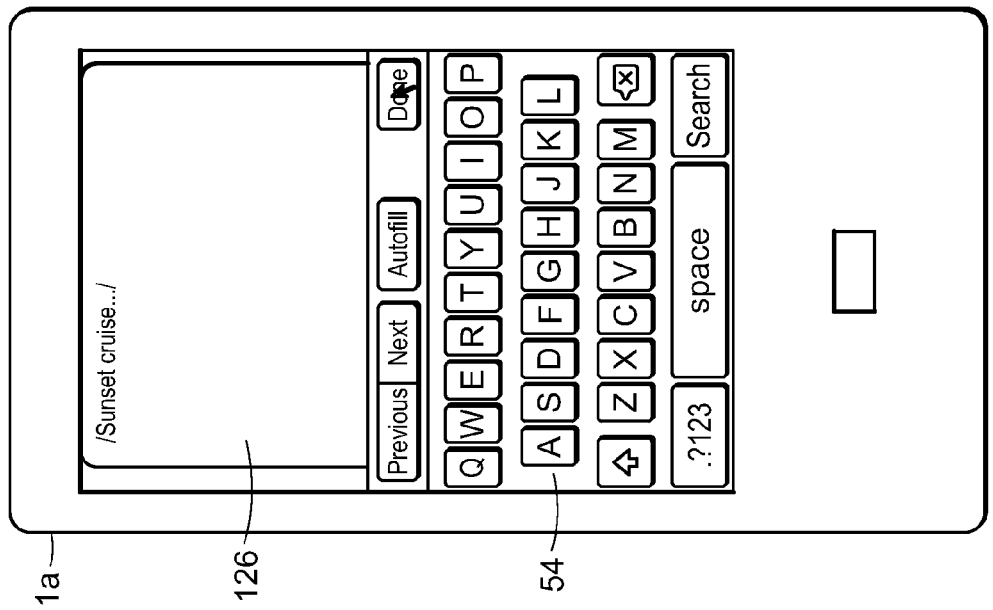

FIG. 60 shows the website editing control page 36 after completion of the products page and during selection of the Gallery editing control 46. FIG. 61 shows the Gallery editing control page 121, which shows the current list of website gallery photos 122*a*, 122*b*, 122*c* that will appear on the website Gallery page. The user can add a Gallery photo using the add gallery item control 123, which operates similarly to the addition of images elsewhere in the design studio application 215 and is illustrated in FIGS. 62-65. In particular, the Gallery tab can be selected to bring up thumbnails 124*a*, 124*b* of images currently in the gallery associated with the user's account, as well as any previously stored image crops 125*a*, 125*b*, 125*c*. Once a new gallery item is added using the add gallery item control 123, the new gallery item 122d shows up on the Gallery editing control page 121, as shown in FIG. 65. The Gallery editing control page 121 also includes a text editing control which allows the user to enter text associated with a selected Gallery item (shown as 122d). In an embodiment, the user enters text into a Gallery item textbox 126 using the text entry control 54 as shown in FIG. 67. When the user is done editing the text associated with the item, the updated text appears associated with the item 122d in the Gallery editing control page 121, as illustrated in FIG. 68.

Figures 71, 72:
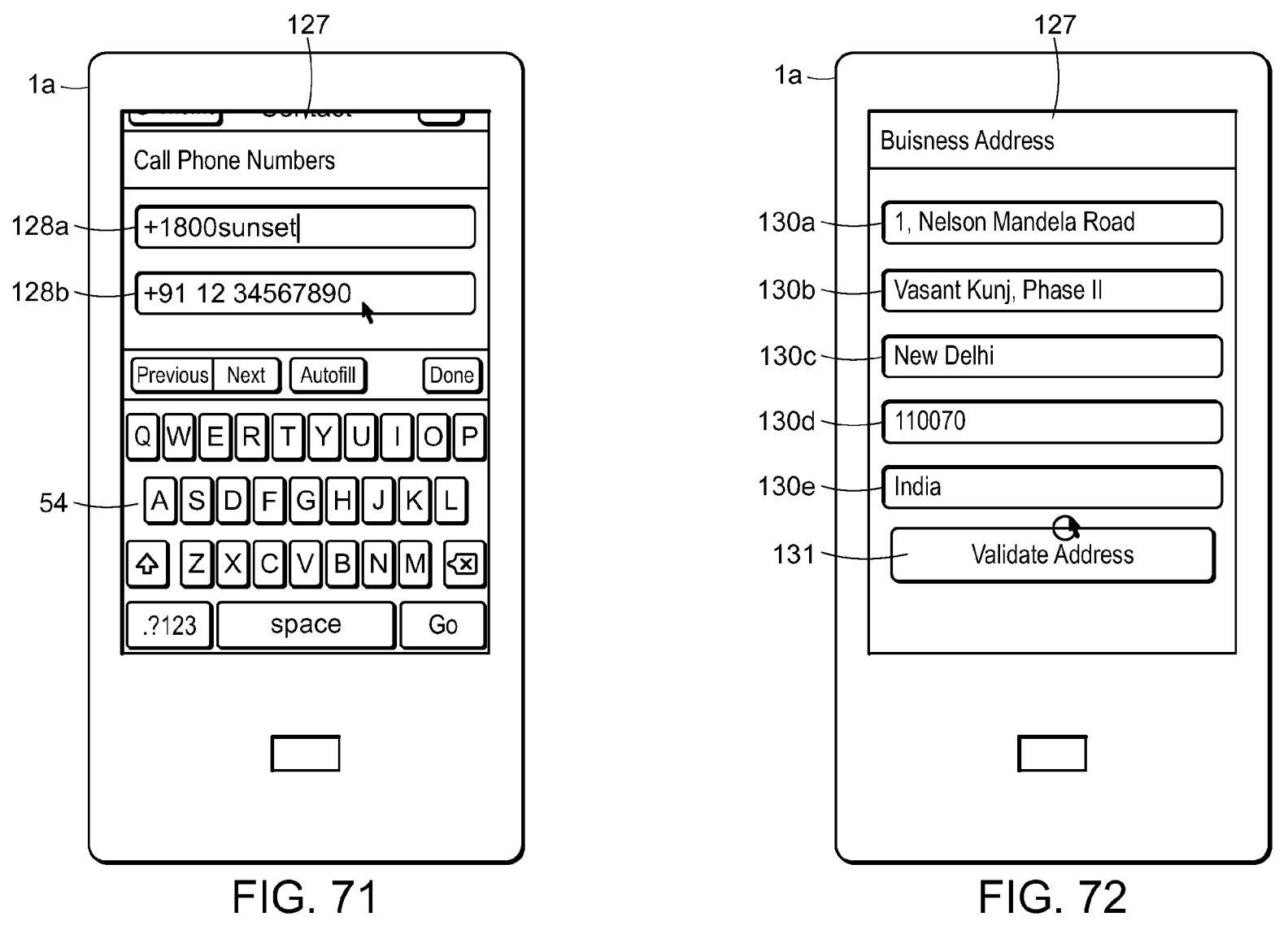
Figure 74:
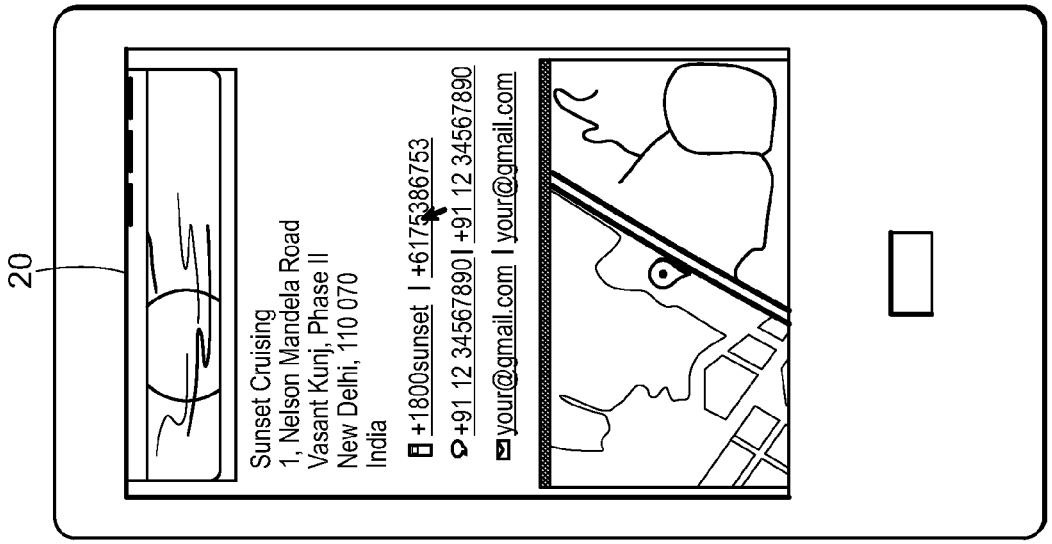
Figure 73:
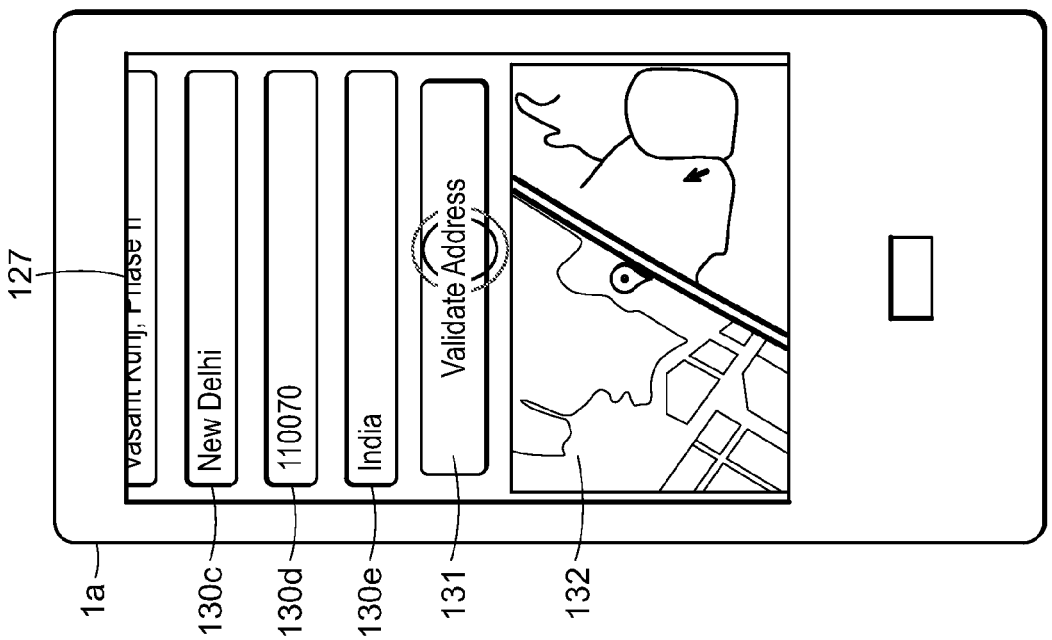

Returning again to the website editing control page 36 in FIG. 69, a Gallery completion indicator 76 appears next to the Gallery edit control 46 to indicate that the Gallery is complete. Next, the user can click on the Contact control 47 to begin editing the Contact editing control page 127, shown in FIG. 70. The Contact editing control page 127 includes a number of different text entry controls 128a, 128b, 129a, 129b, for receiving phone, alternate phone, sms phone and alternate sms phone numbers. The text (including numbers) may be entered using the text entry control 54, shown in FIG. 71. Contact address(es) can be entered into address text entry controls 130a-130e, shown in FIGS. 72 and 73, again using the text entry control 54. The user entered address may optionally be validated by an address validation service, which may be activated by clicking on a Validate Address control 131. The Contact editing control page 127 may also include a map 132, shown in FIGS. 73 and 74, which may be automatically uploaded and inserted into the page by a 3$^{rd}$ party mapping service.

Figure 51:
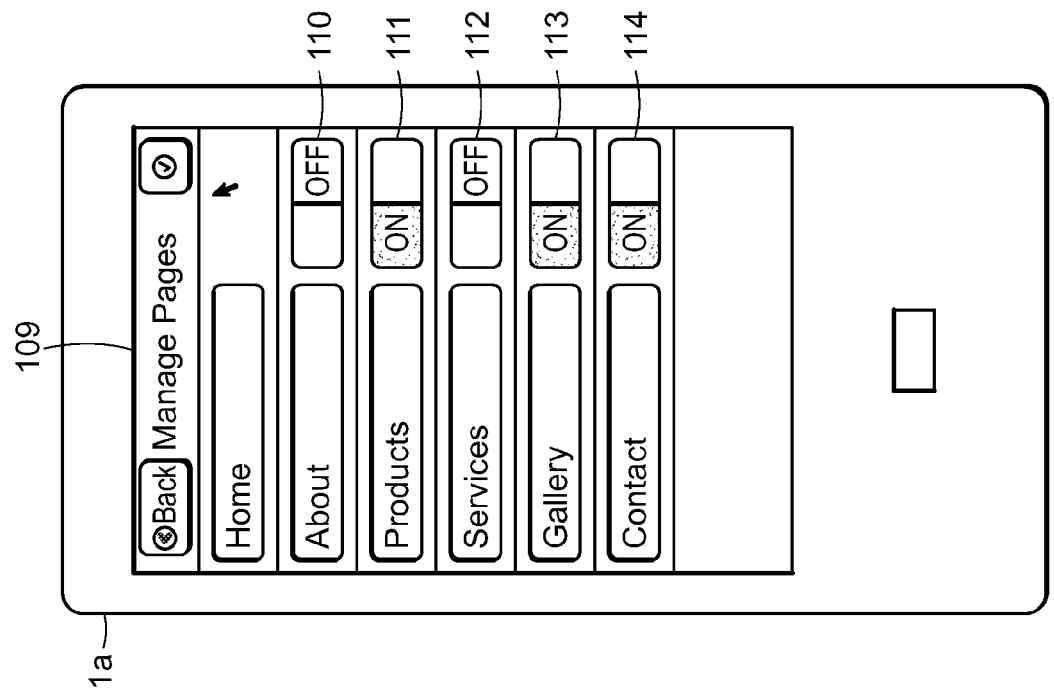
Figure 76:
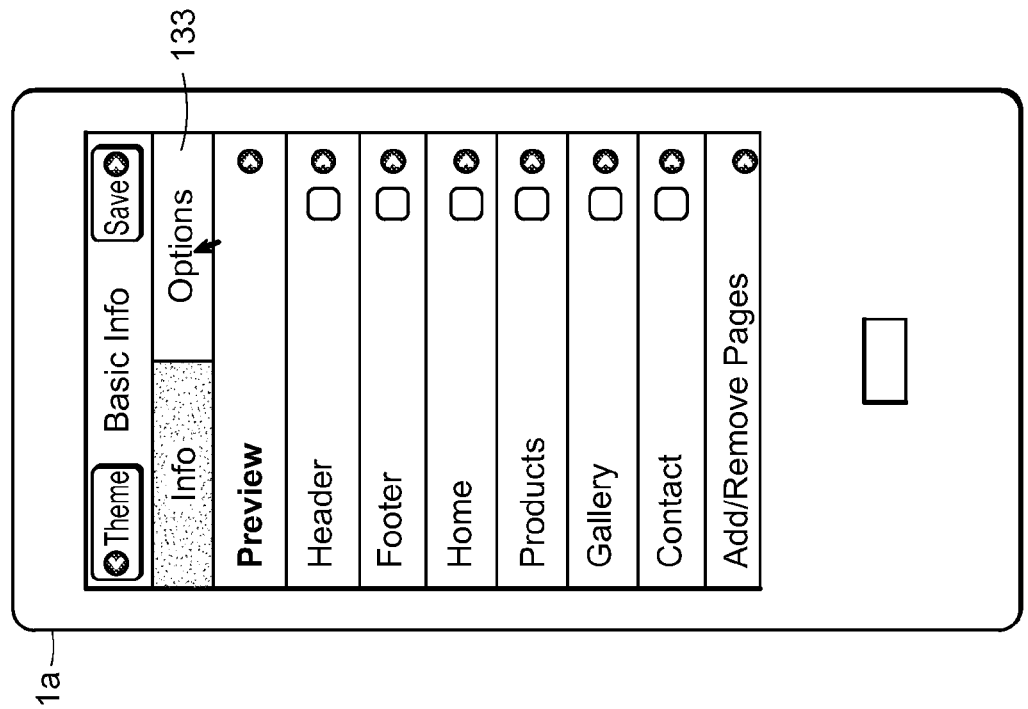
Figure 75:
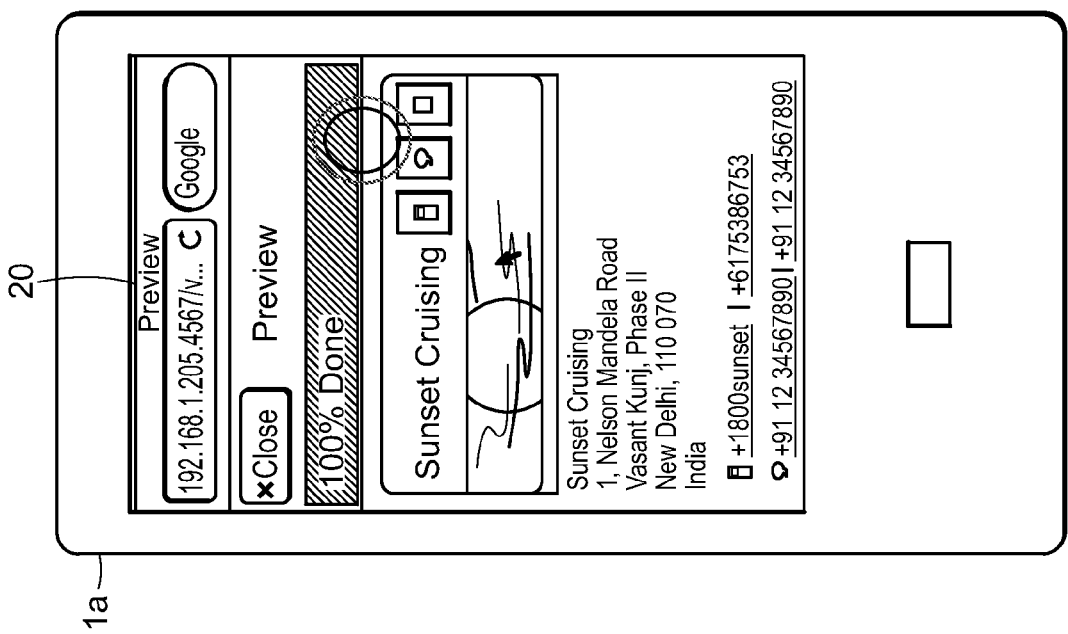

A preview 20 look at the website shows the updated address information applied to the Contact page, shown in FIG. 75. Upon completion of the Contact page, all enabled pages are complete as indicated in FIG. 76. Additional pages can be added using the Add/Remove Pages control 115, which brings up the page management control 109 (FIG. 51).

Figure 77:
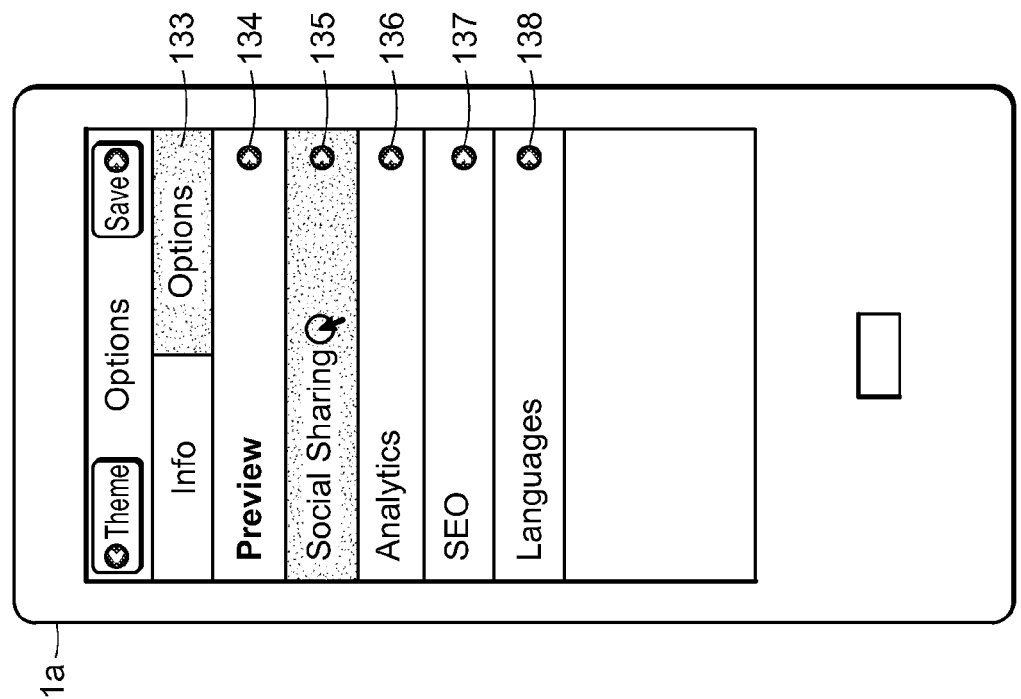

The user may select additional options, available from the Options tab 133, shown in FIG. 77. Example options include social media, analytics, and search engine optimization (SEO) controls 135, 136, 137, respectively.

Figure 78:
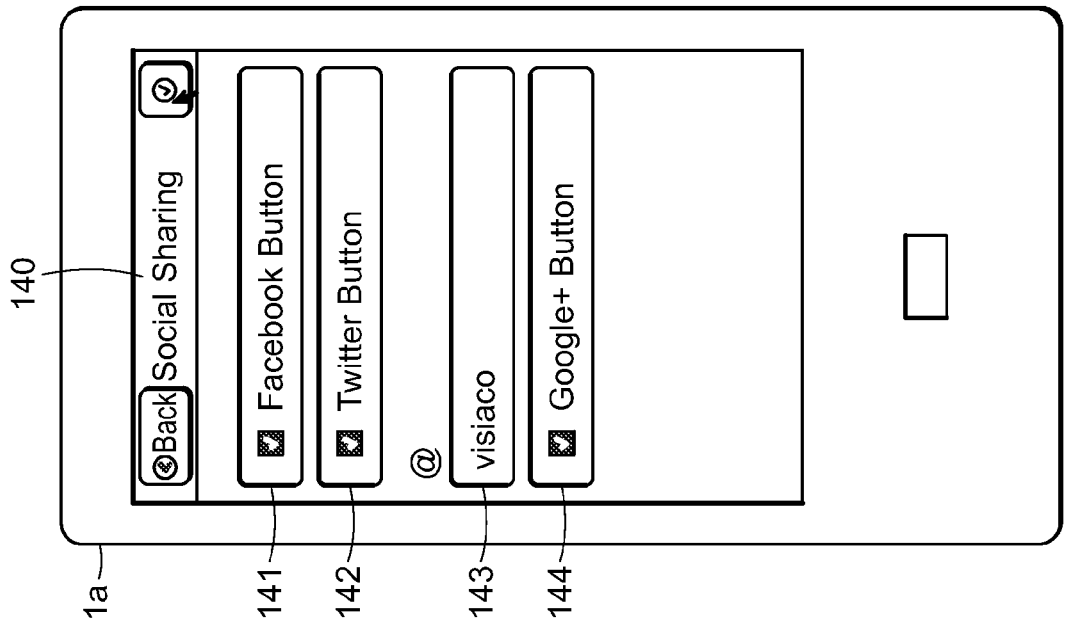
Figure 80:
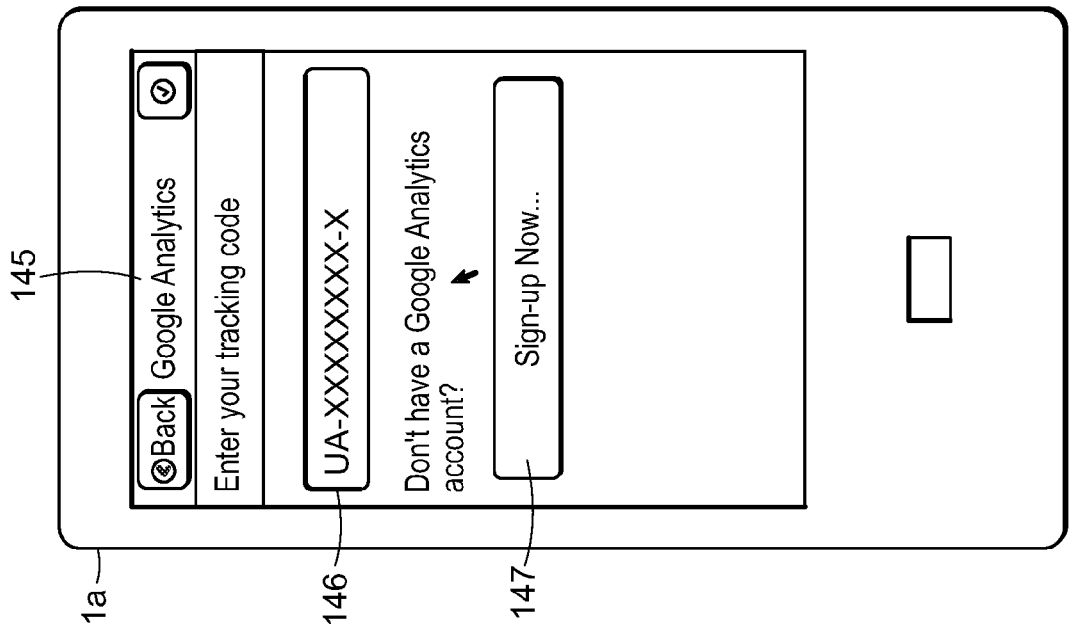
Figure 79:
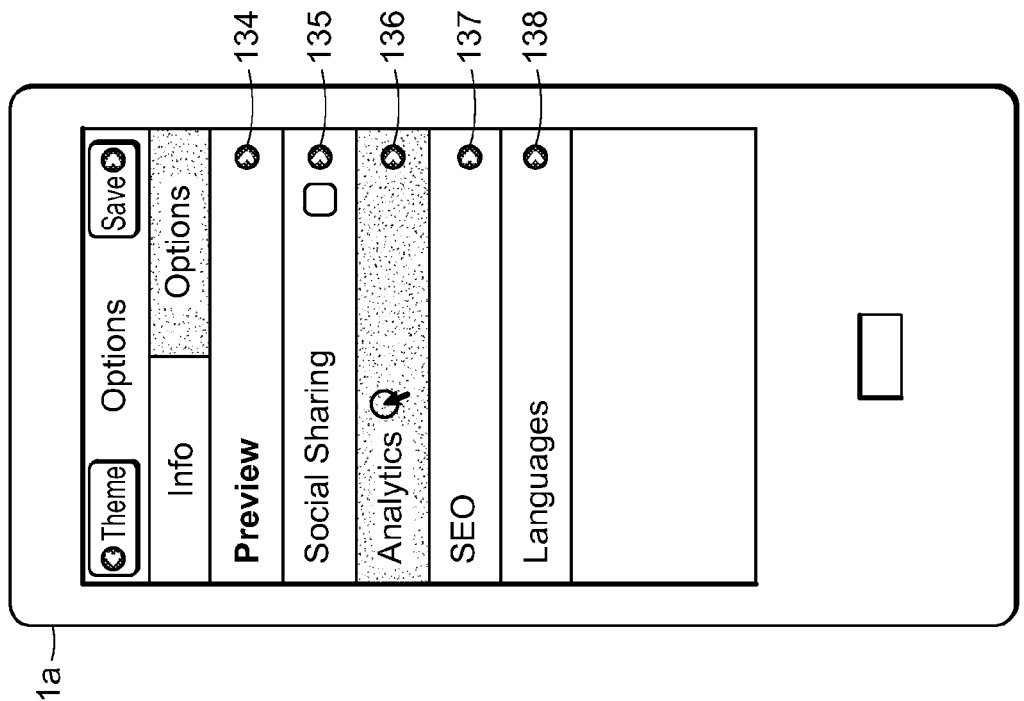
Figure 82:
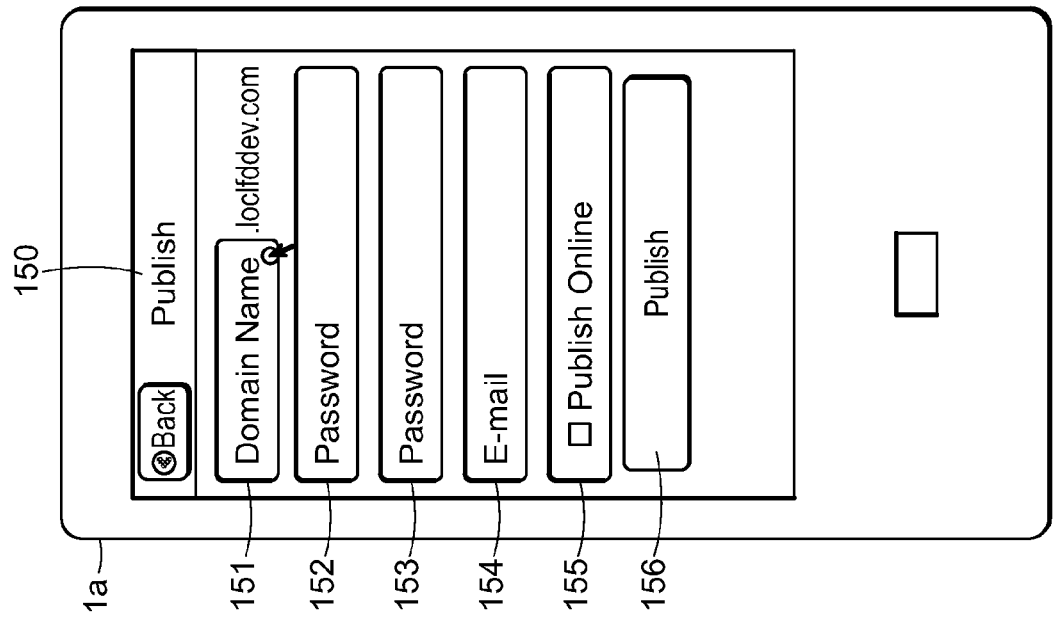

FIG. 78 shows an example set of controls for enabling social media functionality. The user may choose to add a Facebook button (control 141), a Twitter button (control 142 with address control 143), a Google+ button 144, and/or other social media buttons. FIG. 79 shows the Options tab 133 with a status indicator indicating the social media options have been completed. FIG. 80 shows an example analytics page 145, which includes a control 146 for entering an analytics service account information, and a link 147 to sign up for analytics if the user does not already have an account.

Figure 81:
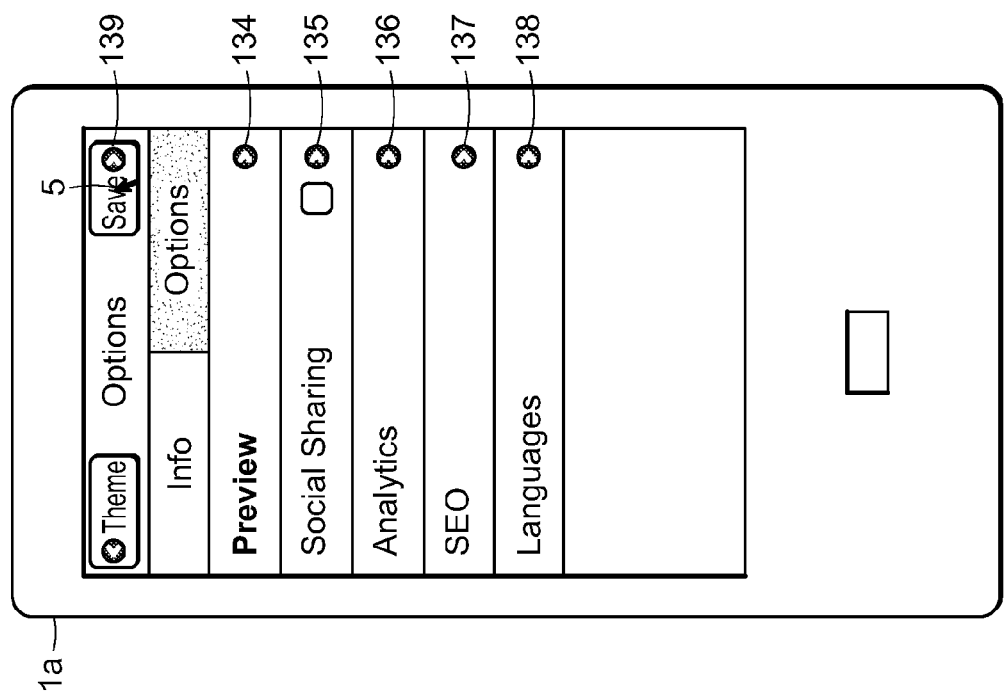
Figure 84:
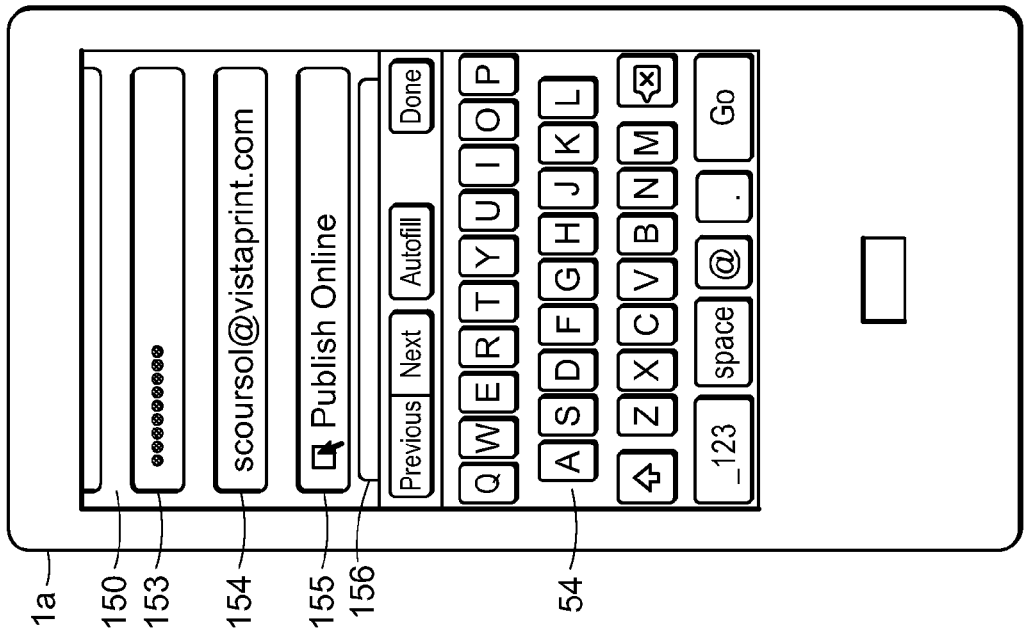
Figure 83:
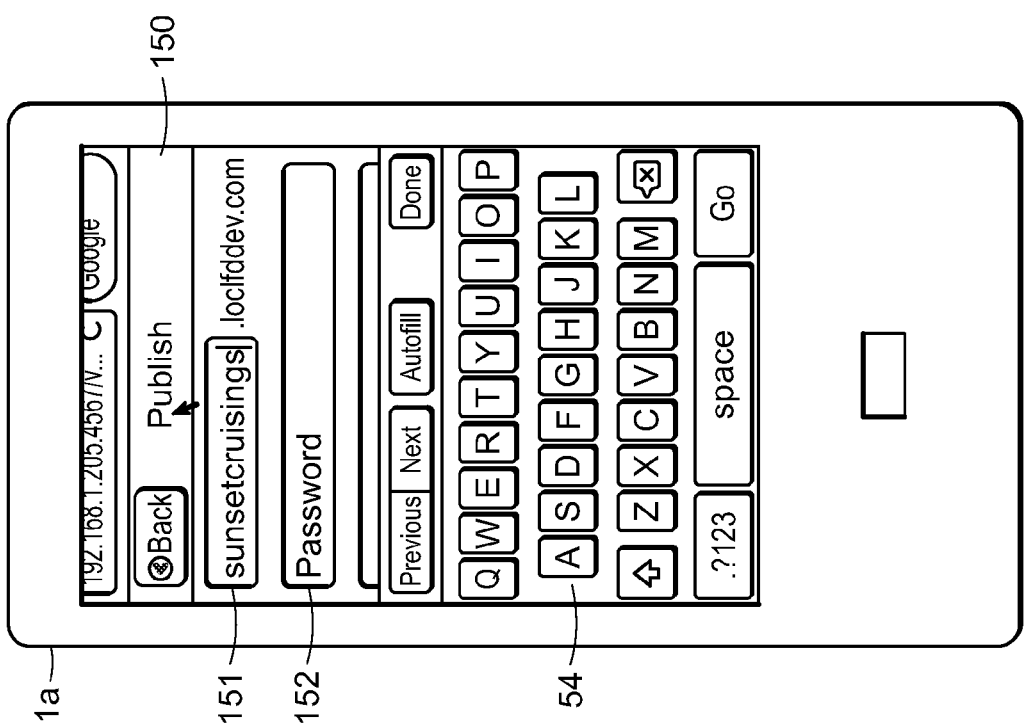
Figure 86:
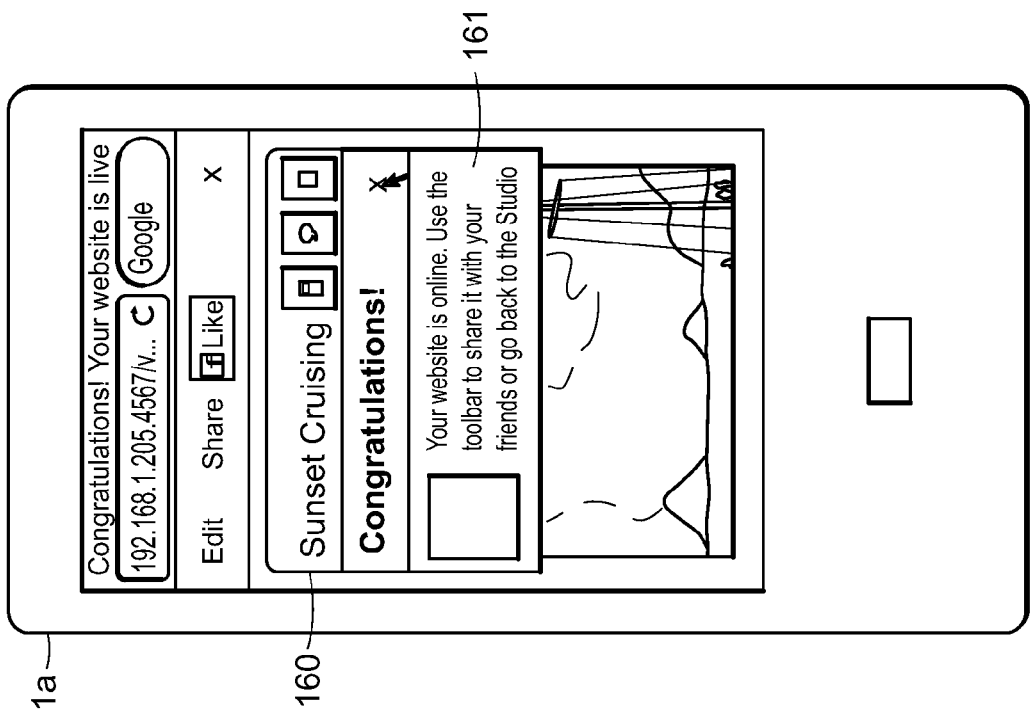
Figure 85:
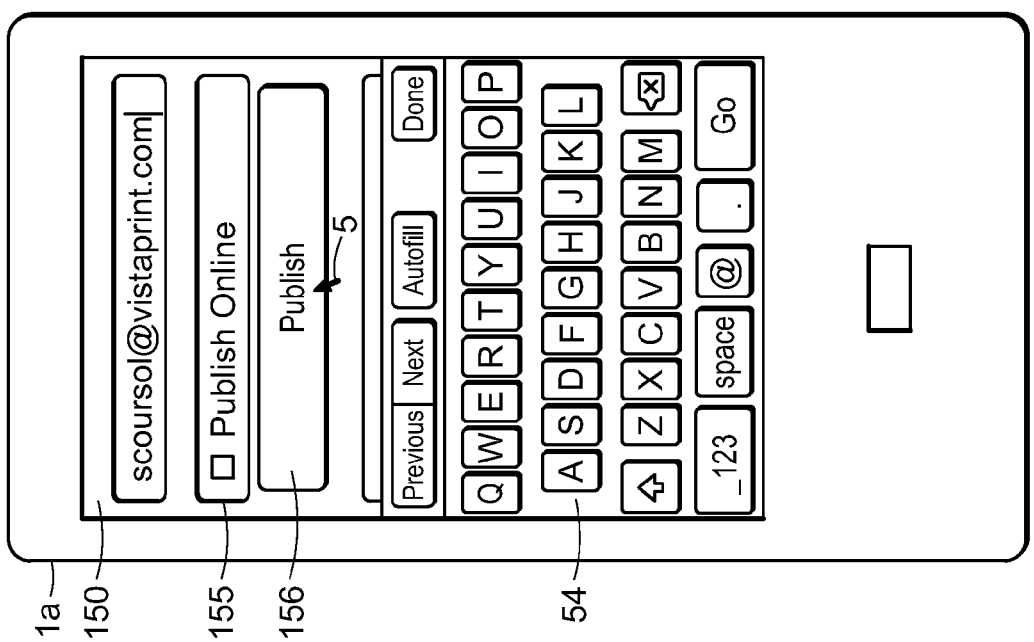

FIG. 81 shows the user saving the website by clicking on the Save button 139. FIGS. 82-85 shows the user requesting publication of the website. A Publish page 150 includes a control 151 for entering a domain name, controls 152 and 153 for entering a user name and a password, a control 154 for entering an email address, a Publish Online checkbox 155, and a Publish request control 156. As illustrated in FIG. 83-85, entry of text into any and all text entry controls 151-154 can be facilitated using text entry control 54. FIG. 86 shows a confirmation welcome message 161 indicating that the current website, indicated by preview 160, has just been published. FIG. 87 shows the published web page upon navigation to the website using the URL.

As will be appreciated by those skilled in the art, the order and presentation of the graphical user interface pages displayed by the design studio application 215 may vary in design and implementation without departing from the spirit and scope of the claims presented hereinafter.

Server(s) 201 and devices 210a, 210b may include any type of processor-based system on which processes and methods consistent with the disclosed embodiments may be implemented. For example, all computing devices described herein, including devices 210a, 210b, server(s) 201, etc. may include one or more hardware and/or software components configured to execute software programs. Such computing devices may include one or more hardware components such as one or more processors, random access memory (RAM) module(s), read-only memory (ROM) module(s), non-transitory computer readable storage, database(s), one or more input/output (I/O) devices, and interface(s). System(s) 201, 210a, 210b may include one or more software components such as a computer-readable medium including computer-executable instructions for performing methods consistent with certain disclosed embodiments. One or more of the hardware components listed above may be implemented using software. For example, storage may include a software partition associated with one or more other hardware components of the system(s) 201, 210a, 210b, System(s) 201, 210a, 210b may include additional, fewer, and/or different components than those listed, above, as the components listed above are exemplary only and not intended to be limiting.

The system processor(s) are each configured to execute instructions and process data to perform one or more functions associated with the respective system(s) 201, 210a, 210b. The processor(s) may be communicatively coupled to RAM, ROM, storage, I/O devices, and other hardware. The processor(s) may be configured to execute sequences of computer program instructions to perform various processes, which will be described in detail below. The computer program instructions may be loaded, into RAM for execution by the processor(s).

Storage device(s) may include any type of mass storage device configured to store information that the processor(s) may need to perform processes consistent with the disclosed embodiments. For example, storage device(s) may include one or more magnetic and/or optical disk devices, such as hard drives, CD-ROMs, DVD-ROMs, or any other type of mass media device.

Database(s) may include one or more software and/or hardware components that cooperate to store, organize, sort, filter, and/or arrange data used by the processor(s). The processor(s) may access the information stored in database 115 for comparing the past recommended website improvements to the current state of a website.

I/O devices may include one or more components configured to communicate information with a user associated with the processor(s). For example, I/O devices may include a console with an integrated keyboard and mouse to allow a user to input parameters associated with the processor(s), I/O devices may also include a display, such as a monitor, including a graphical user interface (GUI) for outputting information. I/O devices may also include peripheral devices such as, for example, a printer for printing information, a user-accessible disk drive (e.g., a USB port, a floppy, CD-ROM, or DVD-ROM drive, etc.) to allow a user to input data stored on a portable media device, a microphone, a speaker system, or any other suitable type of interface device.

The results of received data may be provided as output from the processor(s) to I/O device for printed display, viewing, and/or further communication to other system devices. Such output may include, for example, evaluation reports, recommended changes to a website, required changes to a website, timelines for improving a website, and other data consistent with evaluating websites. Output from the processor(s) can also be provided to database and to other processor(s).

The processor(s) may connect to Interface(s), which may include one or more components configured to transmit and receive data via a communication network, such as the Internet, a local area network, a workstation peer-to-peer network, a direct link network, a wireless network, or any other suitable communication platform. In this manner, clients 210a, 210b and server 201 may communicate through the use of a network architecture. The network architecture may include, alone or in any suitable combination, a telephone-based network (such as a PBX or POTS), a local area network (LAN), a wide area network (WAN), a dedicated intranet, and/or the Internet. Further, the network architecture may include any suitable combination of wired and/or wireless components and systems. For example, an Interface may include one or more modulators, demodulators, multiplexers, demultiplexers, network communication devices, wireless devices, antennas, modems, and any other type of device configured to enable data communication via a communication network.

A browser 215a, 215b executes in a system such as a client device 210a, 210b. A client user may use the browser 210a, 210b to access the website management service 202 and create and/or edit a website. In particular, the website is a mobile-ready website, having assets and functionality targeted for display and operation on a mobile device. To this end, website assets used to compose the website are small in size (less than 500 MB), and sized to fit on a mobile device display.

Those skilled in the art will appreciate that all or part of systems and methods consistent with the present disclosure may be stored on or read from other non-transitory computer-readable storage. Each device 210a, 210b and server(s) 201 may include one or more computer-readable storage medium(s) having stored thereon machine executable instructions for performing, among other things, the methods disclosed herein. Exemplary computer readable storage may include secondary storage devices, such as hard disks, floppy disks, and CD-ROM; a carrier wave tangibly embodied on a storage device; or other forms of computer-readable memory, such as read-only memory (ROM) or random-access memory (RAM).

Furthermore, one skilled in the art will also realize that the processes illustrated in this description may be implemented in a variety of ways and include multiple other modules, programs, applications, scripts, processes, threads, or code sections that may all functionally interrelate with each other to accomplish the individual tasks described above. For example, these programs modules may be implemented using commercially available software tools, using custom object-oriented code written in the C++ programming language, using applets written in the Java programming language, or may be implemented as with discrete electrical components or as one or more hardwired application specific integrated circuits (ASIC) custom designed for this purpose.

The described implementation may include a particular network configuration but embodiments of the present disclosure may be implemented in a variety of data communication network environments using software, hardware, or a combination of hardware and software to provide the processing functions.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A client device, comprising:
a display screen;
one or more user input devices for entering user input;
one or more computer-readable program storage media having stored thereon a website building application for building a website from the client device, the website building application comprising processor-executable instructions;
one or more computer-readable data storage media;
one or more processors executing the instructions of the website building application to
(a) communicate with a remote server which renders a user-configurable website template,
(b) present a graphical user interface on the display screen, the graphical user interface presenting to a user of the client device
the rendered user-configurable website template and one or more controls for editing elements of the website template to create a user-customized website, the controls responsive to user input from the one or more user input devices
to generate one or more of user edits and synchronization-type requests,
(c) determine whether the client device is a first device type or a second device type,
(d) if the client device is of the first device type, dynamically send to the server updates corresponding to user edits as user updates are generated by at least one of the controls for rendering of an updated user-configurable website template by the server, and receive and display the server-rendered updated user-configurable website template on the display screen, and
(e) if the client device is of the second device type, queue and store the user edits in the data storage media and, only upon generation by at least one of the controls of a synchronization-type request, batch a plurality of the queued user edits, and send to the server a batch request to process updates corresponding to the batched queued user edits and render a batch-updated user-configurable website template by the server, and receive and display the server-rendered batch-updated user-configurable website template on the display screen.

2. The client device of claim 1, wherein the website building application is configured as a guided wizard comprising a plurality of different pages wherein each page allows a user of the mobile device to customize or edit at least one different feature of the website.

3. The client device of claim 1, wherein the website building application is downloaded from the server.

4. The client device of claim 1, wherein at least one of the controls comprises a syntactic language format translation tool which allows a user to enter text formatting syntax directly into a text box, which is translated by the syntactic language format translation tool into a Rich text display when rendered.

5. The client device of claim 4, wherein the syntactic language format translation tool parses different formatted sections of text into respective different fields, and presents the different fields in the graphical user interface as separately editable.

6. The client device of claim 5, wherein one or more of the controls allow the user to reposition the separately editable fields relative to each other.

7. A server device system, comprising:
computer-readable non-transitory data storage media storing therein a website template and a website building application for building a website from the client device, the website building application comprising processor-executable instructions which, when executed by one or more processors of a client device direct the processors to
(a) communicate with a remote server which renders a user-configurable website template,
(b) present a graphical user interface on a display screen of the client device, the graphical user interface presenting to a user of the client device the rendered user-configurable website template and one or more controls for editing elements of the website template to create a user-customized website, the controls responsive to user input from the one or more user input devices to generate one or more of user edits and synchronization-type requests,
(c) determine whether the client device is a first device type or a second device type,
(d) if the client device is of the first device type, dynamically send to the server updates corresponding to user edits as user updates are generated by at least one of the controls for rendering of an updated user-configurable website template by the server, and receive and display the server-rendered updated user-configurable website template on the display screen, and
(e) if the client device is of the second device type, queue and store the user edits in computer-readable data storage media of the client device and, only upon generation by at least one of the controls of a synchronization-type request, batch a plurality of the queued user edits, and send to the server a batch request to process updates corresponding to the batched queued user edits and render a batch-updated user-configurable website template by the server, and receive and display the server-rendered batch-updated user-configurable website template on the display screen;
one or more computer-readable program storage media having stored thereon a website building application server, the server comprising computer-executable instructions operable to
serve the website building application to a client device,
render the website template for display on a client device and serve to the client device the rendered website template,
receive from the client device one or more updates corresponding to user edits to the website template, apply the received updates to the website template, render the updates website template, and serve to the client device the rendered updated template.

8. The server device of claim 7, wherein the first device type is a non-mobile device type, and the second device type is a mobile device type.

9. The server device of claim 7, wherein the synchronization-type request comprises a request for a preview of the user-configurable website template updated with the user edits, or a request to save the user edits to the user-configurable website template.

10. An article of manufacture, comprising:
one or more non-transitory computer-readable program storage media having stored thereon a website building application for building a website from the client device, the website building application comprising processor-executable instructions which, when executed by one or more processors of a client device direct the processors to
(a) communicate with a remote server which renders a user-configurable website template,
(b) present a graphical user interface on a display screen of the client device, the graphical user interface presenting to a user of the client device the rendered user-configurable website template and one or more controls for editing elements of the website template to create a user-customized website, the controls responsive to user input from the one or more user input devices to generate one or more of user edits and synchronization-type requests,
(c) determine whether the client device is a first device type or a second device type,
(d) if the client device is of the first device type, dynamically send to the server updates corresponding to user edits as user updates are generated by at least one of the controls for rendering of an updated user-configurable website template by the server, and receive and display the server-rendered updated user-configurable website template on the display screen, and
(e) if the client device is of the second device type, queue and store the user edits in computer-readable data storage media of the client device and, only upon generation by at least one of the controls of a synchronization-type request, batch a plurality of the queued user edits, and send to the server a batch request to process updates corresponding to the batched queued user edits and render a batch-updated user-configurable website template by the server, and receive and display the server-rendered batch-updated user-configurable website template on the display screen.

11. The article of manufacture of claim 10, wherein the first device type is a non-mobile device type, and the second device type is a mobile device type.

12. The article of manufacture of claim 10, wherein the synchronization-type request comprises a request for a preview of the user-configurable website template updated with the user edits, or a request to save the user edits to the user-configurable website template.

13. The client device of claim 1, wherein the first device type is a non-mobile device type, and the second device type is a mobile device type.

14. The client device of claim 1, wherein the synchronization-type request comprises a request for a preview of the user-configurable website template updated with the user edits, or a request to save the user edits to the user-configurable website template.

* * * * *